US012598623B2

(12) United States Patent
Li et al.

(10) Patent No.: US 12,598,623 B2
(45) Date of Patent: Apr. 7, 2026

(54) COMMUNICATION METHOD AND RELATED DEVICE

(71) Applicant: HUAWEI TECHNOLOGIES CO., LTD., Shenzhen (CN)

(72) Inventors: Ruijie Li, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 429 days.

(21) Appl. No.: 18/175,118

(22) Filed: Feb. 27, 2023

(65) Prior Publication Data

US 2023/0239898 A1      Jul. 27, 2023

Related U.S. Application Data

(63) Continuation of application No. PCT/CN2020/112613, filed on Aug. 31, 2020.

(51) Int. Cl.
*H04W 72/23*      (2023.01)
*H04W 72/232*      (2023.01)

(52) U.S. Cl.
CPC ................................. *H04W 72/232* (2023.01)

(58) Field of Classification Search
CPC .................................................... H04W 72/232
See application file for complete search history.

(56) References Cited

U.S. PATENT DOCUMENTS

| | | | |
|---|---|---|---|
| 2015/0146542 A1 | 5/2015 | Xia et al. | |
| 2018/0199359 A1 | 7/2018 | Cao et al. | |

| | | | |
|---|---|---|---|
| 2018/0206246 A1* | 7/2018 | Zhang | .................... H04L 1/1896 |
| 2020/0275413 A1 | 8/2020 | Zhang et al. | |
| 2021/0136693 A1* | 5/2021 | Zhang | .................... H04L 12/189 |

FOREIGN PATENT DOCUMENTS

| | | |
|---|---|---|
| CN | 108024268 A | 5/2018 |
| CN | 110972300 A | 4/2020 |
| CN | 111148236 A | 5/2020 |
| CN | 109644450 B | 12/2020 |
| EP | 3905573 A1 | 11/2021 |
| WO | 2014019191 A1 | 2/2014 |
| WO | 2020094107 A1 | 5/2020 |

(Continued)

OTHER PUBLICATIONS

Huawei, HiSilicon, Discussion on remaining MAC open issues for 5G V2X with NR SL. 3GPP TSG-RAN WG2 Meeting #110 electronic, Jun. 1-12, 2020, R2-2005492, 45 pages.

(Continued)

*Primary Examiner* — Ronald B Abelson

(74) *Attorney, Agent, or Firm* — HAUPTMAN HAM, LLP

(57) ABSTRACT

A communication method includes receiving a configuration information set from a network device, selecting target configuration information from the configuration information set, sending first information to the network device, and sending uplink data to the network device based on the target configuration information. The first information is useable to indicate at least one of the target configuration information or configuration information other than the target configuration information in the configuration information set.

12 Claims, 15 Drawing Sheets

Communication system 1000
Network device 1007
Terminal device 1006
Terminal device 1001
Terminal device 1002
Terminal device 1003
Terminal device 1004
Terminal device 1005

(56) References Cited

FOREIGN PATENT DOCUMENTS

WO          2020143441  A1      7/2020

OTHER PUBLICATIONS

3GPP TS 38.214 V16.2.0 (Jun. 2020), 3rd Generation Partnership Project; Technical Specification Group Radio Access Network; NR; Physical layer procedures for data(Release 16), 163 pages.
Extended European Search Report issued in corresponding European Application No. 20950893.6, dated Sep. 28, 2023, pp. 1-11.
Chinese Notification of Rejection issued in corresponding Chinese Application No. 202080103624.X, dated Dec. 14, 2024, pp. 1-7.

* cited by examiner

First time interval
T1

Time-frequency
resource 2

Time-frequency
resource 1

Time

First moment

First time interval
T2

Time-frequency
resource 2

Time-frequency
resource 1

Time

First moment

COMMUNICATION METHOD AND RELATED DEVICE

CROSS-REFERENCE TO RELATED APPLICATIONS

This application is a continuation of International Application No. PCT/CN2020/112613, filed on Aug. 31, 2020, the disclosure of which is hereby incorporated by reference in its entirety.

TECHNICAL FIELD

This application relates to the field of communication technologies, and in particular, to a communication method and a related device.

BACKGROUND

With continuous development of mobile communication technologies, people impose more requirements on existing mobile communication systems than previous generations of mobile communication systems in terms of transmission rate, latency, power consumption, and the like, and in particular, impose higher requirements in terms of reliability and latency.

Currently, uplink data transmission supports dynamic scheduling and configured grant (configured grant) scheduling. A common implementation procedure for the dynamic scheduling is as follows: If a terminal device needs to transmit data, the terminal device sends a request signal to a network device. After receiving the request signal, the network device sends indication information, namely, a UL grant, to the terminal device to schedule the terminal device. After receiving the indication information, namely, the UL grant, the terminal device transmits uplink data based on indication by the indication information, namely, the UL grant. It can be learned from the foregoing procedure that "handshake" is needed before the uplink data is transmitted through the dynamic scheduling. This causes high latency, and may not meet a requirement on ultra-reliable low-latency communication. In addition, the indication information, namely, the UL grant, is needed for scheduling before each data transmission. This also causes large overheads.

The configured grant (configured grant) scheduling means: A network device configures transmission information for a terminal device in advance, where the transmission information includes a resource, a modulation and coding scheme (modulation and coding scheme, MCS), and the like for data transmission. If the terminal device needs to transmit data, the terminal device directly transmits the data on the configured resource without sending a request, to effectively reduce transmission latency. However, in the configured grant (configured grant) scheduling, same information such as a same time-frequency resource and a same MCS is usually used in a long period of time. Consequently, a channel change or a service requirement cannot be well self-adapted to. Therefore, the configured grant (configured grant) scheduling achieves a worse balance between reliability and resource utilization than the dynamic scheduling. As a result, how to better balance the reliability and the resource utilization in the configured grant scheduling is a technical problem being resolved by persons skilled in the art.

SUMMARY

One or more embodiments of the present application disclose a communication method and a related device, to better balance reliability and resource utilization in configured grant scheduling A first aspect of one or more embodiments of this application discloses a communication method, including:

receiving a configuration information set from a network device;

selecting target configuration information from the configuration information set;

sending first information to the network device, where the first information indicates the target configuration information and/or configuration information other than the target configuration information in the configuration information set; and sending uplink data to the network device based on the target configuration information.

In the foregoing method, the first information is sent to the network device after the target configuration information is selected from the configuration information set, to explicitly notify the network device of the target configuration information selected by a terminal device, so that the configuration information other than the target configuration information in the configuration information set can be released. Correspondingly, after receiving the first information, the network device may schedule the configuration information other than the target configuration information in the configuration information set to another terminal device for use, to improve resource utilization. In addition, the terminal device may select, from the configuration information set based on a requirement of the terminal device, the target configuration information that meets a communication requirement, to achieve a balance between the resource utilization and a transmission requirement.

In some embodiments, the first information includes a first time period, and indicates that the uplink data is to be sent to the network device within the first time period based on the target configuration information.

In some embodiments, the first information further indicates a first time period, and indicates that the uplink data is to be sent to the network device within the first time period based on the target configuration information.

In the foregoing method, the first information includes or indicates the first time period, so that the terminal device does not need to send the first information to the network device in each periodicity. The first information can indicate that the terminal device does not need to send the first information to the network device within the first time period. In other words, the terminal device sends the uplink data to the network device within the first time period based on the target configuration information. This reduces frequency of sending the first information. Therefore, resources, for example, power, of the terminal device are saved, and a time-frequency resource for sending the first information can be reduced. In addition, correspondingly, the network device does not need to detect the first information within this time period. This can reduce a resource used by the network device to detect information. Furthermore, interference caused to another user by sending the first information can be reduced.

In some embodiments, downlink control information DCI from the network device is received, where the DCI is for activating configuration information in the configuration information set. The selecting target configuration information from the configuration information set includes: selecting the target configuration information from the activated configuration information.

In some embodiments, the selecting target configuration information from the configuration information set includes: selecting the target configuration information from the configuration information set based on second information.

In the foregoing method, the appropriate target configuration information is selected from the configuration information set based on an actual transmission case (a channel state or an uplink/downlink data transmission requirement), so that a channel change, a service requirement, or the like can be well adapted to, to adjust a transmission status in time, and achieve a good balance between transmission reliability and the resource utilization. In some embodiments, the second information from the network device is received.

In some embodiments, the second information includes one or more of channel state information, reliability of the uplink data, size information of the uplink data, an arrival moment of the uplink data, and a first moment. In the foregoing method, the second information for selecting the target configuration information is from the network device. Because the present disclosure is specific to uplink data transmission, the network device has more uplink transmission information than the terminal device. The network device configures the second information for the terminal device, so that the actual transmission status can be better adapted to, and the more appropriate target configuration information can be selected, to improve the resource utilization.

In some embodiments, the sending first information to the network device includes: sending the first information to the network device if the arrival moment of the uplink data is before the first moment, where the first moment is a time point before a piece of configuration information in the configuration information set.

The foregoing method provides a manner of sending the first information based on a data packet arrival moment.

In some embodiments, the sending first information to the network device includes: sending the first information to the network device on a second time-frequency resource, where the second time-frequency resource is related to the target configuration information or the configuration information set. In the foregoing method, the time-frequency resource for sending the first information is determined based on the target configuration information, so that the time-frequency resource can be properly used. The terminal device can determine the second time-frequency resource based on a relationship between the second time-frequency resource and the target configuration information or the configuration information set, so that signaling overheads spent by the network device on configuring the second time-frequency resource are reduced.

In some embodiments, the method further includes: receiving fourth information from the network device, where the fourth information indicates a third time-frequency resource, and the third time-frequency resource is for sending the first information to the network device. In the foregoing method, the fourth information from the network device is received to determine the time-frequency resource for sending the first information, so that the appropriate time-frequency resource can be more flexibly selected to send the first information.

In some embodiments, the sending first information to the network device includes: sending the first information to the network device on a fourth time-frequency resource, where the fourth time-frequency resource is a time-frequency resource preallocated to send uplink control information UCI. In the foregoing method, the first information is sent on the time-frequency resource preallocated to send the UCI, so that the resource utilization can be maximized, and no additional time-frequency resource needs to be configured for the first information, to save time-frequency resources.

In some embodiments, the sending first information to the network device includes: the first information is included in UCI. In the foregoing method, the UCI may include the first information, so that the first information can be fed back by using different states in the UCI, to reduce a resource for sending the first information.

In some embodiments, when the second time-frequency resource or the third time-frequency resource overlaps a fifth time-frequency resource in time domain or frequency domain, the first information is sent to the network device on the second time-frequency resource or the third time-frequency resource, where the fifth time-frequency resource is a time-frequency resource preallocated to send uplink control information UCI. Optionally, the terminal device is further configured to receive sixth indication information, where the sixth indication information indicates the terminal device to send the first information in the foregoing case. Optionally, the sixth indication information received by the terminal device may be a priority, and indicates that a priority of the first information is higher than that of the uplink control information UCI.

In some embodiments, when the second time-frequency resource or the third time-frequency resource overlaps a fifth time-frequency resource in time domain or frequency domain, uplink control information UCI is sent to the network device on the second time-frequency resource or the third time-frequency resource, where the fifth time-frequency resource is a time-frequency resource preallocated to send the uplink control information UCI. Optionally, the terminal device is further configured to receive sixth indication information, where the sixth indication information indicates the terminal device to send the UCI in the foregoing case. Optionally, the sixth indication information received by the terminal device may be a priority, and indicates that a priority of the first information is lower than that of the uplink control information UCI.

In the foregoing method, the terminal device may determine behavior to be performed when the second time-frequency resource or the third time-frequency resource overlaps the fifth time-frequency resource. Correspondingly, the network device does not need to perform blind detection when receiving the UCI and/or the first information, to save resources of the network device. In addition, when the terminal device sends the UCI, sending of the uplink control information UCI is preferentially ensured, to reduce a system performance loss caused due to that the UCI is delayed or not sent.

In some embodiments, when the second time-frequency resource or the third time-frequency resource overlaps a fifth time-frequency resource in time domain or frequency domain, the first information and uplink control information UCI are sent to the network device on the second time-frequency resource or the third time-frequency resource, where the fifth time-frequency resource is a time-frequency resource preallocated to send the uplink control information UCI. In the foregoing method, the terminal device may determine behavior to be performed when the second time-frequency resource or the third time-frequency resource overlaps the fifth time-frequency resource. Correspondingly, the network device does not need to perform blind detection when receiving the UCI and the first information, to save resources of the network device. In addition, according to this method, the UCI and the first information are allowed to be sent simultaneously.

In some embodiments, when the second time-frequency resource or the third time-frequency resource overlaps a fifth time-frequency resource in time domain or frequency domain, the first information is sent to the network device on the fifth time-frequency resource, where the fifth time-frequency resource is a time-frequency resource preallo-cated to send uplink control information UCI. Optionally, the terminal device is further configured to receive sixth indication information, where the sixth indication information indicates to send the first information in the foregoing case. Optionally, the sixth indication information received by the terminal device may be a priority, and indicates that a priority of the first information is higher than that of the uplink control information UCI.

In some embodiments, when the second time-frequency resource or the third time-frequency resource overlaps a fifth time-frequency resource in time domain or frequency domain, uplink control information UCI is sent to the network device on the fifth time-frequency resource, where the fifth time-frequency resource is a time-frequency resource preallocated to send the uplink control information UCI. Optionally, the terminal device is further configured to receive sixth indication information, where the sixth indication information indicates to send the uplink control information UCI in the foregoing case. Optionally, the sixth indication information received by the terminal device may be a priority, and indicates that a priority of the first information is lower than that of the uplink control information UCI.

In the foregoing method, the terminal device may determine behavior to be performed when the second time-frequency resource or the third time-frequency resource overlaps the fifth time-frequency resource. Correspondingly, the network device does not need to perform blind detection when receiving the UCI and/or the first information, to save resources of the network device. In addition, the terminal device sends the uplink control information or the first information to the network device based on indication by the network device, and the network device can more flexibly notify, based on the sixth indication information, information that may be sent by the terminal device.

In some embodiments, when the second time-frequency resource or the third time-frequency resource overlaps a fifth time-frequency resource in time domain or frequency domain, the first information and uplink control information UCI are sent to the network device on the fifth time-frequency resource, where the fifth time-frequency resource is a time-frequency resource preallocated to send the uplink control information UCI. The terminal device may determine behavior to be performed when the second time-frequency resource or the third time-frequency resource overlaps the fifth time-frequency resource. Correspondingly, the network device does not need to perform blind detection when receiving the UCI and the first information, to save resources of the network device. In addition, according to this method, the UCI and the first information are allowed to be sent simultaneously.

In some embodiments, when the second time-frequency resource or the third time-frequency resource overlaps a fifth time-frequency resource in time domain or frequency domain, the first information is sent to the network device on a sixth time-frequency resource, where the fifth time-frequency resource is a time-frequency resource preallocated to send uplink control information UCI. Optionally, the terminal device is further configured to receive sixth indication information, where the sixth indication information indicates to send the first information in the foregoing case. Optionally, the sixth indication information received by the terminal device may be a priority, and indicates that a priority of the first information is higher than that of the uplink control information UCI.

In some embodiments, when the second time-frequency resource or the third time-frequency resource overlaps a fifth time-frequency resource in time domain or frequency domain, uplink control information UCI is sent to the network device on a sixth time-frequency resource, where the fifth time-frequency resource is a time-frequency resource preallocated to send the uplink control information UCI. Optionally, the terminal device is further configured to receive sixth indication information, where the sixth indication information indicates to send the UCI in the foregoing case. Optionally, the sixth indication information received by the terminal device may be a priority, and indicates that a priority of the first information is lower than that of the uplink control information UCI.

In the foregoing method, the terminal device may determine behavior to be performed when the second time-frequency resource or the third time-frequency resource overlaps the fifth time-frequency resource. Correspondingly, the network device does not need to perform blind detection when receiving the UCI and/or the first information, to save resources of the network device. In addition, the terminal device sends the uplink control information or the first information to the network device based on indication by the network device, and the network device can more flexibly notify information that may be sent by the terminal device.

In some embodiments, when the second time-frequency resource or the third time-frequency resource overlaps a fifth time-frequency resource in time domain or frequency domain, the first information and uplink control information UCI are sent to the network device on a sixth time-frequency resource, where the fifth time-frequency resource is a time-frequency resource preallocated to send the uplink control information UCI. According to the foregoing method, the terminal device may determine behavior to be performed when the second time-frequency resource or the third time-frequency resource overlaps the fifth time-frequency resource. Correspondingly, the network device does not need to perform blind detection when receiving the UCI and the first information, to save resources of the network device.

A second aspect of one or more embodiments of this application discloses a communication method, including:

sending a configuration information set to a terminal device;

receiving first information from the terminal device, where the first information indicates target configuration information and/or configuration information other than the target configuration information in the configuration information set, and the configuration information set includes the target configuration information; and receiving uplink data from the terminal device based on the target configuration information.

In the foregoing method, the first information from the terminal device is received, to determine the target configuration information selected by the terminal device, so that a resource indicated by the configuration information other than the target configuration information in the configuration information set is released. In addition, the resource indicated by the configuration information other than the target configuration information in the configuration information set is scheduled to another terminal device, to improve resource utilization.

In some embodiments, the first information includes a first time period, and indicates to receive the uplink data within the first time period.

In some embodiments, the first information further indicates a first time period, and indicates to receive the uplink data within the first time period.

In the foregoing method, the first information includes or indicates the first time period, so that the terminal device does not need to send the first information to a network device in each periodicity. The first information can indicate that the terminal device does not need to send the first information to the network device within the first time period. In other words, the terminal device sends the uplink data to the network device within the first time period based on the target configuration information. This reduces frequency of sending the first information. Therefore, resources, for example, power, of the terminal device are saved, and a time-frequency resource for sending the first information can be reduced. In addition, correspondingly, the network device does not need to detect the first information within this time period. This can reduce a resource used by the network device to detect information. Furthermore, interference caused to another user by sending the first information can be reduced.

In some embodiments, downlink control information DCI is sent to the terminal device, where the DCI is for activating configuration information in the configuration information set, and the activated configuration information is for the terminal device to select the target configuration information from the activated configuration information.

In some embodiments, the method further includes: sending second information to the terminal device, where the second information is for the terminal device to select the target configuration information from the configuration information set based on the second information. In the foregoing method, the terminal device selects the appropriate target configuration information from the configuration information set based on an actual transmission case (a channel state or an uplink/downlink data transmission requirement), so that a channel change, a service requirement, or the like can be well adapted to, to adjust a transmission status in time, and achieve a good balance between transmission reliability and the resource utilization.

In some embodiments, the second information includes one or more of channel state information, reliability of the uplink data, size information of the uplink data, an arrival moment of the uplink data, and a first moment, and the first moment is a time point before a piece of configuration information in the configuration information set. In the foregoing method, the second information for selecting the target configuration information is from the network device. Because the present disclosure is specific to uplink data transmission, the network device has more uplink transmission information than the terminal device. The network device configures the second information for the terminal device, so that the actual transmission status can be better adapted to, and the more appropriate target configuration information can be selected, to improve the resource utilization.

In some embodiments, the receiving first information from the terminal device includes: receiving the first information from the terminal device on a second time-frequency resource, where the second time-frequency resource is related to the target configuration information or the configuration information set. In the foregoing method, the time-frequency resource for sending the first information is determined based on the target configuration information, so that the time-frequency resource can be properly used. The terminal device can determine the second time-frequency resource based on a relationship between the second time-frequency resource and the target configuration information or the configuration information set, so that signaling overheads spent by the network device on configuring the second time-frequency resource are reduced.

In some embodiments, the method further includes: sending fourth information to the terminal device, where the fourth information indicates a third time-frequency resource, and the third time-frequency resource is for the terminal device to send the first information to the network device. In the foregoing method, the fourth information is sent to the terminal device, to determine the time-frequency resource for the terminal device to send the first information, so that the appropriate time-frequency resource can be more flexibly selected to send the first information.

In some embodiments, the receiving first information from the terminal device includes: receiving the first information from the terminal device on a fourth time-frequency resource, where the fourth time-frequency resource is a time-frequency resource preallocated to send uplink control information UCI by the terminal device. In the foregoing method, the first information is received on the time-frequency resource preallocated to send the UCI, so that the resource utilization can be maximized, and no additional time-frequency resource needs to be configured for the first information, to save time-frequency resources.

In some embodiments, the receiving first information from the terminal device includes: the first information is included in UCI. In the foregoing method, the UCI may include the first information, so that the terminal device may feed back the first information by using different states in the UCI, to reduce a resource for sending the first information.

In some embodiments, when the second time-frequency resource or the third time-frequency resource overlaps a fifth time-frequency resource in time domain or frequency domain, the first information from the terminal device is received on the second time-frequency resource or the third time-frequency resource, where the fifth time-frequency resource is a time-frequency resource preallocated to send uplink control information UCI by the terminal device. Optionally, the network device further sends sixth indication information to the terminal device, where the sixth indication information indicates the terminal device to send the first information in the foregoing case. Optionally, the sixth indication information may be a priority, and indicates that a priority of the first information is higher than that of the uplink control information UCI.

In some embodiments, when the second time-frequency resource or the third time-frequency resource overlaps a fifth time-frequency resource in time domain or frequency domain, uplink control information UCI from the terminal device is received on the second time-frequency resource or the third time-frequency resource, where the fifth time-frequency resource is a time-frequency resource preallocated to send the uplink control information UCI by the terminal device. Optionally, the network device further sends sixth indication information to the terminal device, where the sixth indication information indicates the terminal device to send the uplink control information UCI in the foregoing case. Optionally, the sixth indication information may be a priority, and indicates that a priority of the first information is lower than that of the uplink control information UCI.

In the foregoing method, the terminal device may determine behavior to be performed when the second time-frequency resource or the third time-frequency resource overlaps the fifth time-frequency resource. Correspondingly, the network device does not need to perform blind detection when receiving the UCI and/or the first information, to save resources of the network device. In addition, sending of the uplink control information UCI is preferentially ensured, to reduce a system performance loss caused due to that the UCI is delayed or not sent.

In some embodiments, when the second time-frequency resource or the third time-frequency resource overlaps a fifth time-frequency resource in time domain or frequency domain, the first information and uplink control information UCI from the terminal device are received on the second time-frequency resource or the third time-frequency resource, where the fifth time-frequency resource is a time-frequency resource preallocated to send the uplink control information UCI by the terminal device. In the foregoing method, the terminal device may determine behavior to be performed when the second time-frequency resource or the third time-frequency resource overlaps the fifth time-frequency resource. Correspondingly, the network device does not need to perform blind detection when receiving the UCI and the first information, to save resources of the network device. In addition, according to this method, the UCI and the first information are allowed to be sent simultaneously.

In some embodiments, when the second time-frequency resource or the third time-frequency resource overlaps a fifth time-frequency resource in time domain or frequency domain, the first information from the terminal device is received on the fifth time-frequency resource, where the fifth time-frequency resource is a time-frequency resource preallocated to send uplink control information UCI by the terminal device. Optionally, the network device is further configured to send sixth indication information, where the sixth indication information indicates the terminal device to send the first information in the foregoing case. Optionally, the sixth indication information sent by the network device may be a priority, and indicates that a priority of the first information is higher than that of the uplink control information UCI.

In some embodiments, when the second time-frequency resource or the third time-frequency resource overlaps a fifth time-frequency resource in time domain or frequency domain, uplink control information UCI from the terminal device is received on the fifth time-frequency resource, where the fifth time-frequency resource is a time-frequency resource preallocated to send the uplink control information UCI by the terminal device. Optionally, the network device is further configured to send sixth indication information, where the sixth indication information indicates the terminal device to send the uplink control information UCI in the foregoing case. Optionally, the sixth indication information sent by the network device may be a priority, and indicates that a priority of the first information is lower than that of the uplink control information UCI.

In the foregoing method, the terminal device may determine behavior to be performed when the second time-frequency resource or the third time-frequency resource overlaps the fifth time-frequency resource. Correspondingly, the network device does not need to perform blind detection when receiving the UCI and/or the first information, to save resources of the network device. In addition, the network device can more flexibly notify, by sending the sixth indication information, information that may be sent by the terminal device, namely, the UCI or the first information.

In some embodiments, when the second time-frequency resource or the third time-frequency resource overlaps a fifth time-frequency resource in time domain or frequency domain, the first information and uplink control information UCI from the terminal device are received on the fifth time-frequency resource, where the fifth time-frequency resource is a time-frequency resource preallocated to send the uplink control information UCI by the terminal device. In the foregoing method, the terminal device may determine behavior to be performed when the second time-frequency resource or the third time-frequency resource overlaps the fifth time-frequency resource. Correspondingly, the network device does not need to perform blind detection when receiving the UCI and the first information, to save resources of the network device. In addition, according to this method, the UCI and the first information are allowed to be sent simultaneously.

In some embodiments, when the second time-frequency resource or the third time-frequency resource overlaps a fifth time-frequency resource in time domain or frequency domain, the first information from the terminal device is received on a sixth time-frequency resource, where the fifth time-frequency resource is a time-frequency resource preallocated to send uplink control information UCI by the terminal device. Optionally, the network device is further configured to send sixth indication information, where the sixth indication information indicates the terminal device to send the first information in this case. Optionally, the sixth indication information may be a priority, and indicates that a priority of the first information is higher than that of the uplink control information UCI.

In some embodiments, when the second time-frequency resource or the third time-frequency resource overlaps a fifth time-frequency resource in time domain or frequency domain, uplink control information UCI from the terminal device is received on a sixth time-frequency resource, where the fifth time-frequency resource is a time-frequency resource preallocated to send the uplink control information UCI by the terminal device. Optionally, the network device is further configured to send sixth indication information, where the sixth indication information indicates the terminal device to send the uplink control information UCI. Optionally, the sixth indication information may be a priority, and indicates that a priority of the first information is lower than that of the uplink control information.

In the foregoing method, the terminal device may determine behavior to be performed when the second time-frequency resource or the third time-frequency resource overlaps the fifth time-frequency resource. Correspondingly, the network device does not need to perform blind detection when receiving the UCI and/or the first information, to save resources of the network device. In addition, the network device can more flexibly notify, by sending the sixth indication information, information that may be sent by the terminal device, namely, the UCI or the first information.

In some embodiments, when the second time-frequency resource or the third time-frequency resource overlaps a fifth time-frequency resource in time domain or frequency domain, the first information and uplink control information UCI from the terminal device are received on a sixth time-frequency resource, where the fifth time-frequency resource is a time-frequency resource preallocated to send the uplink control information UCI by the terminal device. According to the foregoing method, the terminal device may determine behavior to be performed when the second time-frequency resource or the third time-frequency resource overlaps the fifth time-frequency resource. Correspondingly, the network device does not need to perform blind detection when receiving the UCI and the first information, to save resources of the network device.

A third aspect of one or more embodiments of this application discloses a communication method, including:

receiving a configuration information set from a network device, where the configuration information set includes a plurality of pieces of configuration information; and sending third information to the network device if no uplink data arrives before a second moment, where the third information indicates that the configuration information in the configuration information set is not used, and the second moment is a time point before a piece of configuration information in the configuration information set.

In the foregoing method, a terminal device sends the third information to the network device if no data arrives before the second moment, to indicate that the terminal device does not use the configuration information in the configuration information set. Correspondingly, after receiving the third information, the network device can determine that the terminal device does not use the configuration information in the configuration information set, release the configuration information in the configuration information set, and allocate the configuration information in the configuration information set to another terminal device, to improve resource utilization.

In some embodiments, the third information includes or indicates a first time period, and indicates that the configuration information in the configuration information set is not used within the first time period.

In the foregoing method, the third information includes the first time period, so that the terminal device does not need to send the third information to the network device in each periodicity. The third information can indicate that the configuration information in the configuration information set is not used within the first time period. In other words, the terminal device does not use the configuration information in the configuration information set within the first time period. This reduces frequency of sending the third information and saves resources.

In some embodiments, the method further includes: receiving indication information from the network device, where the indication information indicates the second moment.

In some embodiments, the method further includes: sending first information to the network device if an arrival moment of uplink data is before the second moment, where the first information indicates target configuration information and/or configuration information other than the target configuration information in the configuration information set, and the target configuration information is configuration information in the configuration set. To be specific, the terminal device sends the first information to the network device when the arrival moment of the uplink data is before the second moment, where the first information indicates the target configuration information selected by the terminal device from the configuration information set or the configuration information other than the target configuration information in the configuration information set. Correspondingly, after receiving the first information, the network device may schedule the configuration information other than the target configuration information in the configuration information set to another terminal device for use, to improve the resource utilization. In addition, the terminal device may select, from the configuration information set based on a requirement of the terminal device, the target configuration information that meets a communication requirement, to achieve a balance between the resource utilization and a transmission requirement.

In some embodiments, the method further includes: if an arrival moment of uplink data falls within a second time interval, skipping starting to transmit the uplink data at a start moment of a first periodicity, where the second time interval is a time period between the second moment and a start moment of first configuration information, the first configuration information is configuration information earliest in time domain in the configuration information set, and the first periodicity is one of several consecutive periodicities for sending the configuration information set. Optionally, an end moment of the second time interval is the same as the start moment of the first configuration information.

A fourth aspect of one or more embodiments of this application discloses a communication method, including:

sending a configuration information set to a terminal device, where the configuration information set includes a plurality of pieces of configuration information; and receiving third information from the terminal device, where the third information indicates that the terminal device does not use the configuration information in the configuration information set.

In the foregoing method, after receiving the third information from the terminal device, a network device can determine, based on the third information, that the terminal device does not use the configuration information in the configuration information set, release resources indicated by the configuration information in the configuration information set, and schedule the resources indicated by the configuration information in the configuration information set to another terminal device, to improve resource utilization.

In some embodiments, the third information includes or indicates a first time period, and indicates that the configuration information in the configuration information set is not used within the first time period.

In the foregoing method, the third information includes the first time period, so that the terminal device does not need to send the third information to the network device in each periodicity. The third information can indicate that the terminal device does not need to send the third information to the network device within the first time period. In other words, the terminal device does not use the configuration information in the configuration information set within the first time period. This reduces frequency of sending the third information and saves resources.

In some embodiments, indication information is sent to the terminal device, where the indication information indicates the terminal device to send the third information to the network device when no uplink data arrives before a second moment, and the second moment is a time point before a piece of configuration information in the configuration information set.

In some embodiments, first information from the terminal device is received, where the first information indicates target configuration information and/or configuration information other than the target configuration information in the configuration information set, and the target configuration information is configuration information in the configuration set.

A fifth aspect of one or more embodiments of this application discloses a terminal device, including:

a communication unit, configured to receive a configuration information set from a network device; and a processing unit, configured to select target configuration information from the configuration information set, where the communication unit is further configured to send first information to the network device, where the first information indicates the target configuration information and/or configuration information other than the target configuration information in the configuration information set; and the communication unit is further configured to send uplink data to the network device based on the target configuration information.

In some embodiments, the first information includes a first time period, and indicates that the uplink data is to be sent to the network device within the first time period based on the target configuration information.

In some embodiments, the communication unit is further configured to receive downlink control information DCI from the network device, where the DCI is for activating configuration information in the configuration information set. The processing unit is further configured to select the target configuration information from the activated configuration information.

In some embodiments, the processing unit is further configured to select the target configuration information from the configuration information set based on second information.

In some embodiments, the communication unit is further configured to receive the second information from the network device.

In some embodiments, the second information includes one or more of channel state information, reliability of the uplink data, size information of the uplink data, an arrival moment of the uplink data, and a first moment.

In some embodiments, the communication unit is further configured to send the first information to the network device when the arrival moment of the uplink data is before the first moment, where the first moment is a time point before a piece of configuration information in the configuration information set.

In some embodiments, the communication unit is further configured to send the first information to the network device on a second time-frequency resource, where the second time-frequency resource is related to the target configuration information.

In some embodiments, the communication unit is further configured to receive fourth information from the network device, where the fourth information indicates a third time-frequency resource, and the third time-frequency resource is for sending the first information to the network device.

In some embodiments, the communication unit is further configured to send the first information to the network device on a fourth time-frequency resource, where the fourth time-frequency resource is a time-frequency resource pre-allocated to send uplink control information UCI.

In some embodiments, the communication unit is further configured to send the first information to the network device on the second time-frequency resource or the third time-frequency resource when the second time-frequency resource or the third time-frequency resource overlaps a fifth time-frequency resource in time domain or frequency domain, where the fifth time-frequency resource is a time-frequency resource preallocated to send uplink control information UCI.

In some embodiments, the communication unit is further configured to send uplink control information UCI to the network device on the second time-frequency resource or the third time-frequency resource when the second time-frequency resource or the third time-frequency resource overlaps a fifth time-frequency resource in time domain or frequency domain, where the fifth time-frequency resource is a time-frequency resource preallocated to send the uplink control information UCI.

In some embodiments, the communication unit is further configured to send the first information and uplink control information UCI to the network device on the second time-frequency resource or the third time-frequency resource when the second time-frequency resource or the third time-frequency resource overlaps a fifth time-frequency resource in time domain or frequency domain, where the fifth time-frequency resource is a time-frequency resource preallocated to send the uplink control information UCI.

In some embodiments, the communication unit is further configured to send the first information to the network device on a fifth time-frequency resource when the second time-frequency resource or the third time-frequency resource overlaps the fifth time-frequency resource in time domain or frequency domain, where the fifth time-frequency resource is a time-frequency resource preallocated to send uplink control information UCI.

In some embodiments, the communication unit is further configured to send uplink control information UCI to the network device on a fifth time-frequency resource when the second time-frequency resource or the third time-frequency resource overlaps the fifth time-frequency resource in time domain or frequency domain, where the fifth time-frequency resource is a time-frequency resource preallocated to send the uplink control information UCI.

In some embodiments, the communication unit is further configured to send the first information and uplink control information UCI to the network device on a fifth time-frequency resource when the second time-frequency resource or the third time-frequency resource overlaps the fifth time-frequency resource in time domain or frequency domain, where the fifth time-frequency resource is a time-frequency resource preallocated to send the uplink control information UCI.

In some embodiments, the communication unit is further configured to send the first information to the network device on a sixth time-frequency resource when the second time-frequency resource or the third time-frequency resource overlaps a fifth time-frequency resource in time domain or frequency domain, where the fifth time-frequency resource is a time-frequency resource preallocated to send uplink control information UCI.

In some embodiments, the communication unit is further configured to send uplink control information UCI to the network device on a sixth time-frequency resource when the second time-frequency resource or the third time-frequency resource overlaps a fifth time-frequency resource in time domain or frequency domain, where the fifth time-frequency resource is a time-frequency resource preallocated to send the uplink control information UCI.

In some embodiments, the communication unit is further configured to send the first information and uplink control information UCI to the network device on a sixth time-frequency resource when the second time-frequency resource or the third time-frequency resource overlaps a fifth time-frequency resource in time domain or frequency domain, where the fifth time-frequency resource is a time-frequency resource preallocated to send the uplink control information UCI.

For technical effects brought by the fifth aspect or the possible implementations, refer to the descriptions of the technical effects brought by the first aspect or the corresponding implementations.

A sixth aspect of one or more embodiments of this application discloses a network device, including:

a processing unit, configured to send a configuration information set to a terminal device through a communication unit, where the processing unit is further configured to receive first information from the terminal device through the communication unit, where the first information indicates target configuration information and/or configuration information other than the target configuration information in the configuration information set, and the configuration information set includes the target configuration information; and the processing unit is further configured to receive uplink data from the terminal device through the communication unit based on the target configuration information.

In some embodiments, the first information includes a first time period, and indicates to receive the uplink data within the first time period.

In some embodiments, the communication unit is further configured to send downlink control information DCI to the terminal device, where the DCI is for activating configuration information in the configuration information set, and the activated configuration information is for the terminal device to select the target configuration information from the activated configuration information.

In some embodiments, the communication unit is further configured to send second information to the terminal device, where the second information is for the terminal device to select the target configuration information from the configuration information set based on the second information.

In some embodiments, the second information includes one or more of channel state information, reliability of the uplink data, size information of the uplink data, an arrival moment of the uplink data, and a first moment, and the first moment is a time point before a piece of configuration information in the configuration information set.

In some embodiments, the communication unit is further configured to receive the first information from the terminal device on a second time-frequency resource, where the second time-frequency resource is related to the target configuration information.

In some embodiments, the communication unit is further configured to send fourth information to the terminal device, where the fourth information indicates a third time-frequency resource, and the third time-frequency resource is for the terminal device to send the first information to the network device.

In some embodiments, the communication unit is further configured to receive the first information from the terminal device on a fourth time-frequency resource, where the fourth time-frequency resource is a time-frequency resource preallocated to send uplink control information UCI by the terminal device.

In some embodiments, the communication unit is further configured to receive the first information from the terminal device on the second time-frequency resource or the third time-frequency resource when the second time-frequency resource or the third time-frequency resource overlaps a fifth time-frequency resource in time domain or frequency domain, where the fifth time-frequency resource is a time-frequency resource preallocated to send uplink control information UCI by the terminal device.

In some embodiments, the communication unit is further configured to receive uplink control information UCI from the terminal device on the second time-frequency resource or the third time-frequency resource when the second time-frequency resource or the third time-frequency resource overlaps a fifth time-frequency resource in time domain or frequency domain, where the fifth time-frequency resource is a time-frequency resource preallocated to send the uplink control information UCI by the terminal device.

In some embodiments, the communication unit is further configured to receive the first information and uplink control information UCI from the terminal device on the second time-frequency resource or the third time-frequency resource when the second time-frequency resource or the third time-frequency resource overlaps a fifth time-frequency resource in time domain or frequency domain, where the fifth time-frequency resource is a time-frequency resource preallocated to send the uplink control information UCI by the terminal device.

In some embodiments, the communication unit is further configured to receive the first information from the terminal device on a fifth time-frequency resource when the second time-frequency resource or the third time-frequency resource overlaps the fifth time-frequency resource in time domain or frequency domain, where the fifth time-frequency resource is a time-frequency resource preallocated to send uplink control information UCI by the terminal device.

In some embodiments, the communication unit is further configured to receive uplink control information UCI from the terminal device on a fifth time-frequency resource when the second time-frequency resource or the third time-frequency resource overlaps the fifth time-frequency resource in time domain or frequency domain, where the fifth time-frequency resource is a time-frequency resource preallocated to send the uplink control information UCI by the terminal device.

In some embodiments, the communication unit is further configured to receive the first information and uplink control information UCI from the terminal device on a fifth time-frequency resource when the second time-frequency resource or the third time-frequency resource overlaps the fifth time-frequency resource in time domain or frequency domain, where the fifth time-frequency resource is a time-frequency resource preallocated to send the uplink control information UCI by the terminal device.

In some embodiments, the communication unit is further configured to receive the first information from the terminal device on a sixth time-frequency resource when the second time-frequency resource or the third time-frequency resource overlaps a fifth time-frequency resource in time domain or frequency domain, where the fifth time-frequency resource is a time-frequency resource preallocated to send uplink control information UCI by the terminal device.

In some embodiments, the communication unit is further configured to receive uplink control information UCI from the terminal device on a sixth time-frequency resource when the second time-frequency resource or the third time-frequency resource overlaps a fifth time-frequency resource in time domain or frequency domain, where the fifth time-frequency resource is a time-frequency resource preallocated to send the uplink control information UCI by the terminal device.

In some embodiments, the communication unit is further configured to receive the first information and uplink control information UCI from the terminal device on a sixth time-frequency resource when the second time-frequency resource or the third time-frequency resource overlaps a fifth time-frequency resource in time domain or frequency domain, where the fifth time-frequency resource is a time-frequency resource preallocated to send the uplink control information UCI by the terminal device.

For technical effects brought by the sixth aspect or the possible implementations, refer to the descriptions of the technical effects brought by the second aspect or the corresponding implementations.

A seventh aspect of one or more embodiments of this application discloses a terminal device, including:

a processing unit, configured to receive a configuration information set from a network device through a communication unit, where the configuration information set includes a plurality of pieces of configuration information, where the processing unit is further configured to send third information to the network device through the communication unit when no uplink data arrives before a second moment, where the third information indicates that the configuration information in the configuration information set is not used, and the second moment is a time point before a piece of configuration information in the configuration information set.

In some embodiments, the third information includes a first time period, and indicates that the configuration information in the configuration information set is not used within the first time period.

In some embodiments, the communication unit is further configured to receive indication information from the network device, where the indication information indicates the second moment.

In some embodiments, the communication unit is further configured to send first information to the network device when an arrival moment of uplink data is before the second moment, where the first information indicates target configuration information and/or configuration information other than the target configuration information in the configuration information set, and the target configuration information is configuration information in the configuration set.

In some embodiments, the communication unit is further configured to: when an arrival moment of uplink data falls within a second time interval, skip starting to transmit the uplink data at a start moment of a first periodicity, where the second time interval is a time period between the second moment and a start moment of first configuration information, the first configuration information is configuration information earliest in time domain in the configuration information set, and the first periodicity is one of several consecutive periodicities for sending the configuration information set. Optionally, an end moment of the second time interval is the same as the start moment of the first configuration information.

For technical effects brought by the seventh aspect or the possible implementations, refer to the descriptions of the technical effects brought by the third aspect or the corresponding implementations.

An eighth aspect of one or more embodiments of this application discloses a network device, including:

a processing unit, configured to send a configuration information set to a terminal device through a communication unit, where the configuration information set includes a plurality of pieces of configuration information, where the processing unit is further configured to receive third information from the terminal device through the communication unit, where the third information indicates that the terminal device does not use the configuration information in the configuration information set.

In some embodiments, the third information includes a first time period, and indicates that the configuration information in the configuration information set is not used within the first time period.

In some embodiments, the communication unit is further configured to send indication information to the terminal device, where the indication information indicates the terminal device to send the third information to the device when no uplink data arrives before a second moment, and the second moment is a time point before a piece of configuration information in the configuration information set.

In some embodiments, the communication unit is further configured to receive first information from the terminal device, where the first information indicates target configuration information and/or configuration information other than the target configuration information in the configuration information set, and the target configuration information is configuration information in the configuration set.

For technical effects brought by the eighth aspect or the possible implementations, refer to the descriptions of the technical effects brought by the fourth aspect or the corresponding implementations.

A ninth aspect of one or more embodiments of this application discloses a terminal device, including at least one processor and a transceiver. The at least one processor is configured to communicate with another device through the transceiver, a memory is configured to store a computer program, and the processor is configured to invoke the computer program to perform the following operations:

receiving a configuration information set from a network device through the transceiver;

selecting target configuration information from the configuration information set;

sending first information to the network device through the transceiver, where the first information indicates the target configuration information and/or configuration information other than the target configuration information in the configuration information set; and sending uplink data to the network device through the transceiver based on the target configuration information.

In some embodiments, the first information includes a first time period, and indicates that the uplink data is to be sent to the network device within the first time period based on the target configuration information.

In some embodiments, the processor is further configured to: receive downlink control information DCI from the network device through the transceiver, where the DCI is for activating configuration information in the configuration information set; and select the target configuration information from the activated configuration information.

In some embodiments, the processor is further configured to select the target configuration information from the configuration information set based on second information.

In some embodiments, the processor is further configured to receive the second information from the network device through the transceiver.

In some embodiments, the second information includes one or more of channel state information, reliability of the uplink data, size information of the uplink data, an arrival moment of the uplink data, and a first moment.

In some embodiments, the processor is further configured to send the first information to the network device through the transceiver when the arrival moment of the uplink data is before the first moment, where the first moment is a time point before a piece of configuration information in the configuration information set.

In some embodiments, the processor is further configured to send the first information to the network device on a second time-frequency resource through the transceiver, where the second time-frequency resource is related to the target configuration information.

In some embodiments, the processor is further configured to receive fourth information from the network device through the transceiver, where the fourth information indicates a third time-frequency resource, and the third time-frequency resource is for sending the first information to the network device.

In some embodiments, the processor is further configured to send the first information to the network device on a fourth time-frequency resource through the transceiver, where the fourth time-frequency resource is a time-frequency resource preallocated to send uplink control information UCI.

In some embodiments, the processor is further configured to send the first information to the network device through the transceiver on the second time-frequency resource or the third time-frequency resource when the second time-frequency resource or the third time-frequency resource overlaps a fifth time-frequency resource in time domain or frequency domain, where the fifth time-frequency resource is a time-frequency resource preallocated to send uplink control information UCI.

In some embodiments, the processor is further configured to send uplink control information UCI to the network device through the transceiver on the second time-frequency resource or the third time-frequency resource when the second time-frequency resource or the third time-frequency resource overlaps a fifth time-frequency resource in time domain or frequency domain, where the fifth time-frequency resource is a time-frequency resource preallocated to send the uplink control information UCI.

In some embodiments, the processor is further configured to send the first information and uplink control information UCI to the network device through the transceiver on the second time-frequency resource or the third time-frequency resource when the second time-frequency resource or the third time-frequency resource overlaps a fifth time-frequency resource in time domain or frequency domain, where the fifth time-frequency resource is a time-frequency resource preallocated to send the uplink control information UCI.

In some embodiments, the processor is further configured to send the first information to the network device through the transceiver on a fifth time-frequency resource when the second time-frequency resource or the third time-frequency resource overlaps the fifth time-frequency resource in time domain or frequency domain, where the fifth time-frequency resource is a time-frequency resource preallocated to send uplink control information UCI.

In some embodiments, the processor is further configured to send uplink control information UCI to the network device through the transceiver on a fifth time-frequency resource when the second time-frequency resource or the third time-frequency resource overlaps the fifth time-frequency resource in time domain or frequency domain, where the fifth time-frequency resource is a time-frequency resource preallocated to send the uplink control information UCI.

In some embodiments, the processor is further configured to send the first information and uplink control information UCI to the network device through the transceiver on a fifth time-frequency resource when the second time-frequency resource or the third time-frequency resource overlaps the fifth time-frequency resource in time domain or frequency domain, where the fifth time-frequency resource is a time-frequency resource preallocated to send the uplink control information UCI.

In some embodiments, the processor is further configured to send the first information to the network device through the transceiver on a sixth time-frequency resource when the second time-frequency resource or the third time-frequency resource overlaps a fifth time-frequency resource in time domain or frequency domain, where the fifth time-frequency resource is a time-frequency resource preallocated to send uplink control information UCI.

In some embodiments, the processor is further configured to send uplink control information UCI to the network device through the transceiver on a sixth time-frequency resource when the second time-frequency resource or the third time-frequency resource overlaps a fifth time-frequency resource in time domain or frequency domain, where the fifth time-frequency resource is a time-frequency resource preallocated to send the uplink control information UCI.

In some embodiments, the processor is further configured to send the first information and uplink control information UCI to the network device through the transceiver on a sixth time-frequency resource when the second time-frequency resource or the third time-frequency resource overlaps a fifth time-frequency resource in time domain or frequency domain, where the fifth time-frequency resource is a time-frequency resource preallocated to send the uplink control information UCI.

For technical effects brought by the ninth aspect or the possible implementations, refer to the descriptions of the technical effects brought by the first aspect or the corresponding implementations.

A tenth aspect of one or more embodiments of this application discloses a network device, including at least one processor and a transceiver. The at least one processor is configured to communicate with another device through the transceiver, a memory is configured to store a computer program, and the processor is configured to invoke the computer program to perform the following operations:

sending a configuration information set to a terminal device through the transceiver;

receiving first information from the terminal device through the transceiver, where the first information indicates target configuration information and/or configuration information other than the target configuration information in the configuration information set, and the configuration information set includes the target configuration information; and receiving uplink data from the terminal device through the transceiver based on the target configuration information.

In some embodiments, the first information includes a first time period, and indicates to receive the uplink data within the first time period.

In some embodiments, the processor is further configured to send downlink control information DCI to the terminal device through the transceiver, where the DCI is for activating configuration information in the configuration information set, and the activated configuration information is for the terminal device to select the target configuration information from the activated configuration information.

In some embodiments, the processor is further configured to send second information to the terminal device through the transceiver, where the second information is for the terminal device to select the target configuration information from the configuration information set based on the second information.

In some embodiments, the second information includes one or more of channel state information, reliability of the uplink data, size information of the uplink data, an arrival moment of the uplink data, and a first moment, and the first moment is a time point before a piece of configuration information in the configuration information set.

In some embodiments, the processor is further configured to receive the first information from the terminal device on a second time-frequency resource through the transceiver, where the second time-frequency resource is related to the target configuration information.

In some embodiments, the processor is further configured to send fourth information to the terminal device through the transceiver, where the fourth information indicates a third time-frequency resource, and the third time-frequency resource is for the terminal device to send the first information to the network device.

In some embodiments, the processor is further configured to receive the first information from the terminal device on a fourth time-frequency resource through the transceiver, where the fourth time-frequency resource is a time-frequency resource preallocated to send uplink control information UCI by the terminal device.

In some embodiments, the processor is further configured to receive the first information from the terminal device on the second time-frequency resource or the third time-frequency resource through the transceiver when the second time-frequency resource or the third time-frequency resource overlaps a fifth time-frequency resource in time domain or frequency domain, where the fifth time-frequency resource is a time-frequency resource preallocated to send uplink control information UCI by the terminal device.

In some embodiments, the processor is further configured to receive uplink control information UCI from the terminal device on the second time-frequency resource or the third time-frequency resource through the transceiver when the second time-frequency resource or the third time-frequency resource overlaps a fifth time-frequency resource in time domain or frequency domain, where the fifth time-frequency resource is a time-frequency resource preallocated to send the uplink control information UCI by the terminal device.

In some embodiments, the processor is further configured to receive the first information and uplink control information UCI from the terminal device on the second time-frequency resource or the third time-frequency resource through the transceiver when the second time-frequency resource or the third time-frequency resource overlaps a fifth time-frequency resource in time domain or frequency domain, where the fifth time-frequency resource is a time-frequency resource preallocated to send the uplink control information UCI by the terminal device.

In some embodiments, the processor is further configured to receive the first information from the terminal device on a fifth time-frequency resource through the transceiver when the second time-frequency resource or the third time-frequency resource overlaps the fifth time-frequency resource in time domain or frequency domain, where the fifth time-frequency resource is a time-frequency resource preallocated to send uplink control information UCI by the terminal device.

In some embodiments, the processor is further configured to receive uplink control information UCI from the terminal device on a fifth time-frequency resource through the transceiver when the second time-frequency resource or the third time-frequency resource overlaps the fifth time-frequency resource in time domain or frequency domain, where the fifth time-frequency resource is a time-frequency resource preallocated to send the uplink control information UCI by the terminal device.

In some embodiments, the processor is further configured to receive the first information and uplink control information UCI from the terminal device on a fifth time-frequency resource through the transceiver when the second time-frequency resource or the third time-frequency resource overlaps the fifth time-frequency resource in time domain or frequency domain, where the fifth time-frequency resource is a time-frequency resource preallocated to send the uplink control information UCI by the terminal device.

In some embodiments, the processor is further configured to receive the first information from the terminal device on a sixth time-frequency resource through the transceiver when the second time-frequency resource or the third time-frequency resource overlaps a fifth time-frequency resource in time domain or frequency domain, where the fifth time-frequency resource is a time-frequency resource preallocated to send uplink control information UCI by the terminal device.

In some embodiments, the processor is further configured to receive uplink control information UCI from the terminal device on a sixth time-frequency resource through the transceiver when the second time-frequency resource or the third time-frequency resource overlaps a fifth time-frequency resource in time domain or frequency domain, where the fifth time-frequency resource is a time-frequency resource preallocated to send the uplink control information UCI by the terminal device.

In some embodiments, the processor is further configured to receive the first information and uplink control information UCI from the terminal device on a sixth time-frequency resource through the transceiver when the second time-frequency resource or the third time-frequency resource overlaps a fifth time-frequency resource in time domain or frequency domain, where the fifth time-frequency resource is a time-frequency resource preallocated to send the uplink control information UCI by the terminal device.

For technical effects brought by the tenth aspect or the possible implementations, refer to the descriptions of the technical effects brought by the second aspect or the corresponding implementations.

An eleventh aspect of one or more embodiments of this application discloses a terminal device, including at least one processor and a transceiver. The at least one processor is configured to communicate with another device through the transceiver, a memory is configured to store a computer program, and the processor is configured to invoke the computer program to perform the following operations:

receiving a configuration information set from a network device through the transceiver, where the configuration information set includes a plurality of pieces of configuration information; and sending third information to the network device through the transceiver when no uplink data arrives before a second moment, where the third information indicates that the configuration information in the configuration information set is not used, and the second moment is a time point before a piece of configuration information in the configuration information set.

In some embodiments, the third information includes a first time period, and indicates that the configuration information in the configuration information set is not used within the first time period.

In some embodiments, the processor is further configured to receive indication information from the network device through the transceiver, where the indication information indicates the second moment.

In some embodiments, the processor is further configured to send first information to the network device through the transceiver when an arrival moment of uplink data is before the second moment, where the first information indicates target configuration information and/or configuration information other than the target configuration information in the configuration information set, and the target configuration information is configuration information in the configuration set.

In some embodiments, the processor is further configured to: when an arrival moment of uplink data falls within a second time interval, skip starting to transmit the uplink data through the transceiver at a start moment of a first periodicity, where the second time interval is a time period between the second moment and a start moment of first configuration information, the first configuration information is configuration information earliest in time domain in the configuration information set, and the first periodicity is one of several consecutive periodicities for sending the configuration information set. Optionally, an end moment of the second time interval is the same as the start moment of the first configuration information.

For technical effects brought by the eleventh aspect or the possible implementations, refer to the descriptions of the technical effects brought by the third aspect or the corresponding implementations.

A twelfth aspect of one or more embodiments of this application discloses a network device, including at least one processor and a transceiver. The at least one processor is configured to communicate with another device through the transceiver, a memory is configured to store a computer program, and the processor is configured to invoke the computer program to perform the following operations:

sending a configuration information set to a terminal device through the transceiver, where the configuration information set includes a plurality of pieces of configuration information; and receiving third information from the terminal device through the transceiver, where the third information indicates that the terminal device does not use the configuration information in the configuration information set.

In some embodiments, the third information includes a first time period, and indicates that the configuration information in the configuration information set is not used within the first time period.

In some embodiments, the processor is further configured to send indication information to the terminal device through the transceiver, where the indication information indicates the terminal device to send the third information to the device when no uplink data arrives before a second moment, and the second moment is a time point before a piece of configuration information in the configuration information set.

In some embodiments, the processor is further configured to receive first information from the terminal device through the transceiver, where the first information indicates target configuration information and/or configuration information other than the target configuration information in the configuration information set, and the target configuration information is configuration information in the configuration set.

For technical effects brought by the twelfth aspect or the possible implementations, refer to the descriptions of the technical effects brought by the fourth aspect or the corresponding implementations.

A thirteenth aspect of one or more embodiments of this application discloses a computer-readable storage medium. The computer-readable storage medium stores instructions. When the instructions are run on a computer, the computer is enabled to perform the methods in the foregoing aspects.

A fourteenth aspect of one or more embodiments of this application discloses a computer program product. When the computer program product runs on a computer, the computer is enabled to perform the methods in the foregoing aspects.

BRIEF DESCRIPTION OF DRAWINGS

Figure 3:
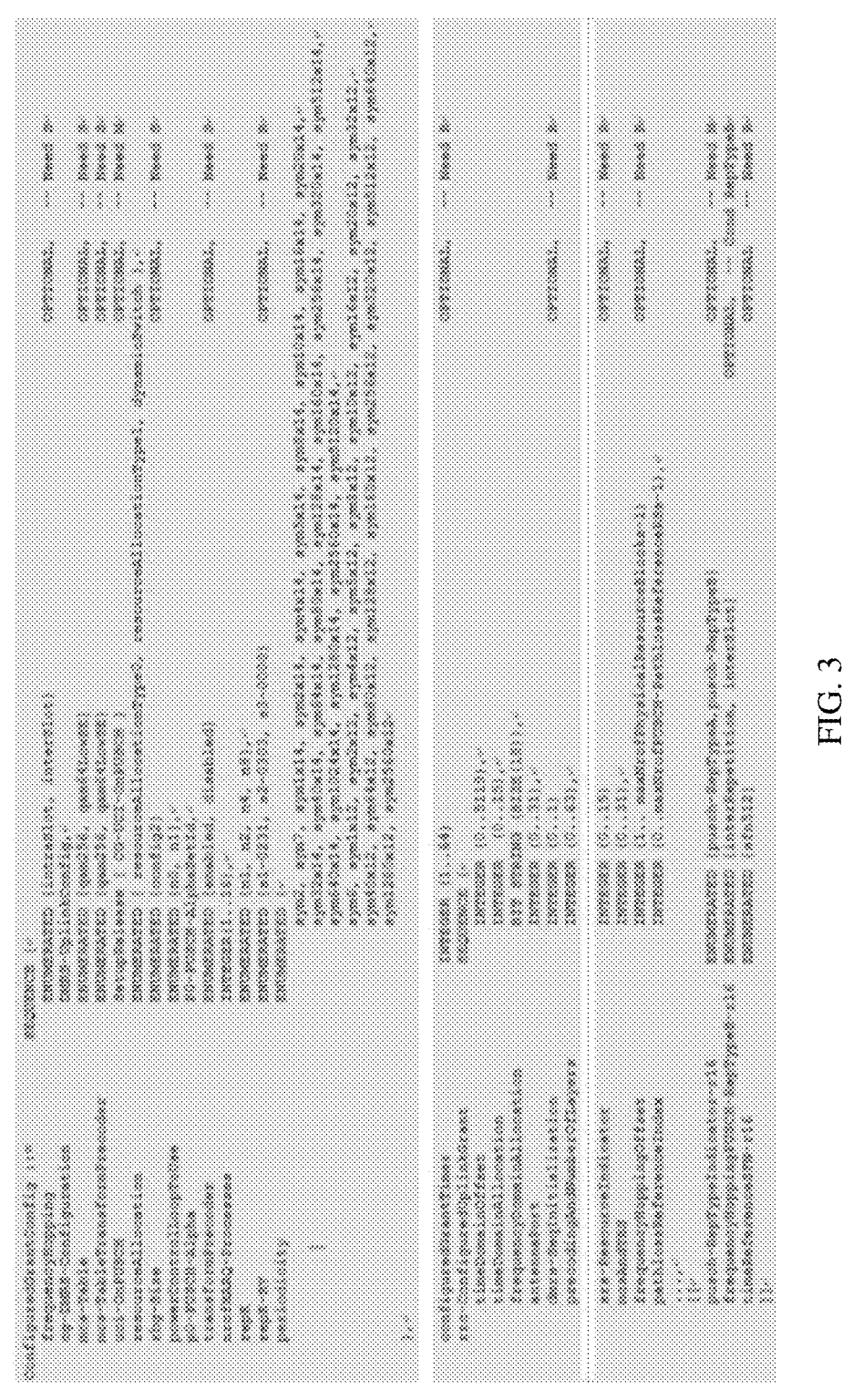

FIG. 3 is a schematic diagram of some configuration parameters in RRC signaling in a configured grant type 1 according to an embodiment of this application:

FIG. 6 is a schematic diagram of some configuration parameters associated with a configured grant type 2 according to an embodiment of this application:

DESCRIPTION OF EMBODIMENTS

The following describes embodiments of this application with reference to the accompanying drawings in embodiments of this application.

Figure 1:
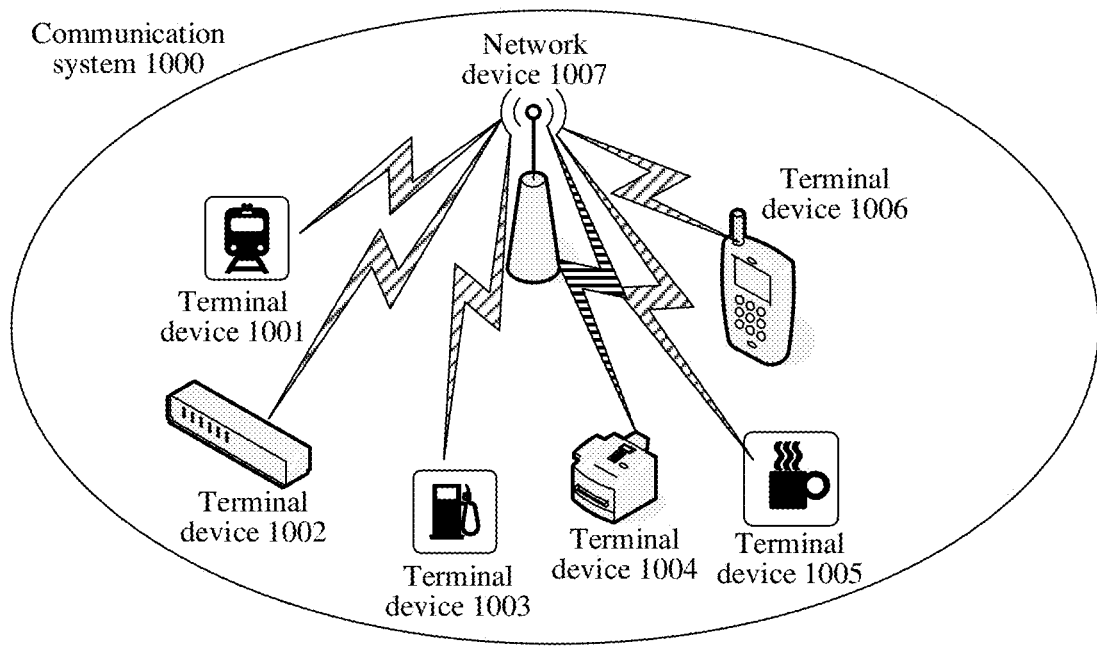
FIG. 1 is a schematic diagram of a structure of a communication system according to an embodiment of this application.

FIG. 1 is a schematic diagram of a structure of a communication system 1000 according to an embodiment of the present disclosure. The communication system 1000 may include a network device 1007, a terminal device 1001, a terminal device 1002, a terminal device 1003, a terminal device 1004, a terminal device 1005, and a terminal device 1006. It should be understood that the communication system 100 to which a method in embodiments of this application may be applied may include more or fewer network devices or terminal devices. The network device and the terminal device may be hardware, may be software obtained through function division, or may be a combination of the hardware and the software. The network device and the terminal device may communicate with each other through another device or network element. In the communication system, the network device 1007 may allocate resources for uplink transmission to a plurality of terminal devices, and the terminal device 1001 to the terminal device 1006 may send uplink data to the network device 1007 through the allocated resources. The method in embodiments of this application may be applied to the communication system 1000 shown in FIG. 1.

(1) A terminal device includes a device that provides a voice and/or data connectivity for a user. Specifically, the terminal device includes a device that provides a voice for a user, includes a device that provides data connectivity for a user, or includes a device that provides a voice and data connectivity for a user. For example, the terminal device may include a handheld device having a wireless connection function or a processing device connected to a wireless modem. The terminal device may communicate with a core network through a radio access network (radio access network, RAN) and exchange a voice and/or data with the RAN. The terminal device may include user equipment (user equipment, UE), a wireless terminal device, a mobile terminal device, a device-to-device (device-to-device, D2D) terminal device, a vehicle-to-everything (vehicle-to-everything, V2X) terminal device, a machine-to-machine/machine type communication (machine-to-machine/machine type communication, M2M/MTC) terminal device, an internet of things (internet of things, IoT) terminal device, light UE (light UE), reduced capability user equipment (reduced capability UE, REDCAP UE), a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer having a mobile terminal device, or a portable, pocket-sized, handheld, or computer built-in mobile apparatus. For example, the terminal device may include a personal communications service (personal communications service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device further includes a limited device, for example, a device with low power consumption, a device with a limited storage capability, or a device with a limited computing capability. For example, the terminal device includes an information sensing device, for example, a barcode, a radio frequency identification (radio frequency identification, RFID) device, a sensor, a global positioning system (global positioning system, GPS), or a laser scanner.

By way of example and not limitation, in embodiments of this application, the terminal device may alternatively be a wearable device. The wearable device may also be referred to as a wearable intelligent device, an intelligent wearable device, or the like, and is a general term of wearable devices, for example, glasses, gloves, watches, clothes, and shoes, that are developed by applying wearable technologies to intelligent designs of daily wear. The wearable device is a portable device that is directly worn on the body or integrated into clothes or an accessory of a user. The wearable device is not only a hardware device, but also implements powerful functions through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If the terminal devices described above are located on vehicles (for example, placed in the vehicles or installed in the vehicles), the terminal devices may be all considered as vehicle-mounted terminal devices. For example, the vehicle-mounted terminal devices are also referred to as on-board units (on-board units, OBUs).

In embodiments of this application, the terminal device may further include a relay (relay). Alternatively, it may be understood that any device that can perform data communication with a base station may be considered as a terminal device.

(2) A network device includes, for example, an access network (access network, AN) device such as a base station (for example, an access point), and may be a device that is in an access network and that communicates with a wireless terminal device over an air interface through one or more cells. Alternatively, for example, a network device in a vehicle-to-everything (vehicle-to-everything, V2X) technology is a road side unit (road side unit, RSU). The base station may be configured to perform mutual conversion between a received over-the-air frame and an IP packet, and serve as a router between the terminal device and a remaining part of the access network, where the remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB, evolved NodeB) in a long term evolution (long term evolution, LTE) system or a long term evolution-advanced (long term evolution-advanced, LTE-A) system, may include a next generation NodeB (next generation NodeB, gNB) in a 5th generation mobile communication technology (5th generation, 5G) NR system (also referred to as an NR system for short), or may include a central unit (central unit, CU) and a distributed unit (distributed unit, DU) in a cloud radio access network (cloud radio access network, Cloud RAN) system. This is not limited in embodiments of this application.

Some terms in this application are first described, to help persons skilled in the art have a better understanding.

Figure 2:
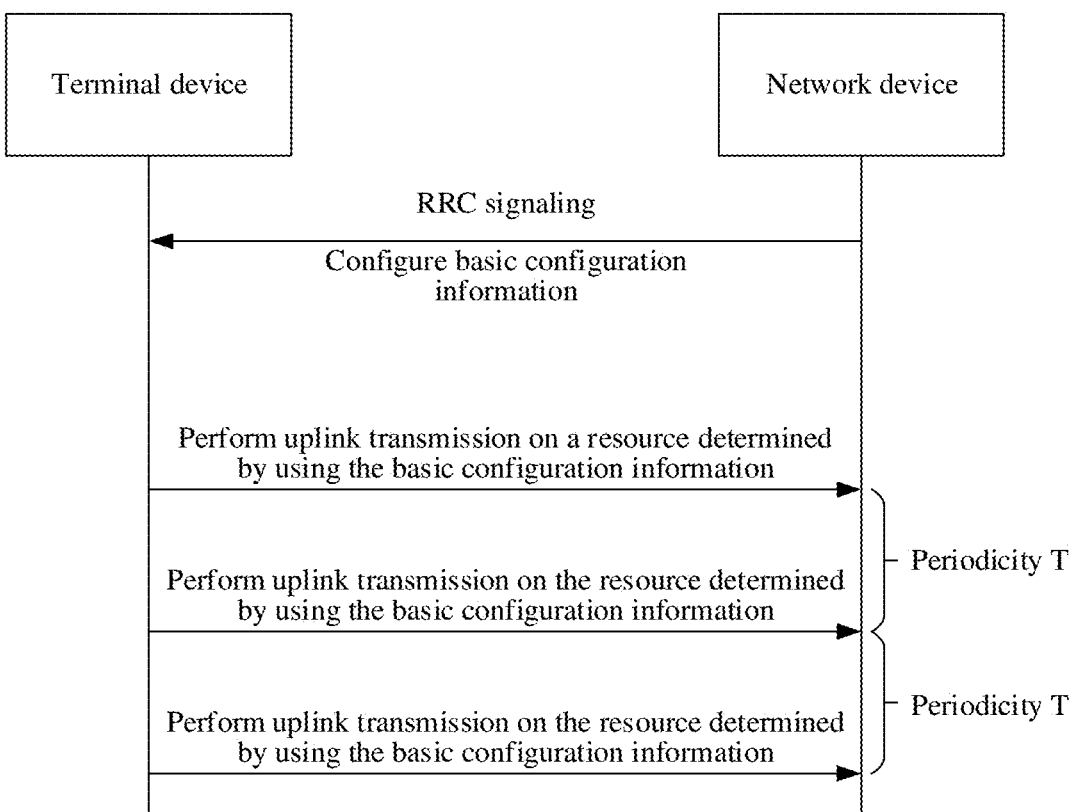
FIG. 2 is a schematic diagram of a configured grant type 1 according to an embodiment of this application.
Figures 4, 5:
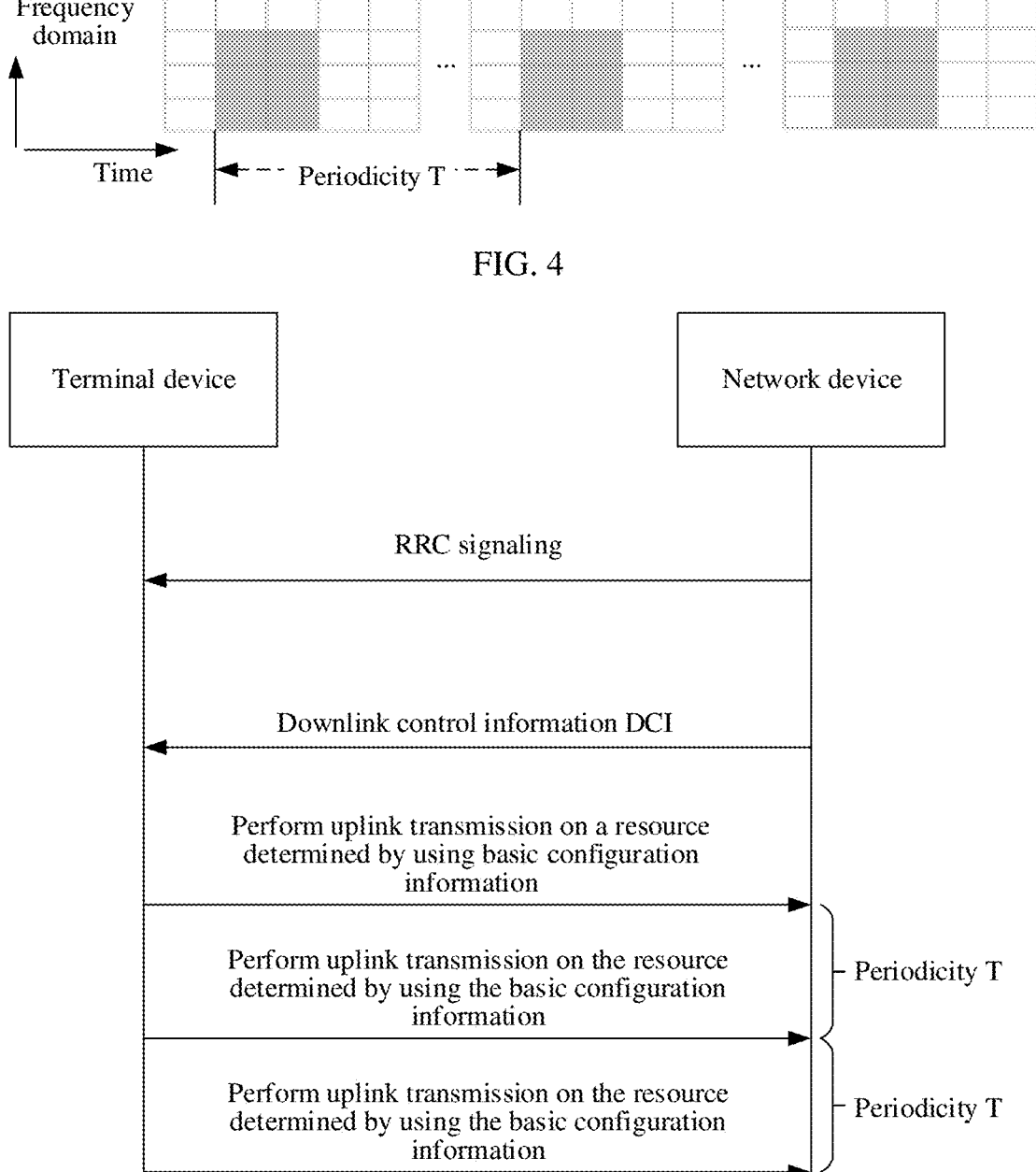
FIG. 4 is a schematic diagram of a time-frequency resource according to an embodiment of this application.
FIG. 5 is a schematic diagram of a configured grant type 2 according to an embodiment of this application.

(1) Configured grant (configured grant) scheduling means: A network device activates an uplink grant for a terminal device once, and the terminal device performs uplink transmission on a resource specified by the first-time uplink grant, until the terminal device receives a deactivation indication. The configured grant scheduling includes two transmission types:

Configured grant type 1 (configured grant type 1): Basic configuration information (including a time-frequency resource, a modulation and coding scheme (modulation and coding scheme, MCS), and the like) is configured by a radio resource control (radio resource control, RRC) layer by using higher layer signaling, and can be for the terminal device without being activated by using downlink control information (downlink control information, DCI). Details are shown in FIG. 2. FIG. 3 shows some configuration parameters in RRC signaling of the configured grant type 1 (configured grant type 1). The network device configures the basic configuration information by using the RRC signaling, and the terminal device may transmit uplink data based on a periodicity T by using a transmission status (including the time-frequency resource, the modulation and coding scheme, and the like) determined based on the basic configuration information. That the terminal device may transmit uplink data based on a periodicity T by using a transmission status (including the time-frequency resource, the modulation and coding scheme, and the like) determined based on the basic configuration information is specifically as follows, where an example in which the basic configuration information includes the time-frequency resource is used for description. FIG. 4 is a schematic diagram of the time-frequency resource. Each box represents one time-frequency resource block, and a gray-filled box is a resource configured by the network device for the terminal device to transmit the uplink data. The terminal device may use the time-frequency resource block based on the periodicity T after the network device configures the time-frequency resource. The periodicity T is also configured by using the RRC signaling, and corresponds to a variable, namely, periodicity, in FIG. 3.

Figure 6:
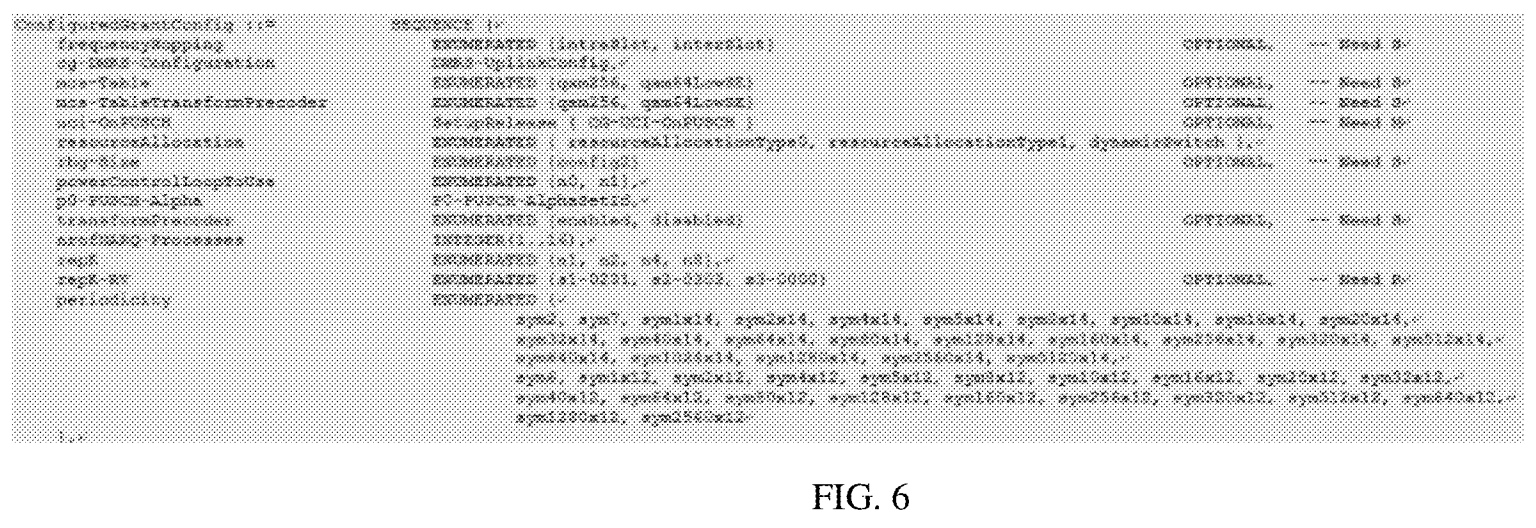

Configured grant type 2 (configured grant type 2): Basic configuration information (including a time-frequency resource, a modulation and coding scheme, and the like) is configured by a radio resource control (radio resource control, RRC) layer by using higher layer signaling, and the terminal device can transmit data based on a periodicity T by using the basic configuration information only after the basic configuration information is activated by using DCI, instead of directly using a parameter provided by the basic configuration information. A main difference from the configured grant type 1 lies in: In the configured grant type 2, the basic configuration information can be used only after being activated by using the DCI. Details are shown in FIG. 5. FIG. 6 shows some configuration parameters associated with the configured grant type 2. The periodicity T is also configured by using RRC signaling, and corresponds to a variable, namely, periodicity, in FIG. 3. Another difference from the configured grant type 1 lies in: In the configured grant type 1, information such as time-frequency resource information and the modulation and coding scheme is configured by using the RRC signaling. For example, rrc-ConfiguradUplinkGrant→timeDomainAllocation and rrc-ConfiguradUplinkGrant→frequencyDomainAllocation in FIG. 3 are for configuring the time-frequency resource used in the type 1. However, in the configured grant type 2, information such as time-frequency resource information and the modulation and coding scheme is indicated by the DCI that is for activation. In other words, for the configured grant type 2, basic parameters for transmission need to be jointly determined by using the RRC signaling and the DCI indication information.

1e;.5q(2) A modulation and coding scheme (modulation and coding scheme, MCS) is for describing a modulation scheme and a code rate that are for uplink data transmission. In a technology of some approaches, a modulation and coding scheme index table (modulation and coding scheme index table, MCS index table) is configured. Table 1 is a modulation and coding scheme index table. In Table 1, each row corresponds to one group of a modulation order and a code rate. A network device may select one row in the table by using indication information, and then notify a terminal device of a modulation scheme and a code rate that are for data transmission. Different modulation orders correspond to different modulation schemes. For example, when the modulation order $Q_m=2$, the modulation scheme is quadrature phase shift keying (quadrature phase shift keying, QPSK). When the modulation order $Q_m=4$, the modulation scheme is quadrature amplitude modulation (quadrature amplitude modulation, QAM) with 16 types of symbols. When the modulation order $Q_m=6$, the modulation scheme is quadrature amplitude modulation with 64 types of symbols. When the modulation order $Q_m=8$, the modulation scheme is quadrature amplitude modulation with 256 types of symbols. Usually, the modulation scheme and the code rate may be determined by using an MCS index. For example, if the network device notifies the terminal device that the MCS index is 3, the terminal device may determine, based on Table 1, that when the modulation order $Q_m=2$, the modulation scheme is the quadrature phase shift keying, and the code rate is 449/1024. Three tables are provided in the technology of some approaches to support wider application. The tables correspond to different reliability requirements. A specific table to be selected may be configured for the terminal device by using a higher layer configuration parameter.

TABLE 1

| MCS index ($I_{MCS}$) | Modulation order ($Q_m$) | Target code rate ($R_x$) [1024] | Spectral efficiency |
|---|---|---|---|
| 0 | 2 | 120 | 0.2344 |
| 1 | 2 | 193 | 0.3770 |
| 2 | 2 | 308 | 0.6016 |

TABLE 1-continued

| MCS index $(I_{MCS})$ | Modulation order $(Q_m)$ | Target code rate $(R_x)$ [1024] | Spectral efficiency |
|---|---|---|---|
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | | Reserved |
| 29 | 4 | | Reserved |
| 30 | 6 | | Reserved |
| 31 | 8 | | Reserved |

(3) Method for calculating a transport block size (transport block size, TBS): In a communication process, data sent from a media access control (media access control, MAC) layer to a physical layer is transmitted in a data block form. A device needs to determine how much data is included in a data block, in other words, determine a size of the data block. The size of the data block is an amount of data (a quantity of bits) carried on a specific resource. A process of calculating the TBS is as follows: First, a quantity $N_{RE}$ of resource elements (resource elements, REs) in one slot is determined, and a quantity of REs in a physical resource block (physical resource block, PRB) that are allocated to a physical uplink shared channel (physical uplink shared channel, PUSCH) or a physical downlink shared channel (physical downlink shared channel, PDSCH) is determined by using a formula $$N'_{RE} = N_{SC}^{RB} \cdot N_{symb}^{sh} - N_{DMRS}^{PRB} - N_{oh}^{PRB} \cdot N_{SC}^{RB} = 12$$

represents a quantity of carriers in one PRB in frequency domain;

$$N_{symb}^{sh}$$

represents a quantity of symbols of PUSCH or PDSCH allocation within the slot:

$$N_{DMRS}^{PRB}$$

represents a quantity of REs in one PRB that are occupied by a demodulation reference signal (demodulation reference signal, DMRS), where the quantity of REs includes a quantity of REs occupied by a DMRS overhead; and $$N_{oh}^{PRB}$$

is an overhead configured by using a parameter xOverhead in a higher layer parameter PUSCH-ServingCellConfig. Next, a total quantity of REs allocated to the PUSCH or the PDSCH is determined by using a formula $N_{RE}$=min (156, $N_{RE}'$)·$n_{PRB}$, where $n_{PRB}$ is a total quantity of PRBs. Then, an intermediate variable of information bits $N_{info}$ is obtained by using a formula $N_{info}=N_{RE}\cdot R\cdot Q_m\cdot v$, where $Q_m$ is a modulation order, R is a code rate, and v is a quantity of used layers. If $N_{info}\leq3824$, an intermediate number of the information bits $N_{info}$ is calculated by using a formula $$N'_{info} = \max\left(24, 2^n \cdot \left\lfloor \frac{N_{info}}{2^n} \right\rfloor\right), \text{ where } n = \max(3, \lfloor\log_2(N_{info})\rfloor - 6),$$

and a value not less than and nearest to $N_{info}'$ is obtained through table lookup in a protocol and is used as the TBS. If $N_{info}>3824$, an intermediate number of the information bits $N_{info}$ is calculated by using a formula $$N'_{info} = \max\left(3840, 2^n \times \text{round}\left(\frac{N_{info} - 24}{2^n}\right)\right),$$

$$\text{where } n = \lfloor\log_2(N_{info} - 24)\rfloor - 5.$$

If the code rate $$R \leq 1/4, TBS = 8 \cdot C \cdot \left\lceil \frac{N'_{info} + 24}{8 \cdot C} \right\rceil - 24, \text{ where } C = \left\lceil \frac{N'_{info} + 24}{3816} \right\rceil;$$

otherwise, $$TBS = 8 \cdot C \cdot \left\lceil \frac{N'_{info} + 24}{8 \cdot C} \right\rceil - 24, \text{ where } C = \left\lceil \frac{N'_{info} + 24}{8424} \right\rceil.$$

Figure 7:
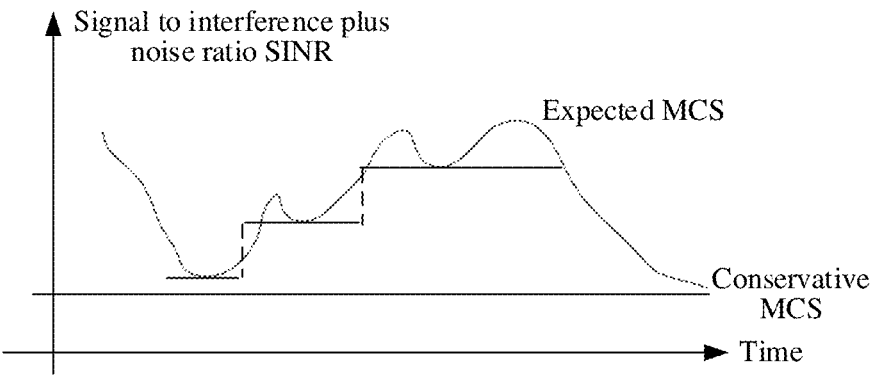
FIG. 7 is a schematic diagram of a change of a signal to interference plus noise ratio with time according to an embodiment of this application.

As described above, although latency of uplink transmission and overheads of control signaling can be effectively reduced through the configured grant (configured grant) scheduling, the configured grant scheduling cannot be self-adapted to an actual case, for example, a channel state change or an uplink data transmission requirement. FIG. 7 is a schematic diagram of a change of a signal to interference plus noise ratio with time. A vertical axis represents the signal to interference plus noise ratio (signal to interference plus noise ratio, SINR), and a horizontal axis represents the time, where the signal to interference plus noise ratio is a ratio of strength of a received desired signal to strength of a received interference signal (noise and interference). The configured grant scheduling means: The network device activates the uplink grant for the terminal device once, and the terminal device performs uplink transmission on the resource specified by the first-time uplink grant, until the terminal device receives the deactivation indication, to reduce overheads and the latency. Therefore, to ensure low latency and high reliability, only a modulation and coding scheme with high robustness, namely, a conservative MCS in FIG. 7, can be selected during modulation and coding scheme selection. This results in low spectrum utilization.

In addition, the network device cannot immediately learn of a requirement of uplink data of the terminal device, for example, an arrival moment of an uplink service, reliability of the uplink data, and a packet size of the uplink data. Therefore, the network device can semi-statically configure only a most conservative transmission parameter for the terminal device, to meet the low latency and the high reliability. However, this leads to a resource waste and low resource utilization. In a technology of some approaches, the network device can configure a same resource for a plurality of terminal devices, to improve resource utilization. However, when needing to transmit data simultaneously, the plurality of terminal devices may transmit the data on the same time-frequency resource. Consequently, interference is caused, and reliability is reduced. As a result, how to better balance the reliability and the resource utilization in the configured grant scheduling is a technical problem being resolved by persons skilled in the art.

Figure 8:
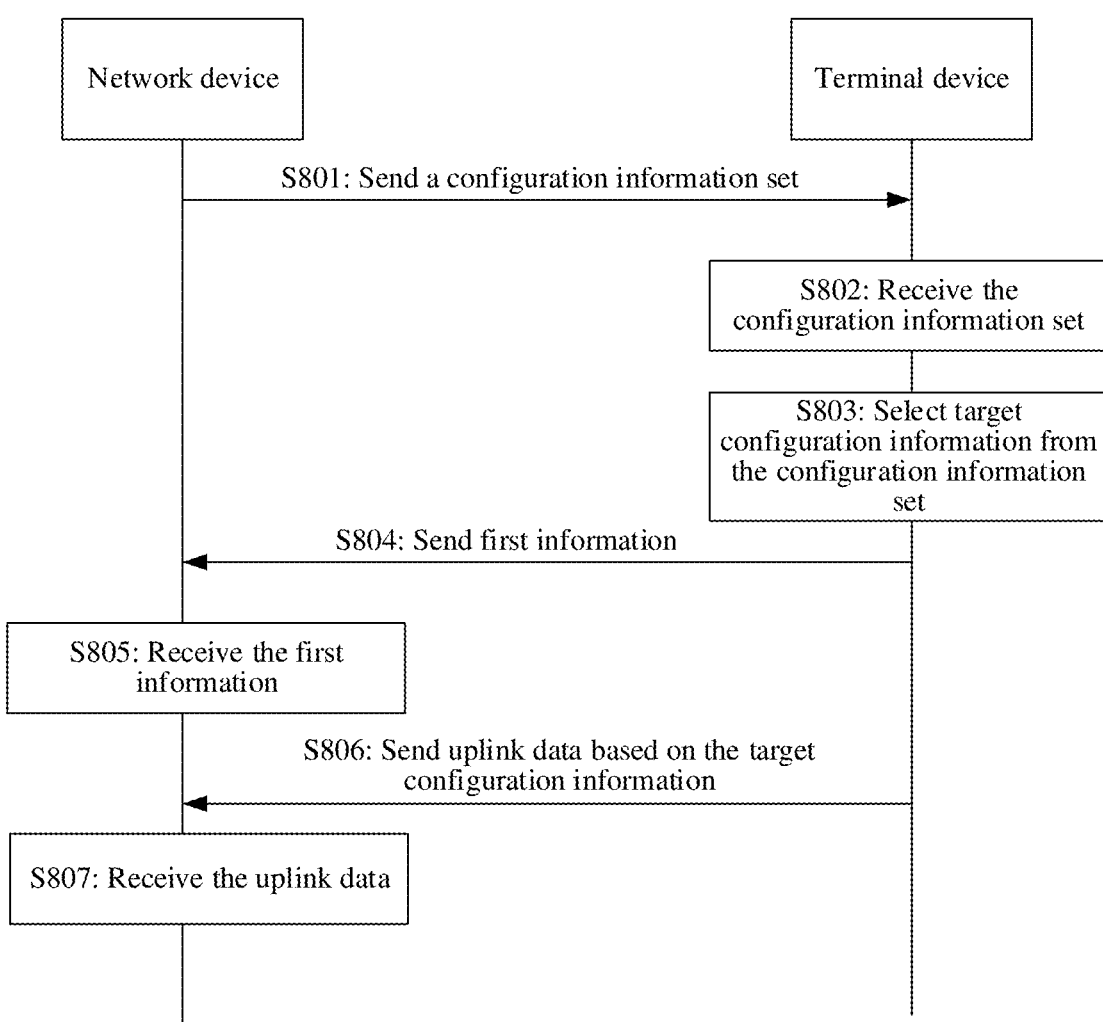
FIG. 8 is a schematic flowchart of a communication method according to an embodiment of this application.

FIG. 8 shows a communication method according to an embodiment of this application. The method includes the following steps.

Step S801: A network device sends a configuration information set to a terminal device.

Specifically, the configuration information set may include a time-frequency resource, an MCS, a precoding matrix, a periodicity, and the like that are for uplink data transmission. In this embodiment, an example in which the configuration information set includes the time-frequency resource and the MCS that are for the uplink data transmission is used for description. Another parameter in the configuration information set may also be implemented in a same manner.

In this embodiment, the configuration information set includes at least one candidate time-frequency resource and at least one candidate MCS. For example, it is assumed that a configuration 1 includes a first set of configurations and a second set of configurations, the first set of configurations includes a time-frequency resource 1 and an MCS 1, and the second set of configurations includes a time-frequency resource 2 and an MCS 2. In other words, the configuration 1 includes two candidate time-frequency resources and two candidate MCSs. A configuration 2 includes a third set of configurations and a fourth set of configurations: the third set of configurations includes the time-frequency resource 1, the time-frequency resource 2, and an MCS, in other words, the third set of configurations includes two candidate time-frequency resources and one candidate MCS; the fourth set of configurations includes a time-frequency resource 3, the MCS 1, and the MCS 2, in other words, the fourth set of configurations includes one candidate time-frequency resource and two candidate MCSs. In this case, the configuration information set may be one or more of the configuration 1, the third set of configurations in the configuration 2, and the fourth set of configurations in the configuration 2. For example, the configuration information set is the third set of configurations in the configuration 2, and the third set of configurations includes the time-frequency resource 1, the time-frequency resource 2, and the MCS. Then, the network device sends the configuration information set to the terminal device, and the third set of configurations includes the time-frequency resource 1, the time-frequency resource 2, and the MCS.

Step S802: The terminal device receives the configuration information set from the network device.

For example, it is assumed that the configuration information set is the third set of configurations, and the third set of configurations includes the time-frequency resource 1, the time-frequency resource 2, and the MCS. In this case, the terminal device receives the configuration information set, namely, the third set of configurations, from the network device, where the third set of configurations includes the time-frequency resource 1, the time-frequency resource 2, and the MCS.

Step S803: The terminal device selects target configuration information from the configuration information set.

Specifically, the target configuration information includes a first time-frequency resource and/or a modulation and coding scheme MCS. In this embodiment, the example in which the configuration information set includes the time-frequency resource and the MCS that are for the uplink data transmission is used for description. Therefore, the target configuration information includes the first time-frequency resource and/or the modulation and coding scheme MCS. The target configuration information may alternatively include another parameter. This is not limited in embodiments of this application.

In an implementation, the terminal device receives downlink control information DCI from the network device, where the DCI is for activating configuration information in the configuration information set. Then, the terminal device selects the target configuration information from the activated configuration information. Optionally, in this manner, a plurality of pieces of configuration information in the configuration information set may be activated by using the DCI. This manner corresponds to a configured grant type 2. After sending the configuration information set, the network device further needs to send the DCI to activate the configuration information in the configuration information set. Then, the terminal device selects the target configuration information from the activated configuration information, and transmits uplink data based on the target configuration information.

In an implementation, the terminal device selects the target configuration information from the configuration information set based on second information.

Specifically, the second information may include one or more of channel state information, reliability of the uplink data, size information of the uplink data, an arrival moment of the uplink data, and a first moment. The second information may be sent by the network device, may be specified in a protocol, or may be self-implemented by the terminal device. This is not limited in embodiments of this application. For example, the network device also sends the second information when sending the configuration information set. It is assumed that the configuration information set is the first set of configurations and the second set of configurations, the first set of configurations includes the time-frequency resource 1 and the MCS 1, the second set of configurations includes the time-frequency resource 2 and the MCS 2, and the second information is a first threshold corresponding to the first set of configurations and a second threshold corresponding to the second set of configurations. If a value corresponding to a current channel state is greater than the first threshold, the first set of configurations meets a transmission requirement. If a value corresponding to a current channel state is greater than the second threshold, the second set of configurations meets a transmission requirement. Certainly, the value corresponding to the current channel state and the second information may alternatively meet another relationship. For example, when the value corresponding to the current channel state is less than the first threshold corresponding to the first set of configurations, it is considered that the first set of configurations meets the transmission requirement; and when the value corresponding to the current channel state is less than the second threshold corresponding to the second set of configurations, it is considered that the second set of configurations meets the transmission requirement. This is not limited in embodiments of this application.

In an example, the second information is the channel state information, and the terminal device selects the target configuration information from the configuration information set based on the channel state information.

Specifically, the terminal device needs to estimate, based on the current channel state, an SINR for receiving the uplink data by the network device, and then selects the target configuration information from the configuration information set based on a target block error rate (block error rate, BLER) of the data transmission. For the current channel state, a downlink channel state may be first obtained by using a reference signal, for example, a channel state information-reference signal (channel state information-reference signal, CSI-RS). Due to uplink-downlink channel state symmetry the terminal device may determine a state of a channel for transmitting the uplink data, namely, the current channel state, by using the downlink channel state. The state of the channel for transmitting the uplink data is the channel state information in the second information. After the current channel state is obtained, the SINR for receiving the uplink data by the network device needs to be estimated based on the current channel state. There may be a plurality of implementations of estimating, based on the current channel state, the SINR for receiving the uplink data by the network device. For example, the network device may configure a correspondence between the current channel state and the SINR for the terminal device by using higher layer signaling. For another example, the SINR may be estimated by the terminal device, and the terminal device may predict, based on historical information, a relationship between the current channel state and the SINR for receiving the uplink data by the network device. It should be noted that in some scenarios such as a scenario in which interference is stable or a full coordination scenario, an interference magnitude is controllable or stable, and it is feasible to obtain the SINR by using the current channel state.

It is assumed that the configuration information set sent by the network device to the terminal device is the configuration 1, the configuration 1 includes the first set of configurations and the second set of configurations, the first set of configurations includes the time-frequency resource 1 and the MCS 1, and the second set of configurations includes the time-frequency resource 2 and the MCS 2. Assuming that the current channel state is H, and the terminal device estimates, based on the current channel state, that the SINR for receiving the uplink data by the network device is S, the following is a process of selecting the target configuration information from the configuration information set based on the target block error rate (BLER) of the data transmission, where the first set of configurations and the second set of configurations have the following features.

The first set of configurations includes the time-frequency resource 1 and the MCS 1, and corresponds to a poor channel state, to be specific, the first set of configurations is a configuration used when the SINR for receiving the uplink data by the network device is S0, where for example, S0=0 decibels (dB).

The second set of configurations includes the time-frequency resource 2 and the MCS 2, and corresponds to a good channel state, to be specific, the second set of configurations is a configuration used when the SINR for receiving the uplink data by the network device is S1, where for example, S1=10 decibels (dB).

That is, the second information is channel state information corresponding to each set of configurations, for example, S0=0 dB corresponding to the first set of configurations and S1=10 dB corresponding to the second set of configurations. In other words, when the second information is sent by the network device, the network device notifies the terminal device that the second information is S0=0 dB and S1=10 dB.

It is assumed that the terminal device estimates, based on the current channel state, that the SINR for receiving the uplink data by the network device is S=5 dB, and S is greater than the second information S0=0 dB and less than the second information S1=10 dB. When the channel state is good, a value of the SINR is large, and a small quantity of resources or a high MCS may be selected to transmit the data, to ensure high resource utilization. When the channel state is poor, a value of the SINR is small, and a large quantity of transmission resources or a low MCS may be used to transmit the data, to ensure reliability of the data transmission. Correspondingly, because the second information S0 corresponding to the first set of configurations is 0 dB, the value of the SINR is small, the channel state is poor, and a large quantity of transmission resources are needed to transmit the data, to ensure the reliability of the data transmission: because the second information S1 corresponding to the second set of configurations is 10 dB, the value of the SINR is large, the channel state is good, and a small quantity of transmission resources are needed to transmit the data, to ensure the high resource utilization. Therefore, to ensure low latency and high reliability, in the current channel state with S=5 dB, the value of the SINR is small, and the terminal device can select only the first set of configurations to transmit the uplink data. In other words, the time-frequency resource 1 and the MCS 1 are the target configuration information.

It is assumed that the terminal device estimates, based on the current channel state, that the SINR for receiving the uplink data by the network device is S=15 dB, and S is greater than the second information S0=0 dB and the second information S1=10 dB. When the channel state is good, a value of the SINR is large, and a small quantity of resources or a high MCS may be selected to transmit the data, to ensure high resource utilization. When the channel state is poor, a value of the SINR is small, and a large quantity of transmission resources or a low MCS may be used to transmit the data, to ensure reliability of the data transmission. Correspondingly, because the second information S0 corresponding to the first set of configurations is 0 dB, the value of the SINR is small, the channel state is poor, and a large quantity of transmission resources are needed to transmit the data, to ensure the reliability of the data transmission: because the second information S1 corresponding to the second set of configurations is 10 dB, the value of the SINR is large, the channel state is good, and a small quantity of transmission resources are needed to transmit the data, to ensure the high resource utilization. Because S=15 dB, the value of the SINR is large, the current channel state is good, and the terminal device may use a small quantity of transmission resources to meet a reliability requirement and ensure the high resource utilization. Therefore, the terminal device selects the second set of configurations to transmit the uplink data. In other words, the time-frequency resource 2 and the MCS 2 are the target configuration information.

In the foregoing method, the terminal device may select different target configuration information based on different channel states to transmit the uplink data, to better adapt to the channel state. For example, when a channel condition is good, the terminal device may transmit data of a same size by using a high MCS, to improve the resource utilization. When a channel condition is poor, the low latency and the high reliability can still be ensured.

It is assumed that the configuration information set sent by the network device to the terminal device is the third set of configurations in the configuration 2, and the third set of configurations includes the time-frequency resource 1, the time-frequency resource 2, and the MCS. Assuming that the current channel state is H, and the terminal device estimates, based on the current channel state, that the SINR for receiving the uplink data by the network device is S, the following is a process of selecting the target configuration information from the configuration information set based on the target block error rate (BLER) of the data transmission, where the third set of configurations has the following features.

A combination of the time-frequency resource 1 and the MCS corresponds to a poor channel state, to be specific, the combination is a configuration used when the SINR for receiving the uplink data by the network device is S0, where for example, S0=0 decibels (dB).

A combination of the time-frequency resource 2 and the MCS corresponds to a good channel state, to be specific, the combination is a configuration used when the SINR for receiving the uplink data by the network device is S1, where for example, S1=10 decibels (dB).

That is, the second information is channel state information corresponding to each set of configurations, for example, S0=0 dB corresponding to the first set of configurations and S1=10 dB corresponding to the second set of configurations. In other words, when the second information is sent by the network device, the network device notifies the terminal device that the second information is S0=0 dB and S1=10 dB.

It is assumed that the terminal device estimates, based on the current channel state, that the SINR for receiving the uplink data by the network device is S=5 dB, and S is greater than the second information S0=0 dB and less than the second information S1=10 dB. When the channel state is good, a value of the SINR is large, and a small quantity of resources may be selected to transmit the data, to ensure high resource utilization. When the channel state is poor, a value of the SINR is small, and a large quantity of transmission resources may be used to transmit the data, to ensure reliability of the data transmission. Correspondingly, because the second information S0 corresponding to the combination of the time-frequency resource 1 and the MCS is 0 dB, the value of the SINR is small, the channel state is poor, and a large quantity of transmission resources are needed to transmit the data, to ensure the reliability of the data transmission; because the second information S1 corresponding to the combination of the time-frequency resource 2 and the MCS is 10 dB, the value of the SINR is large, the channel state is good, and a small quantity of transmission resources are needed to transmit the data, to ensure the high resource utilization. Therefore, to ensure low latency and high reliability, in the current channel state with S=5 dB, the value of the SINR is small, and the terminal device can select only the combination of the time-frequency resource 1 and the MCS to transmit the uplink data.

In other words, the combination of the time-frequency resource 1 and the MCS is the target configuration information.

It is assumed that the terminal device estimates, based on the current channel state, that the SINR for receiving the uplink data by the network device is S=15 dB, and S is greater than the second information S0=0 dB and the second information S1=10 dB. When the channel state is good, a value of the SINR is large, and a small quantity of resources may be selected to transmit the data, to ensure high resource utilization. When the channel state is poor, a value of the SINR is small, and a large quantity of transmission resources may be used to ensure reliability. Correspondingly, because the second information S0 corresponding to the combination of the time-frequency resource 1 and the MCS is 0 dB, the value of the SINR is small, the channel state is poor, and a large quantity of transmission resources are needed to transmit the data, to ensure the reliability of the data transmission: because the second information S1 corresponding to the combination of the time-frequency resource 2 and the MCS is 10 dB, the value of the SINR is large, the channel state is good, and a small quantity of transmission resources are needed to transmit the data, to ensure the high resource utilization. Because S=15 dB, the value of the SINR is large, the current channel state is good, and the terminal device may use a small quantity of transmission resources to meet a reliability requirement and ensure the high resource utilization. Therefore, the terminal device selects the combination of the time-frequency resource 2 and the MCS to transmit the uplink data. In other words, the combination of the time-frequency resource 2 and the MCS is the target configuration information.

In the foregoing method, the terminal device may select an appropriate resource based on the channel state when the MCS is the same. For example, when a channel condition is good, the terminal device may select a small quantity of resources to transmit the data. When a channel condition is poor, a large quantity of transmission resources may be used to ensure the reliability. For example, the data is repeatedly transmitted on a redundant resource to ensure the low latency and the high reliability.

It is assumed that the configuration information set sent by the network device to the terminal device is the third set of configurations in the configuration 2, and the third set of configurations includes the time-frequency resource 1, the time-frequency resource 2, and the MCS. Assuming that the current channel state is H, and the terminal device estimates, based on the current channel state, that the SINR for receiving the uplink data by the network device is S, the following is a process of selecting the target configuration information from the configuration information set based on the target block error rate (BLER) of the data transmission, where the third set of configurations has the following features.

A combination of the time-frequency resource 1 and the MCS corresponds to a good channel state, to be specific, the combination is a configuration used when the SINR for receiving the uplink data by the network device is S0, where for example, S0=10 decibels (dB).

A combination of the time-frequency resource 1+the time-frequency resource 2 (where it indicates that the time-frequency resource 1 and the time-frequency resource 2 are both used) and the MCS corresponds to a poor channel state, to be specific, the combination is a configuration used when the SINR for receiving the uplink data by the network device is S1, where for example, S1=0 decibels (dB).

That is, the second information is channel state information corresponding to each set of configurations, for example, S0=10 dB corresponding to the first set of configurations and S1=0 dB corresponding to the second set of configurations. In other words, when the second information is sent by the network device, the network device notifies the terminal device that the second information is S0=10 dB and S1=0 dB.

It is assumed that the terminal device estimates, based on the current channel state, that the SINR for receiving the uplink data by the network device is S=5 dB, and S is greater than the second information S1=0 dB and less than the second information S0=10 dB. When the channel state is good, a value of the SINR is large, and a small quantity of resources may be selected to transmit the data, to ensure high resource utilization. When the channel state is poor, a value of the SINR is small, and a large quantity of transmission resources may be used to transmit the data, to ensure reliability of the data transmission. Correspondingly, because the second information S0 corresponding to the combination of the time-frequency resource 1 and the MCS is 10 dB, the value of the SINR is large, the channel state is good, and a small quantity of transmission resources are needed to transmit the data, to ensure the high resource utilization: because the second information S1 corresponding to the combination of the time-frequency resource 1+the time-frequency resource 2 and the MCS is 0 dB, the value of the SINR is small, the channel state is poor, and a large quantity of transmission resources are needed to transmit the data, to ensure the reliability of the data transmission. Therefore, to ensure low latency and high reliability, in the current channel state with S=5 dB, the value of the SINR is small, and the terminal device needs a large quantity of transmission resources, and selects the combination of the time-frequency resource 1+the time-frequency resource 2 and the MCS to transmit the uplink data. In other words, the combination of the time-frequency resource 1+the time-frequency resource 2 and the MCS is the target configuration information.

It is assumed that the terminal device estimates, based on the current channel state, that the SINR for receiving the uplink data by the network device is S=15 dB, and S is greater than the second information S0=10 dB and the second information S1=0 dB. When the channel state is good, a value of the SINR is large, and a small quantity of resources may be selected to transmit the data to ensure high resource utilization. When the channel state is poor, a value of the SINR is small, and a large quantity of transmission resources may be used to ensure reliability of the data transmission. Correspondingly, because the second information S0 corresponding to the combination of the time-frequency resource 1 and the MCS is 10 dB, the value of the SINR is large, the channel state is good, and a small quantity of transmission resources are needed to transmit the data, to ensure the high resource utilization; because the second information S1 corresponding to the combination of the time-frequency resource 1+the time-frequency resource 2 and the MCS is 0 dB, the value of the SINR is small, the channel state is poor, and a large quantity of transmission resources are needed to transmit the data, to meet the reliability of the data transmission. Because S=15 dB, the value of the SINR is large, the current channel state is good, and the terminal device may use a small quantity of transmission resources to meet a reliability requirement and ensure the high resource utilization. Therefore, the terminal device selects the combination of the time-frequency resource 1 and the MCS to transmit the uplink data. In other words, the combination of the time-frequency resource 1 and the MCS is the target configuration information.

In the foregoing method, the terminal device may select an appropriate resource based on the channel state when the MCS is the same. For example, when a channel condition is good, the terminal device may select a small quantity of resources to transmit the data. When a channel condition is poor, a large quantity of transmission resources may be used to ensure the reliability. For example, the data is repeatedly transmitted on a redundant resource to ensure the low latency and the high reliability.

It is assumed that the configuration information set sent by the network device to the terminal device is the fourth set of configurations in the configuration 2, and the fourth set of configurations includes the time-frequency resource 3, the MCS 1, and the MCS 2. Assuming that the current channel state is H, and the terminal device estimates, based on the current channel state, that the SINR for receiving the uplink data by the network device is S, the following is a process of selecting the target configuration information from the configuration information set based on the target block error rate (BLER) of the data transmission, where the fourth set of configurations has the following features.

A combination of the time-frequency resource 3 and the MCS 1 corresponds to a poor channel state, to be specific, the combination is a configuration used when the SINR for receiving the uplink data by the network device is S0, where for example, S0=0 decibels (dB).

A combination of the time-frequency resource 3 and the MCS 2 corresponds to a good channel state, to be specific, the combination is a configuration used when the SINR for receiving the uplink data by the network device is S1, where for example, S1=10 decibels (dB).

That is, the second information is channel state information corresponding to each set of configurations, for example, S0=0 dB corresponding to the first set of configurations and S1=10 dB corresponding to the second set of configurations. In other words, when the second information is sent by the network device, the network device notifies the terminal device that the second information is S0=0 dB and S1=10 dB.

It is assumed that the terminal device estimates, based on the current channel state, that the SINR for receiving the uplink data by the network device is S=5 dB, and S is greater than the second information S0=0 dB and less than the second information S1=10 dB. When the channel state is good, a value of the SINR is large, and a high MCS may be selected to transmit the data, to ensure high resource utilization. When the channel state is poor, a value of the SINR is small, and a low MCS may be used to transmit the data, to ensure reliability of the data transmission. Correspondingly, because the second information S0 corresponding to the combination of the time-frequency resource 3 and the MCS 1 is 0 dB, the value of the SINR is small, the channel state is poor, and a low MCS may be used to transmit the data, to ensure the reliability of the data transmission; because the second information S1 corresponding to the combination of the time-frequency resource 3 and the MCS 2 is 10 dB, the value of the SINR is large, the channel state is good, and a high MCS may be used to transmit the data, to ensure the high resource utilization. Therefore, to ensure low latency and high reliability, in the current channel state with S=5 dB, the value of the SINR is small, and the terminal device can select only the combination of the time-frequency resource 3 and the MCS 1 to transmit the uplink data. In other words, the combination of the time-frequency resource 3 and the MCS 1 is the target configuration information.

It is assumed that the terminal device estimates, based on the current channel state, that the SINR for receiving the uplink data by the network device is S=15 dB, and S is greater than S0=0 dB and S1=10 dB. When the channel state is good, a value of the SINR is large, and a high MCS may be selected to transmit the data, to ensure high resource utilization. When the channel state is poor, a value of the SINR is small, and a low MCS may be used to transmit the data, to ensure reliability of the data transmission. Correspondingly, because the second information S0 corresponding to the combination of the time-frequency resource 3 and the MCS 1 is 0 dB, the value of the SINR is small, the channel state is poor, and a low MCS is needed to transmit the data, to ensure the reliability of the data transmission: because the second information S1 corresponding to the combination of the time-frequency resource 3 and the MCS 2 is 10 dB, the value of the SINR is large, the channel state is good, and a high MCS is needed to transmit the data, to ensure the high resource utilization. Because S=15 dB, the value of the SINR is large, the current channel state is good, and the terminal device may use a high MCS to meet a reliability requirement and ensure the high resource utilization. Therefore, the terminal device selects the combination of the time-frequency resource 3 and the MCS 2 to transmit the uplink data. In other words, the combination of the time-frequency resource 3 and the MCS 2 is the target configuration information.

In the foregoing method, the terminal device may select different MCSs based on the channel state when the time-frequency resource is the same, to transmit the data, so that the terminal device can transmit more data when a channel condition is good, to improve the resource utilization.

In another example, the second information is the reliability of the uplink data, and the terminal device selects target configuration information from the configuration information set based on the reliability of the uplink data.

Specifically, an example in which the uplink data has two types of reliability is used in this embodiment. For example, assuming that reliability 1 corresponds to a high reliability requirement on the uplink data, that is, the BLER=$10^{-5}$, a low MCS or a large quantity of transmission resources are needed to transmit the uplink data, to ensure reliability of the data transmission: reliability 2 corresponds to a low reliability requirement on the uplink data, that is, the BLER=$10^{-3}$, a high MCS or a small quantity of transmission resources are needed to transmit the uplink data, to ensure resource utilization of the data transmission.

It is assumed that the configuration information set sent by the network device to the terminal device is the configuration 1, the configuration 1 includes the first set of configurations and the second set of configurations, the first set of configurations includes the time-frequency resource 1 and the MCS 1, and the second set of configurations includes the time-frequency resource 2 and the MCS 2. The first set of configurations corresponds to the high reliability requirement on the uplink data, that is, the BLER=$10^{-5}$, and the second set of configurations corresponds to the low reliability requirement on the uplink data, that is, the BLER=$10^{-3}$. Robustness corresponding to the first set of configurations and robustness corresponding to the second set of configurations may be indicated by the network device to the terminal device when the network device sends the configuration information set to the terminal device, or may be implicitly indicated by the network device to the terminal device. For example, in a possible implicit manner, a low MCS corresponds to high robustness, and a high MCS corresponds to low robustness.

To be specific, the second information is reliability corresponding to each set of configurations, for example, the reliability, namely, the BLER=$10^{-5}$, corresponding to the first set of configurations and the reliability, namely, the BLER=$10^{-3}$, corresponding to the second set of configurations. In other words, when the second information is sent by the network device, the network device notifies the terminal device that the second information is the BLER=$10^{-5}$ and the BLER=$10^{-3}$.

If the reliability of the currently arrived uplink data is the BLER=$10^{-5}$, and is the same as the second information, namely, the BLER=$10^{-5}$, the first set of configurations is selected to transmit the uplink data. In other words, the time-frequency resource 1 and the MCS 1 are the target configuration information. If the reliability of the currently arrived uplink data is the BLER=$10^{-3}$ and is the same as the second information, namely, the BLER=$10^{-3}$, the second set of configurations is selected to transmit the uplink data. In other words, the time-frequency resource 2 and the MCS 2 are the target configuration information.

In the foregoing method, the terminal device may select the target configuration information based on the reliability of the uplink data, and transmit the uplink data with low reliability by using a small quantity of resources or a high MCS, to improve the resource utilization.

Assuming that the network device sends the third set of configurations in the configuration 2 to the terminal device, and the third set of configurations includes the time-frequency resource 1, the time-frequency resource 2, and the MCS; or assuming that the network device sends the fourth set of configurations in the configuration 2 to the terminal device, and the fourth set of configurations includes the time-frequency resource 3, the MCS 1, and the MCS 2, the terminal device may also select the target configuration information from the configuration information set based on the reliability of the uplink data in the same manner. Details are not described herein again.

In another example, the second information is the size information of the uplink data, and the terminal device selects the target configuration information from the configuration information set based on the size information of the uplink data.

Specifically, the terminal device needs to upload uplink data of different sizes at different moments. For example, the terminal device needs to transmit 32-byte (byte) uplink data at a moment 1, and needs to transmit 100-byte (byte) uplink data at a moment 2. The configuration information set sent by the network device to the terminal device is the configuration 1, the configuration 1 includes the first set of configurations and the second set of configurations, the first set of configurations includes the time-frequency resource 1 and the MCS 1, and the second set of configurations includes the time-frequency resource 2 and the MCS 2. When the second information is sent by the network device, the network device notifies the terminal device that a transport block size corresponding to the first set of configurations is TB1=50 bytes, in other words, the second information is TB1=50 bytes; and a transport block size corresponding to the second set of configurations is TB2=150 bytes, in other words, the second information is TB2=150 bytes. That is, the second information is TB1=50 bytes and TB2=150 bytes. When the second information is self-implemented by the terminal device, after obtaining the first set of configurations, the terminal device determines, based on the time-frequency resource 1 and the MCS 1 by using a transport block size calculation method, that a transport block size corresponding to the first set of configurations is TB1, where TB1=50 bytes; and after obtaining the second set of configurations, the terminal device determines, based on the time-frequency resource 2 and the MCS 2 by using the transport block size calculation method, that a transport block size corresponding to the second set of configurations is TB2, where TB2=150 bytes. That is, the second information is TB1=50 bytes and TB2=150 bytes.

To be specific, the second information is size information that is of the uplink data and that corresponds to each set of configurations, for example, TB1=50 bytes corresponding to the first set of configurations and TB2=150 bytes corresponding to the second set of configurations. The second information is TB1=50 bytes and TB2=150 bytes.

Assuming that a size of the current uplink data is 32 bytes, and is less than the second information TB1=50 bytes, the terminal device selects the first set of configurations to transmit the uplink data. In other words, the time-frequency resource 1 and the MCS 1 are the target configuration information.

Assuming that a size of the current uplink data is 100 bytes, and is greater than the second information TB1=50 bytes and less than the second information TB2=150 bytes, the terminal device selects the second set of configurations to transmit the uplink data. In other words, the time-frequency resource 2 and the MCS 2 are the target configuration information.

In the foregoing method, the terminal device selects different transmission resources or different MCSs based on the size of the uplink data to transmit the data, so that resources can be used more effectively. For example, when the uplink data is small, only a small quantity of resources need to be selected to transmit the data. In this way, resources can be saved.

In another example, the second information is the first moment. The terminal device sends first information to the network device if the arrival moment of the uplink data is before the first moment.

Optionally, the first moment is a time point, and may be determined by using a periodicity and an offset. For example, the periodicity is three slots, and the offset is three symbols. This indicates that the first moment is a moment of the third symbol in every three slots.

Optionally, the first moment may be determined by using a first time interval and first configuration information. Optionally, the first moment is a time point before a piece of configuration information in the configuration information set, a time period between the first moment and a start moment of the first configuration information is the first time interval, and the first configuration information is configuration information earliest in time domain in the configuration information set. Optionally, an end moment of the first time interval is the same as the start moment of the first configuration information.

Figures 9, 10:
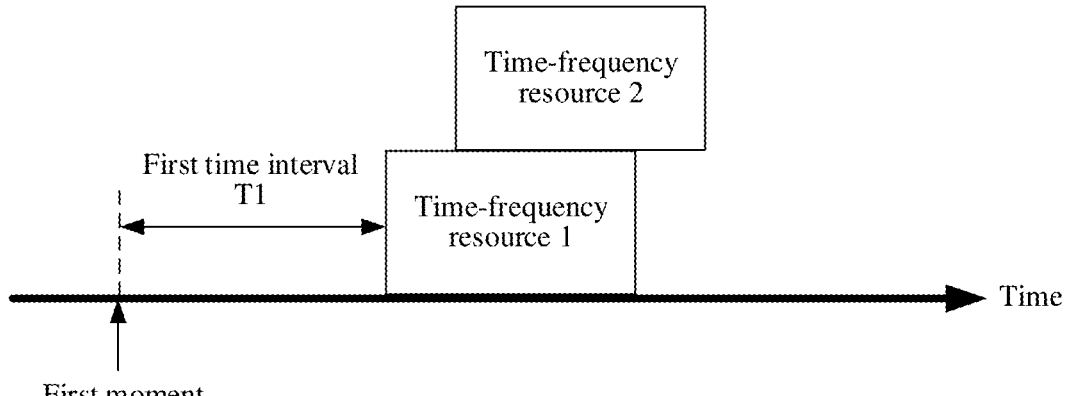
FIG. 9 is a schematic diagram of a first moment according to an embodiment of this application.
FIG. 10 is a schematic diagram of a first moment according to an embodiment of this application.

In an example, it is assumed that the configuration information set includes the configuration 1 and the configuration 2, the configuration 1 includes the time-frequency resource 1 and the MCS 1, and the configuration 2 includes the time-frequency resource 2 and the MCS 2. As shown in FIG. 9, a time domain position corresponding to the time-frequency resource 1 is before that corresponding to the time-frequency resource 2. In other words, the time-frequency resource 1 is the first configuration information. In this case, the first moment is a time point before the time-frequency resource 1, and a time period between the first moment and a start moment of the time-frequency resource 1 is a first time interval T1. In other words, an end moment of the first time interval T1 is the start moment of the time-frequency resource 1. It is assumed that the configuration information set includes the configuration 1 and the configuration 2, the configuration 1 includes the time-frequency resource 1 and the MCS 1, and the configuration 2 includes the time-frequency resource 2 and the MCS 2. As shown in FIG. 10, a time domain position corresponding to the time-frequency resource 1 is the same as that corresponding to the time-frequency resource 2. In other words, the time-frequency resource 1 or the time-frequency resource 2 is the first configuration information. In this case, the first moment is a time point before the time-frequency resource 1 or the time-frequency resource 2, and a time period between the first moment and a start moment of the time-frequency resource 1 is a first time interval T2. In other words, an end moment of the first time interval T2 is the start moment of the time-frequency resource 1 or the time-frequency resource 2.

Step S804: The terminal device sends the first information to the network device.

Specifically, the first information indicates the target configuration information and/or configuration information other than the target configuration information in the configuration information set, and is transmitted on a physical uplink control channel (physical uplink control channel, PUCCH) or a physical uplink shared channel (physical uplink shared channel, PUSCH).

In an example, the first information may be the target configuration information. For example, if the time-frequency resource 2 and the MCS 2 are the target configuration information, the terminal device sends, to the network device, information including the time-frequency resource 2 and the MCS 2. Correspondingly, the network device can determine the time-frequency resource 2 and the MCS 2 based on the information including the time-frequency resource 2 and the MCS 2. In another example, the first information may be indication information indicating the target configuration information. For example, it is assumed that a rule is predefined by the network device and the terminal device, the configuration information set is the configuration 1, the configuration 1 includes the first set of configurations and the second set of configurations, the first set of configurations includes the time-frequency resource 1 and the MCS 1, and the second set of configurations includes the time-frequency resource 2 and the MCS 2. If the terminal device sends 0 to the network device, where 0 indicates the time-frequency resource 2 and the MCS 2, the network device correspondingly determines the time-frequency resource 2 and the MCS 2 as the target configuration information. If the terminal device sends 1 to the network device, where 1 indicates the time-frequency resource 1 and the MCS 1, the network device correspondingly determines the time-frequency resource 1 and the MCS 1 as the target configuration information.

In another example, the first information may be the configuration information other than the target configuration information in the configuration information set. For example, it is assumed that the configuration information set includes the configuration 1 and the configuration 2, the configuration 1 includes the time-frequency resource 1 and the MCS 1, and the configuration 2 includes the time-frequency resource 2 and the MCS 2. In this case, the terminal device sends the time-frequency resource 1 and the MCS 1 to the network device. After receiving the time-frequency resource 1 and the MCS 1, the network device determines that the target configuration information is the time-frequency resource 2 and the MCS 2. In another example, the first information may be indication information indicating the configuration information other than the target configuration information in the configuration information set. For example, it is assumed that the configuration information set includes the configuration 1 and the configuration 2, the configuration 1 includes the time-frequency resource 1 and the MCS 1, and the configuration 2 includes the time-frequency resource 2 and the MCS 2. The terminal device sends 0 to the network device, where 0 indicates the configuration information other than the target configuration information in the configuration information set, namely, the time-frequency resource 1 and the MCS 1. Correspondingly, the network device determines that the target configuration information is the time-frequency resource 2 and the MCS 2. The terminal device sends 1 to the network device, where 1 indicates the configuration information other than the target configuration information in the configuration information set, namely, the time-frequency resource 2 and the MCS 2. Correspondingly, the network device determines that the target configuration information is the time-frequency resource 1 and the MCS 1.

In an implementation, the first information includes or indicates a first time period, and indicates that the uplink data is to be sent to the network device within the first time period based on the target configuration information.

Figure 11:
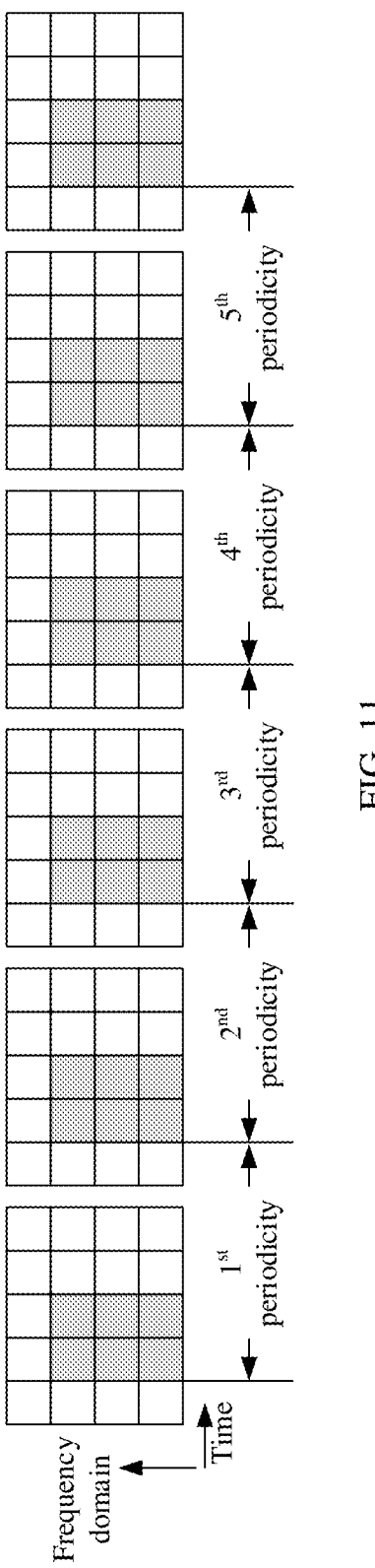
FIG. 11 is a schematic diagram of a first time period according to an embodiment of this application.

Specifically, the first time period may be several consecutive periodicities T. For example, as shown in FIG. 11, the first time period is five consecutive periodicities. In this case, the first information indicates that the terminal device is to send the uplink data to the network device based on the target configuration information within the five consecutive periodicities.

Optionally, the first time period may be a quantity of symbols, a quantity of slots, or another parameter for describing a time length. This is not limited in this embodiment of this application.

Optionally, the uplink data is sent to the network device within the first time period based on the target configuration information. It is noted in the present disclosure that configuration information for sending the data within the first time period is the target configuration information. However, specifically, same uplink data or different uplink data may be sent. This is not specified.

In this manner, the terminal device does not need to send the first information to the network device in each periodicity, so that frequency of sending the first information is reduced, and resources are saved.

In an implementation, the terminal device sends the first information to the network device on a second time-frequency resource. Specifically, the second time-frequency resource is related to the target configuration information.

In an implementation, the terminal device sends the first information to the network device on a second time-frequency resource. Specifically, the second time-frequency resource is related to the configuration information set.

For example, there is determined relativity between a time domain position of the second time-frequency resource and the configuration information earliest in time domain in the configuration information set.

In an implementation, the terminal device sends the first information to the network device on a second time-frequency resource. Specifically, the second time-frequency resource is related to second configuration information in the configuration information set.

Optionally, the second configuration information may be the configuration information earliest in time domain in the configuration information set. Optionally, the second configuration information may be configuration information latest in time domain in the configuration information set. Optionally, the second configuration information may be configuration information occupying widest frequency domain bandwidth in the configuration information set.

In the foregoing solution, the second time-frequency resource may be determined by using the configuration information set instead of additional indication information.

In another implementation, the terminal device receives fourth information from the network device.

Specifically, the fourth information indicates a third time-frequency resource. In an example, the fourth information may be an index. Correspondingly, the third time-frequency resource is determined based on the index. Alternatively, there may be another indication manner. This is not limited in this embodiment of this application. Correspondingly, the terminal device may determine the third time-frequency resource based on the fourth information, and then send the first information to the network device on the third time-frequency resource.

In another implementation, the terminal device sends the first information to the network device on a fourth time-frequency resource. Specifically, the fourth time-frequency resource is a time-frequency resource preallocated to send uplink control information (uplink control information, UCI) by the terminal device. When the UCI is a channel quality indicator (channel quality indicator, CQI), where the CQI is obtained by the terminal device by measuring the downlink channel state by using the channel state information-reference signal CSI-RS, and the downlink channel state is measured by using the channel state information-reference signal CSI-RS, downlink channel state information may be for the terminal device to select the target configuration information. In other words, the selected target configuration information may be implicitly notified by using CQI information. In an example, the configuration information set includes two pieces of configuration information, namely, configuration information 1 and configuration information 2. If CQI index information indicated by the CQI information is less than 8, it indicates that the target configuration information is the configuration information 1 in the configuration information set. Another value indicates that the target configuration information is the configuration information 2. In another example, the configuration information set includes three pieces of configuration information, namely, configuration information 1, configuration information 2, and configuration information 3. If CQI index information indicated by the CQI information is less than 3, it indicates that the target configuration information is the configuration information 1. A value greater than or equal to 3 and less than 8 indicates that the target configuration information is the configuration information 2. Another case indicates that the target configuration information is the configuration information 3.

In this manner, the first information may be implicitly carried in UCI information, and no additional resource is needed for transmission.

Figure 12:
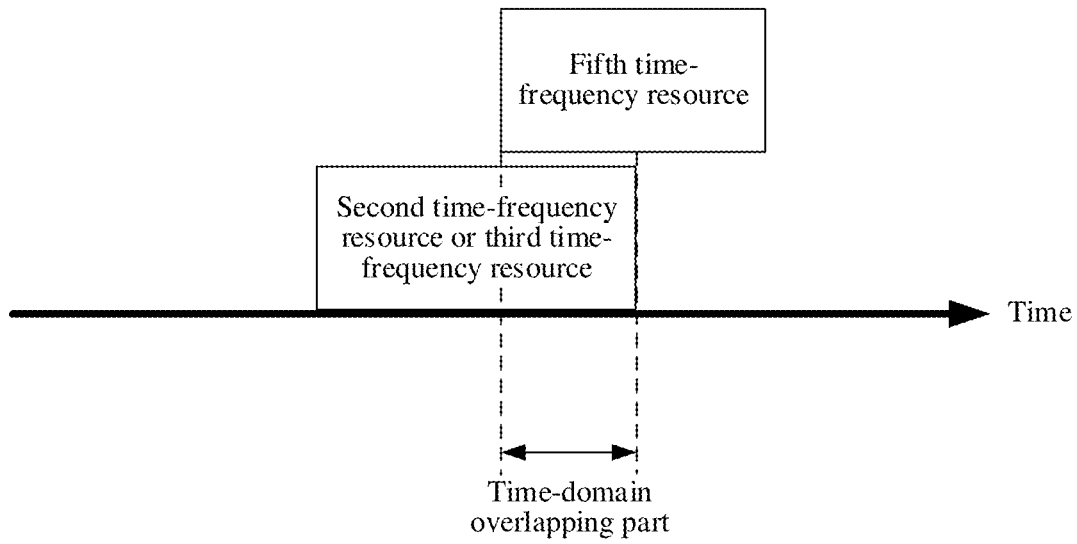
FIG. 12 is a schematic diagram of overlapping between a second time-frequency resource or a third time-frequency resource and a fifth time-frequency resource in time domain according to an embodiment of this application.

In some embodiments, when the second time-frequency resource or the third time-frequency resource overlaps a fifth time-frequency resource in time domain or frequency domain, in other words, when a time-frequency resource allocated by the network device to send the first information overlaps, in time domain or frequency domain, a time-frequency resource allocated by the network device to send the UCI, refer to FIG. 12. FIG. 12 shows a case in which the second time-frequency resource or the third time-frequency resource overlaps the fifth time-frequency resource in time domain, where the second time-frequency resource or the third time-frequency resource is the time-frequency resource allocated by the network device to send the first information, and the fifth time-frequency resource is the time-frequency resource allocated by the network device to send the UCI.

In an example, the terminal device sends the first information to the network device on the second time-frequency resource or the third time-frequency resource. For example, the terminal device may receive sixth indication information, and the sixth indication information may be sent by the network device. The sixth indication information indicates the terminal device to send the first information in the foregoing case (to be specific, when the resource for sending the first information overlaps the resource for sending the UCI). Optionally, the sixth indication information may be a priority. If the sixth indication information indicates that a priority of the first information is higher than that of the UCI, the terminal device sends the first information to the network device on the second time-frequency resource or the third time-frequency resource.

In another example, the terminal device sends the uplink control information UCI to the network device on the second time-frequency resource or the third time-frequency resource. For example, the terminal device receives sixth indication information, where the sixth indication information may be sent by the network device, and indicates the terminal device to send the UCI in the foregoing case. Optionally, the sixth indication information may be a priority. If the sixth indication information indicates that a priority of the UCI is higher than that of the first information, the terminal device sends the UCI to the network device on the second time-frequency resource or the third time-frequency resource.

In another example, the terminal device sends the first information and the uplink control information UCI to the network device on the second time-frequency resource or the third time-frequency resource.

In another example, the terminal device sends the first information to the network device on the fifth time-frequency resource. For example, the terminal device receives sixth indication information, and the sixth indication information may be sent by the network device. The sixth indication information indicates the terminal device to send the first information in this case. Optionally, the sixth indication information may be a priority. If the sixth indication information indicates that a priority of the first information is higher than that of the UCI, the terminal device sends the first information to the network device on the fifth time-frequency resource.

In another example, the terminal device sends the uplink control information UCI to the network device on the fifth time-frequency resource. For example, the terminal device receives sixth indication information, and the sixth indication information may be sent by the network device. The sixth indication information indicates the terminal device to send the UCI in this case. Optionally, the sixth indication information may be a priority. If the sixth indication information indicates that a priority of the UCI is higher than that of the first information, the terminal device sends the UCI to the network device on the fifth time-frequency resource.

In another example, the terminal device sends the first information and the uplink control information UCI to the network device on the fifth time-frequency resource.

In another example, the terminal device sends the first information to the network device on a sixth time-frequency resource, where the sixth time-frequency resource is a new time-frequency resource. For example, the terminal device receives sixth indication information, and the sixth indication information may be sent by the network device. The sixth indication information indicates the terminal device to send the first information in the foregoing case. Optionally, the sixth indication information may be a priority. If the sixth indication information indicates that a priority of the first information is higher than that of the UCI, the terminal device sends the first information on the sixth time-frequency resource.

In another example, the terminal device sends the uplink control information UCI to the network device on a sixth time-frequency resource, where the sixth time-frequency resource is a new time-frequency resource. For example, the terminal device receives sixth indication information, and the sixth indication information may be sent by the network device. The sixth indication information indicates the terminal device to send the UCI in this case. The sixth information may be a priority. If the sixth indication information indicates that a priority of the UCI is higher than that of the first information, the UCI is sent on the sixth time-frequency resource.

In another example, the terminal device sends the first information and the uplink control information UCI to the network device on a sixth time-frequency resource, where the sixth time-frequency resource is a new time-frequency resource.

Step S805: The network device receives the first information from the terminal device.

In some embodiments, after receiving the first information from the terminal device, the network device releases a resource indicated by the configuration information other than the target configuration information in the configuration information set.

For example, it is assumed that the configuration information set is the configuration 1, the configuration 1 includes the first set of configurations and the second set of configurations, the first set of configurations includes the time-frequency resource 1 and the MCS 1, the second set of configurations includes the time-frequency resource 2 and the MCS 2, and the target configuration information is the time-frequency resource 1 and the MCS 1. In this case, the network device releases a resource indicated by the time-frequency resource 2 and the MCS 2.

In an implementation, after receiving the first information from the terminal device, the network device allocates, to another terminal device, the resource indicated by the configuration information other than the target configuration information in the configuration information set.

For example, it is assumed that the configuration information set is the configuration 1, the configuration 1 includes the first set of configurations and the second set of configurations, the first set of configurations includes the time-frequency resource 1 and the MCS 1, the second set of configurations includes the time-frequency resource 2 and the MCS 2, and the target configuration information is the time-frequency resource 1 and the MCS 1. In this case, the network device allocates the time-frequency resource 2 and the MCS 2 to the another terminal device.

Step S806: The terminal device sends the uplink data to the network device based on the target configuration information.

For example, the target configuration information is the time-frequency resource 1 and the MCS 1. Correspondingly, the terminal device sends the uplink data to the network device on the time-frequency resource 1 by using the modulation and coding scheme of the MCS 1.

Step S807: The network device receives the uplink data from the terminal device.

Figure 13:
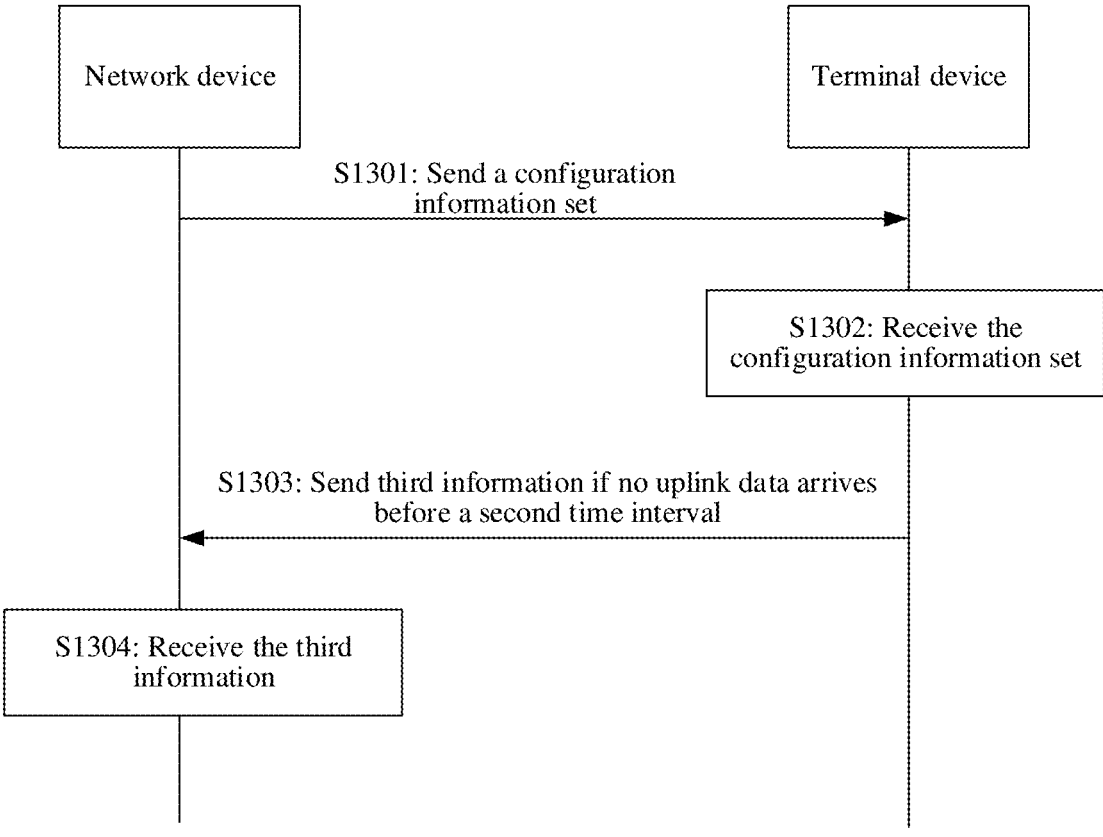
FIG. 13 is a schematic flowchart of another communication method according to an embodiment of this application.

FIG. 13 shows another communication method according to an embodiment of this application. The method includes the following steps.

Step S1301: A network device sends a configuration information set to a terminal device.

Specifically, the configuration information set includes a plurality of pieces of configuration information, and may include a time-frequency resource, an MCS, a precoding matrix, a periodicity, and the like that are for uplink data transmission. In this embodiment, an example in which the configuration information set includes the time-frequency resource and the MCS that are for the uplink data transmission is used for description. Another parameter in the configuration information set may also be implemented in a same manner. For details, refer to step S801, and the details are not described herein again.

Step S1302: The terminal device receives the configuration information set from the network device.

For example, it is assumed that the configuration information set is a third set of configurations, and the third set of configurations includes a time-frequency resource 1, a time-frequency resource 2, and an MCS. In this case, the terminal device receives the configuration information set, namely, the third set of configurations, from the network device, where the third set of configurations includes the time-frequency resource 1, the time-frequency resource 2, and the MCS.

Step S1303: The terminal device sends third information to the network device if no uplink data arrives before a second moment.

Specifically, the third information indicates that the terminal device does not use the configuration information in the configuration information set.

Optionally, the second moment is a time point, and may be determined by using a periodicity and an offset. For example, the periodicity is three slots, and the offset is three symbols. This indicates that the second moment is a moment of the third symbol in every three slots.

Optionally, the second moment is a time point before a piece of configuration information in the configuration information set, and may be determined by using first configuration information and a second time interval. A time period between the second moment and a start moment of the first configuration information is the second time interval. The first configuration information is configuration information earliest in time domain in the configuration information set. Optionally, an end moment of the second time interval is the same as the start moment of the first configuration information.

Figure 14:
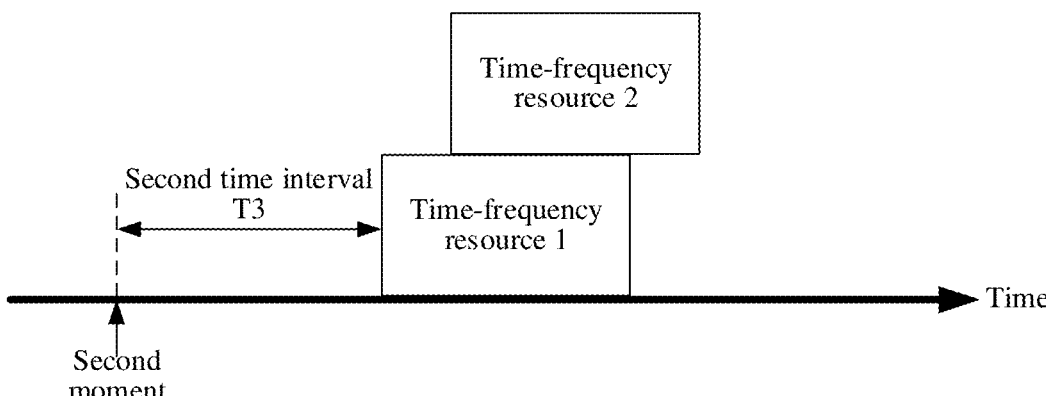
FIG. 14 is a schematic diagram of a second moment according to an embodiment of this application.
Figure 15:
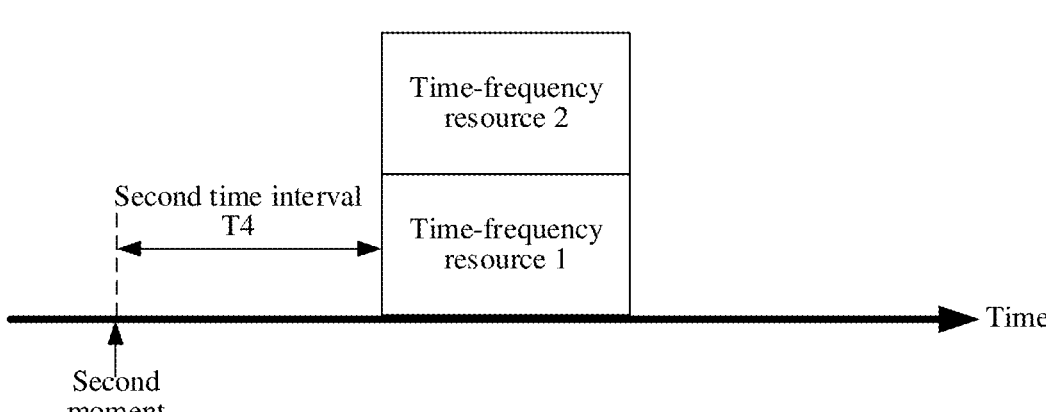
FIG. 15 is a schematic diagram of a second moment according to an embodiment of this application.

In an example, it is assumed that the configuration information set includes a configuration 1 and a configuration 2, the configuration 1 includes the time-frequency resource 1 and an MCS 1, and the configuration 2 includes the time-frequency resource 2 and an MCS 2. As shown in FIG. 14, a time domain position corresponding to the time-frequency resource 1 is before that corresponding to the time-frequency resource 2. In other words, the time-frequency resource 1 is the first configuration information. In this case, the second moment is a time point before the time-frequency resource 1, and a time period between the second moment and a start moment of the time-frequency resource 1 is a second time interval T3. In other words, an end moment of the second time interval T3 is the same as the start moment of the time-frequency resource 1. It is assumed that the configuration information set includes a configuration 1 and a configuration 2, the configuration 1 includes the time-frequency resource 1 and an MCS 1, and the configuration 2 includes the time-frequency resource 2 and an MCS 2. As shown in FIG. 15, a time domain position corresponding to the time-frequency resource 1 is the same as that corresponding to the time-frequency resource 2. In other words, the time-frequency resource 1 or the time-frequency resource 2 is the first configuration information. In this case, the second moment is a time point before the time-frequency resource 1 or the time-frequency resource 2, and a time period between the second moment and a start moment of the time-frequency resource 1 or the time-frequency resource 2 is a second time interval T4. In other words, an end moment of the second time interval T4 is the same as the start moment of the time-frequency resource 1 or the time-frequency resource 2.

In an implementation, the third information includes a first time period, and indicates that the configuration information in the configuration information set is not used within the first time period.

Specifically, the first time period may be several consecutive periodicities T. For example, as shown in FIG. 11, the first time period is five consecutive periodicities. In this case, the third information indicates that the terminal device does not use the configuration information in the configuration information set within the five consecutive periodicities.

Optionally, the first time period may be a quantity of symbols, a quantity of slots, or another parameter for describing a time length. This is not limited in this embodiment of this application.

In this manner, the terminal device does not need to send the third information to the network device in each periodicity, so that frequency of sending the third information is reduced, and resources are saved.

In an implementation, the terminal device receives indication information from the network device.

Specifically, the indication information indicates the second moment. Optionally, in an example, the indication information may directly indicate the second moment. For example, the indication information directly indicates that the second moment is the 30$^{th}$ second. In another example, the indication information may indirectly indicate the second moment. For example, the indication information may indicate the second time interval, and the second moment may be determined by using the second time interval. Optionally, a start moment of the second time interval is the second moment. For example, the indication information indicates that the second time interval is the 40$^{th}$ second to the 50$^{th}$ second, and the second moment may be determined as the 40$^{th}$ second by using the second time interval.

In an implementation, the terminal device sends first information to the network device if an arrival moment of uplink data is before the second moment.

Specifically, the first information indicates target configuration information and/or configuration information other than the target configuration information in the configuration information set, and the target configuration information is configuration information in the configuration set.

Figure 16:
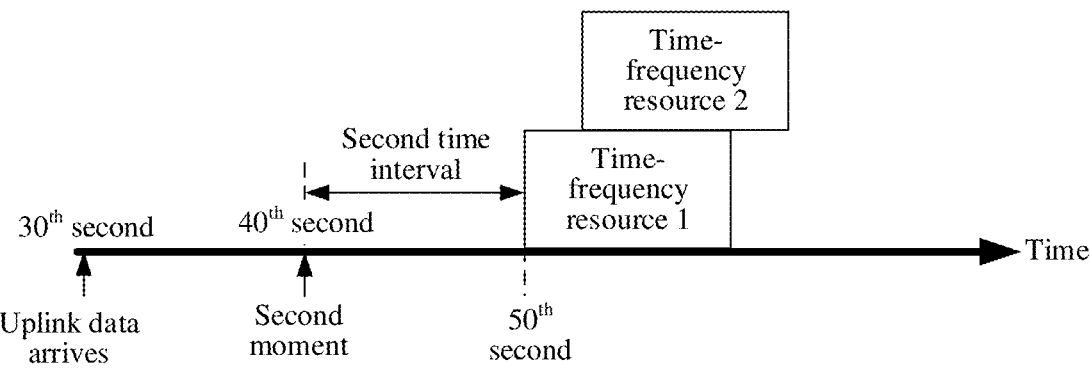
FIG. 16 is a schematic diagram in which an arrival moment of uplink data is before a second moment according to an embodiment of this application.

In an example, as shown in FIG. 16, it is assumed that the arrival moment of the uplink data is the 30$^{th}$ second, the configuration information set includes the configuration 1 and the configuration 2, the configuration 1 includes the time-frequency resource 1 and the MCS 1, the configuration 2 includes the time-frequency resource 2 and the MCS 2, and a time domain position corresponding to the time-frequency resource 1 is before that corresponding to the time-frequency resource 2. In this case, the second moment is a time point before the time-frequency resource 1. For example, the second moment is the $40^{th}$ second. Because the arrival moment of the uplink data is before the second moment, the terminal device sends the first information to the network device, where the first information indicates that the target configuration information is the time-frequency resource 1 and the MCS 1, or indicates that the configuration information other than the target configuration information in the configuration information set is the time-frequency resource 2 and the MCS 2.

In some embodiments, if an arrival moment of uplink data falls within a second time interval, transmission of the uplink data is not started at a start moment of a first periodicity, where the second time interval is a time period between the second moment and a start moment of first configuration information, the first configuration information is configuration information earliest in time domain in the configuration information set, and the first periodicity is one of several consecutive periodicities for sending the configuration information set.

Figure 17:
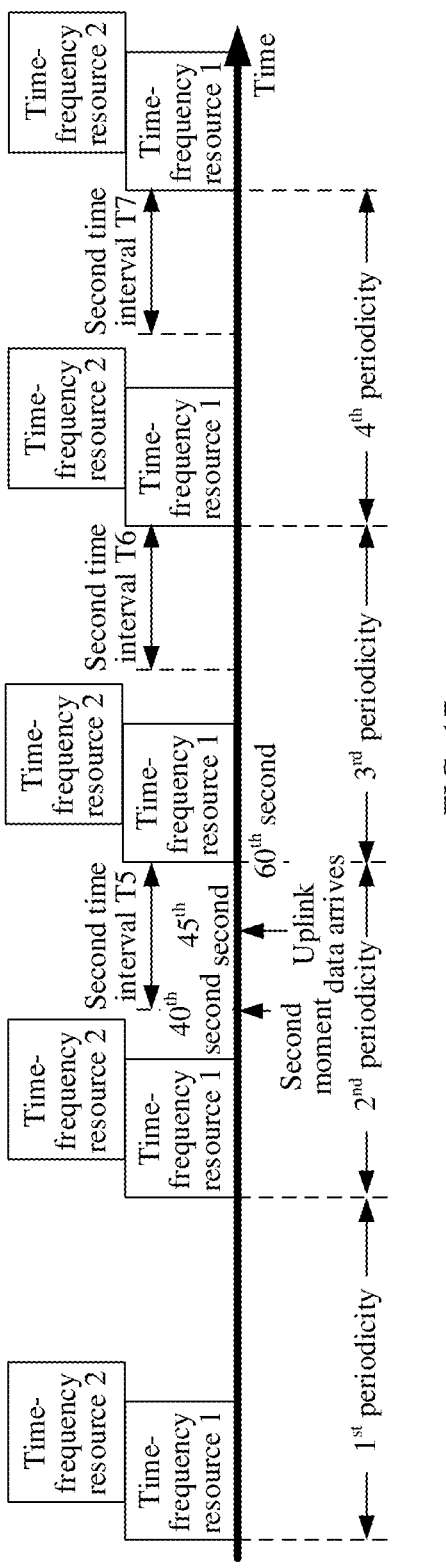
FIG. 17 is a schematic diagram in which an arrival moment of uplink data falls within a second time interval according to an embodiment of this application.

Specifically, as shown in FIG. 17, it is assumed that a periodicity for sending the configuration information set is four consecutive periodicities, namely, the $1^{st}$ periodicity, the $2^{nd}$ periodicity, the $3^{rd}$ periodicity, and the $4^{th}$ periodicity. Descriptions are provided by using a horizontal axis direction of time in FIG. 17 as a baseline and using a second time interval T5 corresponding to the $3^{rd}$ time-frequency resource 1 and the $3^{rd}$ time-frequency resource 2 as an example. It is assumed that the arrival moment of the uplink data is the $45^{th}$ second, the configuration information set includes a configuration 1 and a configuration 2, the configuration 1 includes the time-frequency resource 1 and an MCS 1, the configuration 2 includes the time-frequency resource 2 and an MCS 2, and a time domain position corresponding to the time-frequency resource 1 is before that corresponding to the time-frequency resource 2. In other words, the time-frequency resource 1 is the first configuration information. In this case, the second moment is a time point before the time-frequency resource 1, and the second time interval T5 is a time period between the second moment and a start moment of the time-frequency resource 1. In other words, an end moment of the second time interval T5 is the same as the start moment of the time-frequency resource 1. For example, the second time interval T5 is the $40^{th}$ second to the $50^{th}$ second. Because the arrival moment of the uplink data is the $45^{th}$ second that falls within the second time interval T5, namely, the $40^{th}$ second to the $50^{th}$ second, the terminal device does not transmit the uplink data at the start moment of the first periodicity, namely, a start moment of the 3rd periodicity in FIG. 17, namely, the $50^{th}$ second.

Step S1304: The network device receives the third information from the terminal device.

Figure 18:
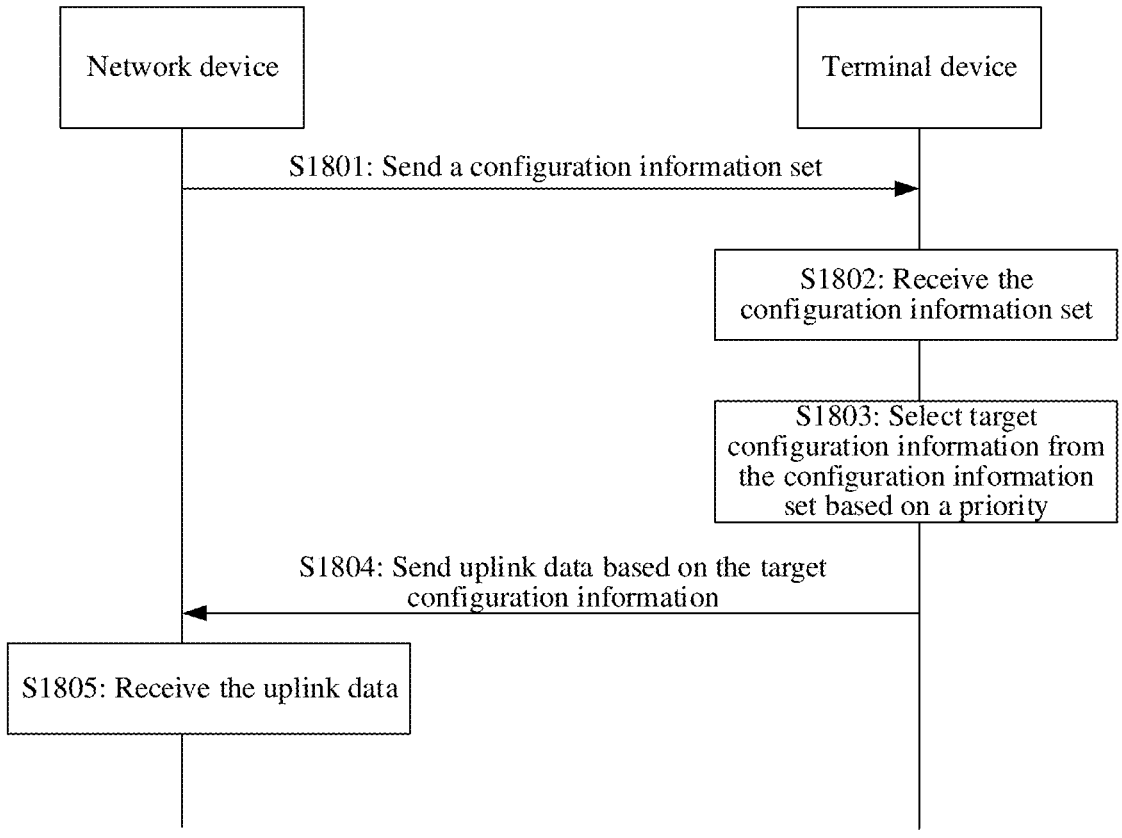
FIG. 18 is a schematic flowchart of another communication method according to an embodiment of this application.

FIG. 18 shows another communication method provided in an embodiment of this application. The method includes the following steps.

Step S1801: A network device sends a configuration information set to a terminal device.

Specifically, at least one piece of configuration information in the configuration information set is associated with fifth information. For example, the fifth information may be priority information. The configuration information set may include a time-frequency resource, an MCS, a precoding matrix, a periodicity, and the like that are for uplink data transmission. In this embodiment, an example in which the configuration information set includes the time-frequency resource and the MCS that are for the uplink data transmission is used for description. Another parameter in the configuration information set may also be implemented in a same manner.

In this embodiment, the configuration information set includes at least one candidate time-frequency resource and at least one candidate MCS. For example, it is assumed that a configuration 1 includes a first set of configurations and a second set of configurations, the first set of configurations includes a time-frequency resource 1 and an MCS 1, and the second set of configurations includes a time-frequency resource 2 and an MCS 2. In other words, the configuration 1 includes two candidate time-frequency resources and two candidate MCSs. A priority of the first set of configurations is higher than that of the second set of configurations. A configuration 2 includes a third set of configurations, and the third set of configurations includes the time-frequency resource 1, the time-frequency resource 2, and an MCS. In other words, the third set of configurations includes two candidate time-frequency resources and one candidate MCS. A priority of the time-frequency resource 1 is higher than that of the time-frequency resource 2. In this case, the configuration information set may be the configuration 1 and/or the third set of configurations in the configuration 2. For example, the configuration information set is the third set of configurations in the configuration 2, and the third set of configurations includes the time-frequency resource 1, the time-frequency resource 2, and the MCS, and the priority of the time-frequency resource 1 is higher than that of the time-frequency resource 2. Then, the network device sends the configuration information set to the terminal device, and the third set of configurations includes the time-frequency resource 1, the time-frequency resource 2, and the MCS, and the priority of the time-frequency resource 1 is higher than that of the time-frequency resource 2.

Step S1802: The terminal device receives the configuration information set from the network device.

For example, it is assumed that the configuration information set is the third set of configurations, and the third set of configurations includes the time-frequency resource 1, the time-frequency resource 2, and the MCS, and the priority of the time-frequency resource 1 is higher than that of the time-frequency resource 2. In this case, the terminal device receives the configuration information set, namely, the third set of configurations, from the network device, where the third set of configurations includes the time-frequency resource 1, the time-frequency resource 2, and the MCS, and the priority of the time-frequency resource 1 is higher than that of the time-frequency resource 2.

In some embodiments, the terminal device receives downlink control information DCI from the network device, where the DCI is for activating configuration information in the configuration information set. Then, the terminal device selects target configuration information from the activated configuration information based on a priority. This manner corresponds to a configured grant type 2. After sending the configuration information set, the network device further needs to send the DCI to activate the configuration information in the configuration information set. Then, the terminal device selects the target configuration information from the activated configuration information, and transmits uplink data based on the target configuration information.

Step S1803: The terminal device selects the target configuration information from the configuration information set based on the fifth information.

Specifically, the fifth information may be the priority information, and the target configuration information includes a first time-frequency resource and/or a modulation and coding scheme MCS. In this embodiment, the example in which the configuration information set includes the time-frequency resource and the MCS that are for the uplink data transmission is used for description. Therefore, the target configuration information includes the first time-frequency resource and/or the modulation and coding scheme MCS. The target configuration information may alternatively include another parameter. This is not limited in embodiments of this application.

Specifically, a specific meaning of the priority is: When a transmission requirement in second information is met, the terminal device preferentially selects configuration information with a higher priority to transmit data. For example, it is assumed that the configuration 1 includes the first set of configurations and the second set of configurations, the first set of configurations includes the time-frequency resource 1 and the MCS 1, the second set of configurations includes the time-frequency resource 2 and the MCS 2, and the priority of the first set of configurations is higher than that of the second set of configurations: the configuration 2 includes the third set of configurations, the third set of configurations includes the time-frequency resource 1, the time-frequency resource 2, and the MCS, and the priority of the time-frequency resource 1 is higher than that of the time-frequency resource 2. For the configuration 1, if the two sets of configurations both meet the transmission requirement, the set of configurations with the higher priority is selected. If only one set of configurations meets the transmission requirement, the set of configurations that meets the requirement is selected as the target configuration information.

For the configuration 1, if the first set of configurations can meet the transmission requirement in the second information, the first set of configurations is selected. In other words, the target configuration information is the time-frequency resource 1 and the MCS 1. For the configuration 2, there are two optional manners. In a first manner, if the time-frequency resource 1 can meet the transmission requirement in the second information, the time-frequency resource 1 and the MCS are selected as the target configuration information: if the time-frequency resource 1 cannot meet the transmission requirement in the second information, the time-frequency resource 2 and the MCS are selected as the target configuration information. In a second manner, if the time-frequency resource 1 can meet the transmission requirement in the second information, the time-frequency resource 1 and the MCS are selected as the target configuration information: if the time-frequency resource 1 cannot meet the transmission requirement in the second information, the time-frequency resource 1, the time-frequency resource 2, and the MCS are selected as the target configuration information. That the transmission requirement is met may mean: In an example, it is assumed that the configuration information set is the first set of configurations and the second set of configurations, the first set of configurations includes the time-frequency resource 1 and the MCS 1, the second set of configurations includes the time-frequency resource 2 and the MCS 2, and the second information is a first threshold corresponding to the first set of configurations and a second threshold corresponding to the second set of configurations. If a value corresponding to a current channel state is greater than the first threshold, the first set of configurations meets the transmission requirement. If a value corresponding to a current channel state is greater than the second threshold, the second set of configurations meets the transmission requirement. Certainly, the value corresponding to the current channel state and the second information may alternatively meet another relationship. For example, when the value corresponding to the current channel state is less than the first threshold corresponding to the first set of configurations, it is considered that the first set of configurations meets the transmission requirement; and when the value corresponding to the current channel state is less than the second threshold corresponding to the second set of configurations, it is considered that the second set of configurations meets the transmission requirement. This is not limited in embodiments of this application.

In this manner, when all the configuration information in the configuration information set meets the transmission requirement, the configuration information corresponding to the higher priority is selected to transmit the data. Therefore, a probability of using the configuration information corresponding to the lower priority is less than that of using the configuration information corresponding to the higher priority. Therefore, the network device may choose to configure, for a plurality of users, the configuration information corresponding to the lower priority. In this way, a conflict probability is lower.

In an implementation, the terminal device selects the target configuration information from the configuration information set based on the second information and the fifth information.

Specifically, in an example, the fifth information may be the priority information. The second information may be sent by the network device, or may be specified in a protocol. This is not limited in embodiments of this application. The second information may include one or more of channel state information, reliability of the uplink data, size information of the uplink data, an arrival moment of the uplink data, and the transmission requirement.

In an example, the second information is the channel state information, and the terminal device selects the target configuration information from the configuration information set based on the channel state information and the fifth information. The following provides descriptions by using an example in which the fifth information is the priority information.

Specifically, the terminal device needs to estimate, based on the current channel state, an SINR for receiving the uplink data by the network device, and then selects the target configuration information from the configuration information set based on a target block error rate (BLER) of the data transmission. For the current channel state, a downlink channel state may be first obtained by using a reference signal, for example, a channel state information-reference signal CSI-RS. Due to uplink-downlink channel state symmetry, the terminal device may determine a state of a channel for transmitting the uplink data, namely, the current channel state, by using the downlink channel state. After the current channel state is obtained, the SINR for receiving the uplink data by the network device needs to be estimated based on the current channel state. There may be a plurality of implementations of estimating, based on the current channel state, the SINR for receiving the uplink data by the network device. For example, the network device may configure a correspondence between the current channel state and the SINR for the terminal device by using higher layer signaling. For another example, the SINR may be estimated by the terminal device, and the terminal device may predict, based on historical information, a relationship between the current channel state and the SINR for receiving the uplink data by the network device. It should be noted that in some scenarios such as a scenario in which interference is stable or a full coordination scenario, an interference magnitude is controllable or stable, and it is feasible to obtain the SINR by using the current channel state.

It is assumed that the configuration information set sent by the network device to the terminal device is the configuration 1, the configuration 1 includes the first set of configurations and the second set of configurations, the first set of configurations includes the time-frequency resource 1 and the MCS 1, the second set of configurations includes the time-frequency resource 2 and the MCS 2, and the priority of the first set of configurations is higher than that of the second set of configurations. Assuming that the current channel state is H, and the terminal device estimates, based on the current channel state, that the SINR for receiving the uplink data by the network device is S, the following is a process of selecting the target configuration information from the configuration information set based on the target block error rate (BLER) of the data transmission, where the first set of configurations and the second set of configurations have the following features.

The first set of configurations includes the time-frequency resource 1 and the MCS 1, and corresponds to a poor channel state, to be specific, the first set of configurations is a configuration used when the SINR for receiving the uplink data by the network device is S0, where for example, S0=0 decibels (dB).

The second set of configurations includes the time-frequency resource 2 and the MCS 2, and corresponds to a good channel state, to be specific, the second set of configurations is a configuration used when the SINR for receiving the uplink data by the network device is S1, where for example, S1=10 decibels (dB).

That is, the second information is channel state information corresponding to each set of configurations, for example, S0=0 dB corresponding to the first set of configurations and S1=10 dB corresponding to the second set of configurations. In other words, when the second information is sent by the network device, the network device notifies the terminal device that the second information is S0=0 dB and S1=10 dB.

It is assumed that the terminal device estimates, based on the current channel state, that the SINR for receiving the uplink data by the network device is S=5 dB, and S is greater than the second information S0=0 dB and less than the second information S1=10 dB. S=5 dB in a current channel condition. To ensure low latency and high reliability, the terminal device can select only the first set of configurations to transmit the uplink data. In other words, the time-frequency resource 1 and the MCS 1 are the target configuration information. For detailed descriptions, refer to the descriptions of step S803. Details are not described herein again.

In an implementation, when the configuration information in the configuration information set meets the transmission requirement in the second information, the configuration information with the higher priority is selected as the target configuration information.

It is assumed that the terminal device estimates, based on the current channel state, that the SINR for receiving the uplink data by the network device is S=15 dB, and S is greater than the second information S0=0 dB and the second information S1=10 dB. Both the first set of configurations and the second set of configurations meet the transmission requirement in the second information. Because the priority of the first set of configurations is higher than that of the second set of configurations, the terminal device selects the first set of configurations to transmit the uplink data. In other words, the time-frequency resource 1 and the MCS 1 are the target configuration information.

It is assumed that the configuration information set sent by the network device to the terminal device is the third set of configurations in the configuration 2, the third set of configurations includes the time-frequency resource 1, the time-frequency resource 2, and the MCS, and the priority of the time-frequency resource 1 is higher than that of the time-frequency resource 2. Assuming that the current channel state is H, and the terminal device estimates, based on the current channel state, that the SINR for receiving the uplink data by the network device is S, the following is a process of selecting the target configuration information from the configuration information set based on the target block error rate (BLER) of the data transmission, where the third set of configurations has the following features.

A combination of the time-frequency resource 1 and the MCS corresponds to a good channel state, to be specific, the combination is a configuration used when the SINR for receiving the uplink data by the network device is S0, where for example, S0=10 decibels (dB).

A combination of the time-frequency resource 2 and the MCS corresponds to a poor channel state, to be specific, the combination is a configuration used when the SINR for receiving the uplink data by the network device is S1, where for example, S1=0 decibels (dB).

In an implementation, when the configuration information with the higher priority in the configuration information set cannot meet the transmission requirement in the second information, configuration information that can meet the transmission requirement in the second information is selected as the target configuration information.

That is, the second information is channel state information corresponding to each set of configurations, for example, S0=10 dB corresponding to the combination of the time-frequency resource 1 and the MCS and S1=0 dB corresponding to the combination of the time-frequency resource 2 and the MCS. In other words, when the second information is sent by the network device, the network device notifies the terminal device that the second information is S0=10 dB and S1=0 dB.

It is assumed that the terminal device estimates, based on the current channel state, that the SINR for receiving the uplink data by the network device is S=5 dB, and S is greater than the second information S1=0 dB and less than S0=10 dB. When the channel state is good, a value of the SINR is large, and a small quantity of resources may be selected to transmit the data, to ensure high resource utilization. When the channel state is poor, a value of the SINR is small, and a large quantity of transmission resources may be used to transmit the data, to ensure reliability of the data transmission. Correspondingly, because the second information S0 corresponding to the combination of the time-frequency resource 1 and the MCS is 10 dB, the value of the SINR is large, the channel state is good, and a small quantity of transmission resources are needed to transmit the data, to ensure the high resource utilization: because the second information S1 corresponding to the combination of the time-frequency resource 2 and the MCS is 0 dB, the value of the SINR is small, the channel state is poor, and a large quantity of transmission resources are needed to transmit the data, to ensure the reliability of the data transmission. Therefore, although the priority of the time-frequency resource 1 is higher than that of the time-frequency resource 2, S=5 dB in the current channel state, and the value of the SINR is small. To ensure low latency and high reliability, the terminal device selects the combination of the time-frequency resource 2 and the MCS to transmit the uplink data. In other words, the combination of the time-frequency resource 2 and the MCS is the target configuration information.

In an implementation, when the configuration information in the configuration information set meets the transmission requirement in the second information, the configuration information with the higher priority is selected as the target configuration information.

It is assumed that the terminal device estimates, based on the current channel state, that the SINR for receiving the uplink data by the network device is S=15 dB, and S is greater than the second information S0=10 dB and the second information S1=0 dB. Both the combination of the time-frequency resource 1 and the MCS and the combination of the time-frequency resource 2 and the MCS meet the transmission requirement in the second information. Because the priority of the time-frequency resource 1 is higher than that of the time-frequency resource 2, the terminal device selects the combination of the time-frequency resource 1 and the MCS to transmit the uplink data. In other words, the combination of the time-frequency resource 1 and the MCS is the target configuration information.

It is assumed that the configuration information set sent by the network device to the terminal device is the third set of configurations in the configuration 2, the third set of configurations includes the time-frequency resource 1, the time-frequency resource 2, and the MCS, and the priority of the time-frequency resource 1 is higher than that of the time-frequency resource 2. Assuming that the current channel state is H, and the terminal device estimates, based on the current channel state, that the SINR for receiving the uplink data by the network device is S, the following is a process of selecting the target configuration information from the configuration information set based on the target block error rate (BLER) of the data transmission, where the third set of configurations has the following features.

A combination of the time-frequency resource 1 and the MCS corresponds to a good channel state, to be specific, the combination is a configuration used when the SINR for receiving the uplink data by the network device is S0, where for example, S0=10 decibels (dB).

A combination of the time-frequency resource 1+the time-frequency resource 2 and the MCS corresponds to a poor channel state, to be specific, the combination is a configuration used when the SINR for receiving the uplink data by the network device is S1, where for example, S1=0 decibels (dB).

In an implementation, when the configuration information with the higher priority in the configuration information set cannot meet the transmission requirement in the second information, configuration information that can meet the transmission requirement in the second information is selected as the target configuration information.

That is, the second information is channel state information corresponding to each set of configurations, for example, S0=10 dB corresponding to the combination of the time-frequency resource 1 and the MCS and S1=0 dB corresponding to the combination of the time-frequency resource 1+the time-frequency resource 2 and the MCS. In other words, when the second information is sent by the network device, the network device notifies the terminal device that the second information is S0=10 dB and S1=0 dB.

It is assumed that the terminal device estimates, based on the current channel state, that the SINR for receiving the uplink data by the network device is S=5 dB, and S is greater than the second information S1=0 dB and less than the second information S0=10 dB. When the channel state is good, a value of the SINR is large, and a small quantity of resources may be selected to transmit the data, to ensure high resource utilization. When the channel state is poor, a value of the SINR is small, and a large quantity of transmission resources may be used to transmit the data, to ensure reliability of the data transmission. Correspondingly, because the second information S0 corresponding to the combination of the time-frequency resource 1 and the MCS is 10 dB, the value of the SINR is large, the channel state is good, and a small quantity of transmission resources are needed to transmit the data, to ensure the high resource utilization: because the second information S1 corresponding to the combination of the time-frequency resource 1+the time-frequency resource 2 and the MCS is 0 dB, the value of the SINR is small, the channel state is poor, and a large quantity of transmission resources are needed to transmit the data, to ensure the reliability of the data transmission. Therefore, although the priority of the time-frequency resource 1 is higher than that of the time-frequency resource 2, S=5 dB in the current channel state, and the value of the SINR is small. To ensure low latency and high reliability, the terminal device can select only the combination of the time-frequency resource 1+the time-frequency resource 2 and the MCS to transmit the uplink data. In other words, the combination of the time-frequency resource 1+the time-frequency resource 2 and the MCS is the target configuration information.

In an implementation, when the configuration information in the configuration information set meets the transmission requirement in the second information, the configuration information with the higher priority is selected as the target configuration information.

It is assumed that the terminal device estimates, based on the current channel state, that the SINR for receiving the uplink data by the network device is S=15 dB, and S is greater than the second information S0=10 dB and the second information S1=0 dB. Both the combination of the time-frequency resource 1 and the MCS and the combination of the time-frequency resource 1+the time-frequency resource 2 and the MCS meet the transmission requirement in the second information. Because the priority of the time-frequency resource 1 is higher than that of the time-frequency resource 2, the terminal device selects the combination of the time-frequency resource 1 and the MCS to transmit the uplink data. In other words, the combination of the time-frequency resource 1 and the MCS is the target configuration information.

In another example, the second information is the reliability of the uplink data, and the terminal device selects the target configuration information from the configuration information set based on the reliability of the uplink data and the fifth information. The following provides descriptions by using an example in which the fifth information is the priority information.

Specifically, an example in which the uplink data has two types of reliability is used in this embodiment. For example, assuming that reliability 1 corresponds to a high reliability requirement on the uplink data, that is, the BLER=$10^{-5}$, a low MCS or a large quantity of transmission resources are needed to transmit the uplink data, to ensure reliability: reliability 2 corresponds to a low reliability requirement on the uplink data, that is, the BLER=$10^{-3}$, a high MCS or a small quantity of transmission resources are needed to transmit the uplink data, to ensure the reliability.

It is assumed that the configuration information set sent by the network device to the terminal device is the configuration 1, the configuration 1 includes the first set of configurations and the second set of configurations, the first set of configurations includes the time-frequency resource 1 and the MCS 1, and the second set of configurations includes the time-frequency resource 2 and the MCS 2. The first set of configurations corresponds to the low reliability requirement on the uplink data, that is, the BLER=$10^{-3}$, and the second set of configurations corresponds to the high reliability requirement on the uplink data, that is, the BLER=$10^{-5}$. The priority of the first set of configurations is greater than that of the second set of configurations. Robustness corresponding to the first set of configurations and robustness corresponding to the second set of configurations may be indicated by the network device to the terminal device when the network device sends the configuration information set to the terminal device, or may be implicitly indicated by the network device to the terminal device. For example, in a possible implicit manner, the low MCS corresponds to high robustness, and the high MCS corresponds to low robustness.

In an implementation, when the configuration information with the higher priority in the configuration information set cannot meet the transmission requirement in the second information, configuration information that can meet the transmission requirement in the second information is selected as the target configuration information.

To be specific, the second information is reliability corresponding to each set of configurations, for example, the reliability, namely, the BLER=$10^{-3}$, corresponding to the first set of configurations and the reliability, namely, the BLER=$10^{-5}$, corresponding to the second set of configurations. In other words, when the second information is sent by the network device, the network device notifies the terminal device that the second information is the BLER=$10^{-3}$ and the BLER=$10^{-5}$.

If the reliability of the currently arrived uplink data is the BLER=$10^{-5}$, and the second information corresponding to the first set of configurations is the BLER=$10^{-3}$, although the priority of the first set of configurations is higher than that of the second set of configurations, the first set of configurations cannot meet the transmission requirement in the second information. In this case, the terminal device can select only the second set of configurations to transmit the uplink data. In other words, the time-frequency resource 2 and the MCS 2 are the target configuration information.

In an implementation, when the configuration information in the configuration information set meets the transmission requirement in the second information, the configuration information with the higher priority is selected as the target configuration information.

If the reliability of the currently arrived uplink data is the BLER=$10^{-3}$, the reliability, namely, the BLER=$10^{-3}$, of the currently arrived uplink data is compared with the second information, namely, the BLER=$10^{-3}$ and the BLER=$10^{-5}$. Both the first set of configurations and the second set of configurations meet the transmission requirement in the second information. However, because the priority of the first set of configurations is higher than that of the second set of configurations, the terminal device selects the first set of configurations to transmit the uplink data. In other words, the time-frequency resource 1 and the MCS 1 are the target configuration information.

In another example, the second information is the size information of the uplink data, and the terminal device selects the target configuration information from the configuration information set based on the size information of the uplink data and the fifth information. The following provides descriptions by using an example in which the fifth information is the priority information.

Specifically, the terminal device needs to upload uplink data of different sizes at different moments. For example, the terminal device needs to transmit 32-byte (byte) uplink data at a moment 1, and needs to transmit 100-byte (byte) uplink data at a moment 2. The configuration information set sent by the network device to the terminal device is the configuration 1, the configuration 1 includes the first set of configurations and the second set of configurations, the first set of configurations includes the time-frequency resource 1 and the MCS 1, the second set of configurations includes the time-frequency resource 2 and the MCS 2, and the terminal device is notified that the priority of the first set of configurations is higher than that of the second set of configurations. When the second information is sent by the network device, the network device notifies the terminal device that a transport block size corresponding to the first set of configurations is TB1=50 bytes, in other words, the second information is TB1=50 bytes; and a transport block size corresponding to the second set of configurations is TB2=150 bytes, in other words, the second information is TB2=150 bytes. That is, the second information is TB1=50 bytes and TB2=150 bytes. When the second information is self-implemented by the terminal device, after obtaining the first set of configurations, the terminal device determines, based on the time-frequency resource 1 and the MCS 1 by using a transport block size calculation method, that a transport block size corresponding to the first set of configurations is TB1, where TB1±50 bytes; after obtaining the second set of configurations, the terminal device determines, based on the time-frequency resource 2 and the MCS 2 by using the transport block size calculation method, that a transport block size corresponding to the second set of configurations is TB2, where TB2=150 bytes; and the terminal device determines that the priority of the first set of configurations is higher than that of the second set of configurations. That is, the second information is TB1=50 bytes and TB2=150 bytes.

To be specific, the second information is size information that is of the uplink data and that corresponds to each set of configurations, for example, TB1=50 bytes corresponding to the first set of configurations and TB2=150 bytes corresponding to the second set of configurations. The second information is TB1=50 bytes and TB2=150 bytes.

In an implementation, when the configuration information in the configuration information set meets the transmission requirement in the second information, the configuration information with the higher priority is selected as the target configuration information.

To be specific, the second information is size information that is of the uplink data and that corresponds to each set of configurations, for example, TB1=50 bytes corresponding to the first set of configurations and TB2=150 bytes corresponding to the second set of configurations. It is assumed that a size of the current uplink data is 32 bytes, and is less than the second information TB1=50 bytes and TB2=150 bytes. Both the first set of configurations and the second set of configurations can meet the transmission requirement in the second information. However, because the priority of the first set of configurations is higher than that of the second set of configurations, the terminal device selects the first set of configurations to transmit the uplink data. In other words, the time-frequency resource 1 and the MCS 1 are the target configuration information.

In an implementation, when the configuration information with the higher priority in the configuration information set cannot meet the transmission requirement in the second information, configuration information that can meet the transmission requirement in the second information is selected as the target configuration information.

It is assumed that a size of the current uplink data is 100 bytes. Because the size, namely, 100 bytes, of the current uplink data is greater than the second information TB1=50 bytes, the first set of configurations cannot meet the transmission requirement in the second information. Because the size, namely, 100 bytes, of the current uplink data is less than the second information TB2=150 bytes, the second set of configurations meets the transmission requirement in the second information. Although the priority of the first set of configurations is higher than that of the second set of configurations, the terminal device selects the second set of configurations to transmit the uplink data. In other words, the time-frequency resource 2 and the MCS 2 are the target configuration information.

Step S1804: The terminal device sends the uplink data to the network device based on the target configuration information.

For this step, refer to step S806, and details are not described herein again.

Step S1805: The network device receives the uplink data from the terminal device.

In the foregoing method, the configuration information set sent by the network device to the terminal device includes the fifth information, and the fifth information may be the priority. When the transmission requirement is met, the terminal device preferentially selects the configuration information with the higher priority to transmit the uplink data. Therefore, compared with the configuration information with the higher priority, the configuration information with the lower priority is less likely to be used. In this case, the network device may configure a resource corresponding to the lower priority for a plurality of terminal devices for reuse, to improve the resource utilization.

The foregoing describes the methods in embodiments of this application in detail, and the following provides apparatuses in embodiments of this application.

Figure 19:
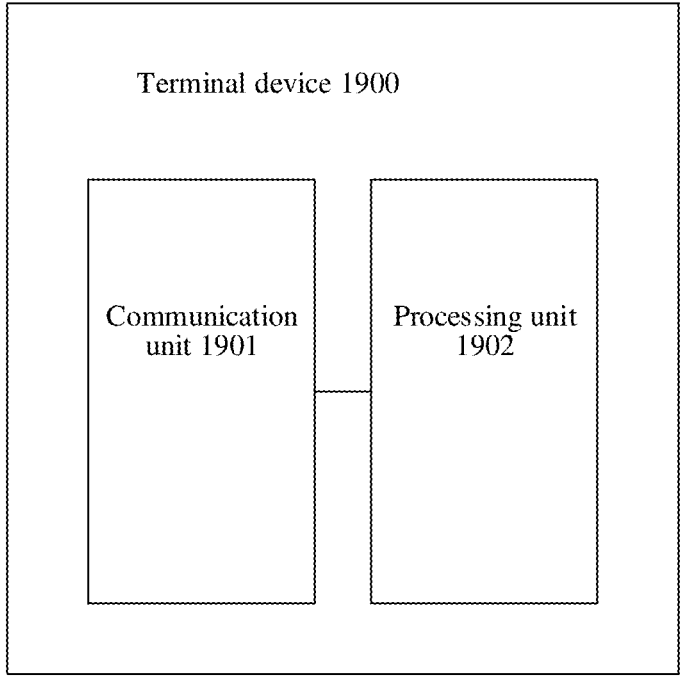
FIG. 19 is a schematic diagram of a structure of a terminal device according to an embodiment of this application.

FIG. 19 is a schematic diagram of a structure of a terminal device 1900 according to an embodiment of this application. The terminal device 1900 may include a communication unit 1901 and a processing unit 1902. Detailed descriptions of each unit are as follows.

The communication unit 1901 is configured to receive a configuration information set from a network device.

The processing unit 1902 is configured to select target configuration information from the configuration information set.

The communication unit 1901 is further configured to send first information to the network device, where the first information indicates the target configuration information and/or configuration information other than the target configuration information in the configuration information set.

The communication unit 1901 is further configured to send uplink data to the network device based on the target configuration information.

In some embodiments, the first information includes a first time period, and indicates that the uplink data is to be sent to the network device within the first time period based on the target configuration information.

In some embodiments, the communication unit 1901 is further configured to receive downlink control information DCI from the network device, where the DCI is for activating configuration information in the configuration information set. The processing unit 1902 is further configured to select the target configuration information from the activated configuration information.

In some embodiments, the processing unit 1902 is further configured to select the target configuration information from the configuration information set based on second information.

In some embodiments, the communication unit 1901 is further configured to receive the second information from the network device.

In some embodiments, the second information includes one or more of channel state information, reliability of the uplink data, size information of the uplink data, an arrival moment of the uplink data, and a first moment.

In some embodiments, the communication unit 1901 is further configured to send the first information to the network device when the arrival moment of the uplink data is before the first moment, where the first moment is a time point before a piece of configuration information in the configuration information set.

In some embodiments, the communication unit 1901 is further configured to send the first information to the network device on a second time-frequency resource, where the second time-frequency resource is related to the target configuration information.

In some embodiments, the communication unit 1901 is further configured to receive fourth information from the network device, where the fourth information indicates a third time-frequency resource, and the third time-frequency resource is for sending the first information to the network device.

In some embodiments, the communication unit 1901 is further configured to send the first information to the network device on a fourth time-frequency resource, where the fourth time-frequency resource is a time-frequency resource preallocated to send uplink control information UCI.

It should be noted that, for implementations and beneficial effects of the units, refer to the corresponding descriptions in the method embodiment shown in FIG. 8.

Figure 20:
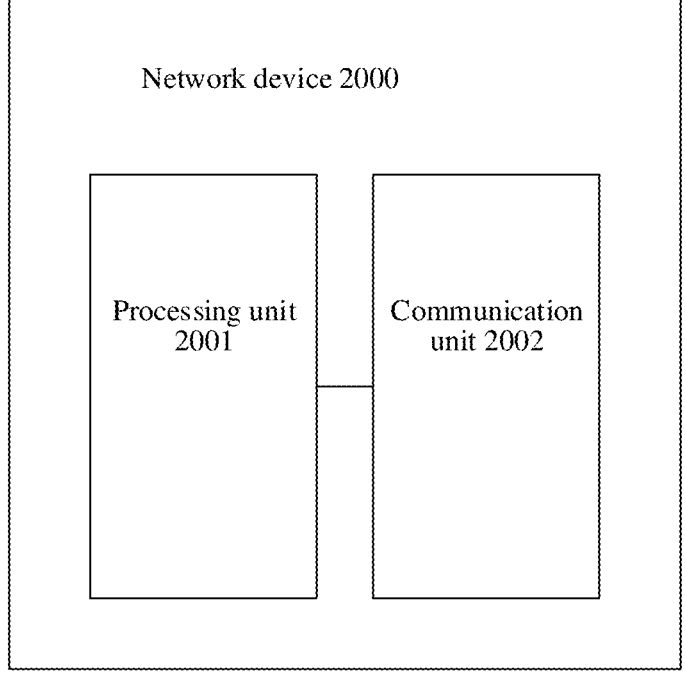
FIG. 20 is a schematic diagram of a structure of a network device according to an embodiment of this application.

FIG. 20 is a schematic diagram of a structure of a network device 2000 according to an embodiment of this application. The network device 2000 may include a processing unit 2001 and a communication unit 2002. Detailed descriptions of each unit are as follows.

The processing unit 2001 is configured to send a configuration information set to a terminal device through a communication unit 2002.

The processing unit 2001 is further configured to receive first information from the terminal device through the communication unit 2002, where the first information indicates target configuration information and/or configuration information other than the target configuration information in the configuration information set, and the configuration information set includes the target configuration information.

The processing unit 2001 is further configured to receive uplink data from the terminal device through the communication unit 2002 based on the target configuration information.

In some embodiments, the first information includes a first time period, and indicates to receive the uplink data within the first time period.

In some embodiments, the communication unit 2002 is further configured to send downlink control information DCI to the terminal device, where the DCI is for activating configuration information in the configuration information set, and the activated configuration information is for the terminal device to select the target configuration information from the activated configuration information.

In some embodiments, the communication unit 2002 is further configured to send second information to the terminal device, where the second information is for the terminal device to select the target configuration information from the configuration information set based on the second information.

In some embodiments, the second information includes one or more of channel state information, reliability of the uplink data, size information of the uplink data, an arrival moment of the uplink data, and a first moment, and the first moment is a time point before a piece of configuration information in the configuration information set.

In some embodiments, the communication unit 2002 is further configured to receive the first information from the terminal device on a second time-frequency resource, where the second time-frequency resource is related to the target configuration information.

In some embodiments, the communication unit 2002 is further configured to send fourth information to the terminal device, where the fourth information indicates a third time-frequency resource, and the third time-frequency resource is for the terminal device to send the first information to the network device.

In some embodiments, the communication unit 2002 is further configured to receive the first information from the terminal device on a fourth time-frequency resource, where the fourth time-frequency resource is a time-frequency resource preallocated to send uplink control information UCI by the terminal device.

It should be noted that, for implementations and beneficial effects of the units, refer to the corresponding descriptions in the method embodiment shown in FIG. 8.

Figure 21:
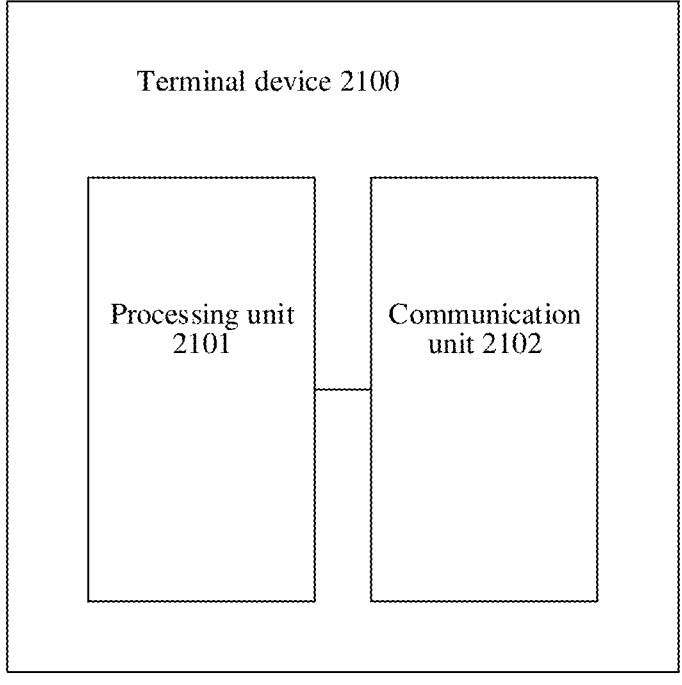
FIG. 21 is a schematic diagram of a structure of a terminal device according to an embodiment of this application.

FIG. 21 is a schematic diagram of a structure of a terminal device 2100 according to an embodiment of this application. The terminal device 2100 may include a processing unit 2101 and a communication unit 2102. Detailed descriptions of each unit are as follows.

The processing unit 2101 is configured to receive a configuration information set from a network device through a communication unit 2102, where the configuration information set includes a plurality of pieces of configuration information.

The processing unit 2101 is further configured to send third information to the network device through the communication unit 2102 when no uplink data arrives before a second moment, where the third information indicates that the configuration information in the configuration information set is not used, and the second moment is a time point before a piece of configuration information in the configuration information set.

In some embodiments, the third information includes a first time period, and indicates that the configuration information in the configuration information set is not used within the first time period.

In some embodiments, the communication unit 2102 is further configured to receive indication information from the network device, where the indication information indicates the second moment.

In some embodiments, the communication unit 2102 is further configured to send first information to the network device when an arrival moment of uplink data is before the second moment, where the first information indicates target configuration information and/or configuration information other than the target configuration information in the configuration information set, and the target configuration information is configuration information in the configuration set.

It should be noted that, for implementations and beneficial effects of the units, refer to the corresponding descriptions in the method embodiment shown in FIG. 13.

Figure 22:
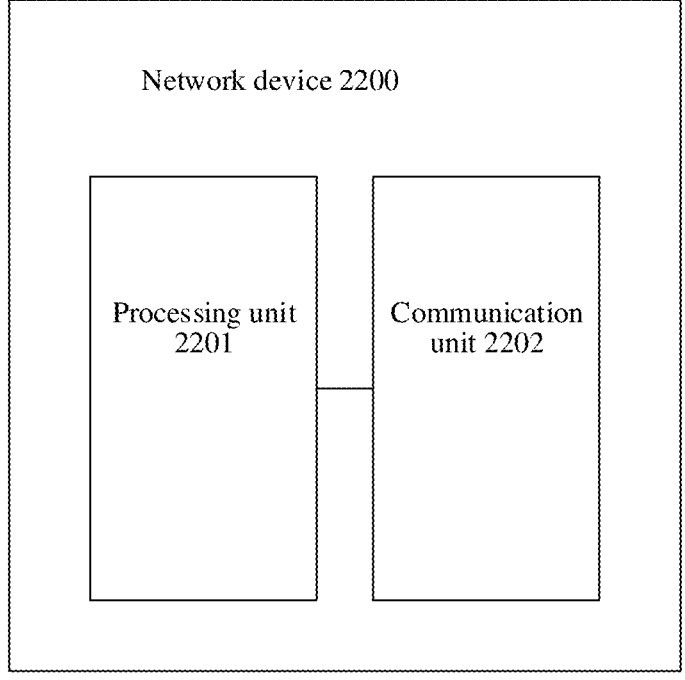
FIG. 22 is a schematic diagram of a structure of a network device according to an embodiment of this application.

FIG. 22 is a schematic diagram of a structure of a network device 2200 according to an embodiment of this application. The network device 2200 may include a processing unit 2201 and a communication unit 2202. Detailed descriptions of each unit are as follows.

The processing unit 2201 is configured to send a configuration information set to a terminal device through a communication unit 2202, where the configuration information set includes a plurality of pieces of configuration information.

The processing unit 2201 is further configured to receive third information from the terminal device through the communication unit 2202, where the third information indicates that the terminal device does not use the configuration information in the configuration information set.

In some embodiments, the third information includes a first time period, and indicates that the configuration information in the configuration information set is not used within the first time period.

In some embodiments, the communication unit 2202 is further configured to send indication information to the terminal device, where the indication information indicates the terminal device to send the third information to the device when no uplink data arrives before a second moment, and the second moment is a time point before a piece of configuration information in the configuration information set.

In some embodiments, the communication unit 2202 is further configured to receive first information from the terminal device, where the first information indicates target configuration information and/or configuration information other than the target configuration information in the configuration information set, and the target configuration information is configuration information in the configuration set.

It should be noted that, for implementations and beneficial effects of the units, refer to the corresponding descriptions in the method embodiment shown in FIG. 13.

Figure 23:
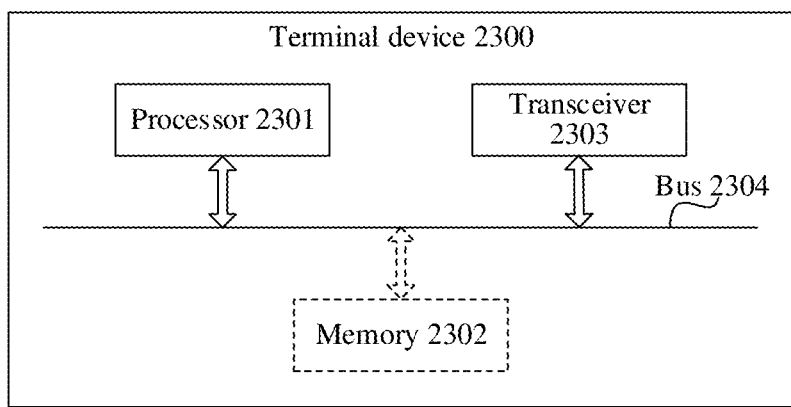
FIG. 23 is a schematic diagram of a structure of a terminal device according to an embodiment of this application.

FIG. 23 shows a terminal device 2300 according to an embodiment of this application. The terminal device 2300 includes a processor 2301 and a transceiver 2303, and optionally further includes a memory 2302. The processor 2301, the memory 2302, and the transceiver 2303 are connected to each other through a bus 2304.

The memory 2302 includes a random access memory (random access memory, RAM), a read-only memory (read-only memory, ROM), an erasable programmable read-only memory (erasable programmable read-only memory, EPROM), or a compact disc read-only memory (compact disc read-only memory, CD-ROM). The memory 2302 is configured to store related instructions and data. The transceiver 2303 is configured to receive and send data.

The processor 2301 may be one or more central processing units (central processing units, CPUs). When the processor 2301 is one CPU, the CPU may be a single-core CPU or a multi-core CPU.

The processor 2301 in the terminal device 2300 reads a computer program stored in the memory 2302, to perform the following operations:

receiving a configuration information set from a network device through the transceiver 2303;

selecting target configuration information from the configuration information set;

sending first information to the network device through the transceiver 2303, where the first information indicates the target configuration information and/or configuration information other than the target configuration information in the configuration information set; and sending uplink data to the network device through the transceiver 2303 based on the target configuration information.

In some embodiments, the first information includes a first time period, and indicates that the uplink data is to be sent to the network device within the first time period based on the target configuration information.

In some embodiments, the processor 2301 is further configured to: receive downlink control information DCI from the network device through the transceiver 2303, where the DCI is for activating configuration information in the configuration information set; and select the target configuration information from the activated configuration information.

In some embodiments, the processor 2301 is further configured to select the target configuration information from the configuration information set based on second information.

In some embodiments, the processor 2301 is further configured to receive the second information from the network device through the transceiver 2303.

In some embodiments, the second information includes one or more of channel state information, reliability of the uplink data, size information of the uplink data, an arrival moment of the uplink data, and a first moment.

In some embodiments, the processor 2301 is further configured to send the first information to the network device through the transceiver 2303 when the arrival moment of the uplink data is before the first moment, where the first moment is a time point before a piece of configuration information in the configuration information set.

In some embodiments, the processor 2301 is further configured to send the first information to the network device on a second time-frequency resource through the transceiver 2303, where the second time-frequency resource is related to the target configuration information.

In some embodiments, the processor 2301 is further configured to receive fourth information from the network device through the transceiver 2303, where the fourth information indicates a third time-frequency resource, and the third time-frequency resource is for sending the first information to the network device.

In some embodiments, the processor 2301 is further configured to send the first information to the network device on a fourth time-frequency resource through the transceiver 2303, where the fourth time-frequency resource is a time-frequency resource preallocated to send uplink control information UCI.

It should be noted that, for implementations and beneficial effects of the operations, refer to the corresponding descriptions in the method embodiment shown in FIG. 8.

Figure 24:
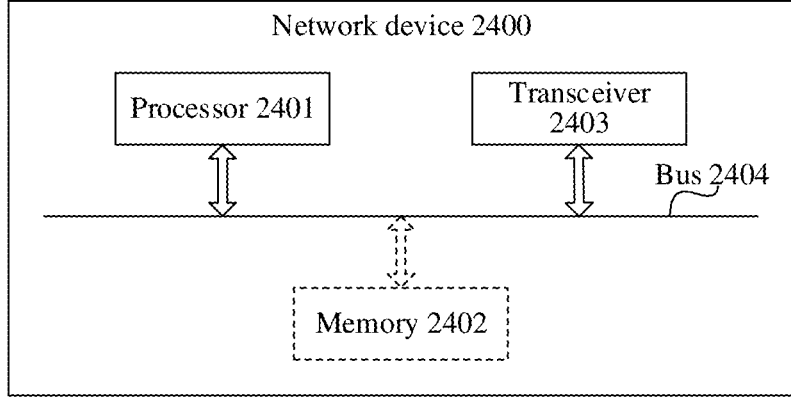
FIG. 24 is a schematic diagram of a structure of a network device according to an embodiment of this application.

FIG. 24 shows a network device 2400 according to an embodiment of this application. The network device 2400 includes a processor 2401 and a transceiver 2403, and optionally further includes a memory 2402. The processor 2401, the memory 2402, and the transceiver 2403 are connected to each other through a bus 2404.

The memory 2402 includes a random access memory (random access memory, RAM), a read-only memory (read-only memory, ROM), an erasable programmable read-only memory (erasable programmable read-only memory, EPROM), or a compact disc read-only memory (compact disc read-only memory, CD-ROM). The memory 2402 is configured to store related instructions and data. The transceiver 2403 is configured to receive and send data.

The processor 2401 may be one or more central processing units (central processing units, CPUs). When the processor 2401 is one CPU, the CPU may be a single-core CPU or a multi-core CPU.

The processor 2401 in the network device 2400 reads a computer program stored in the memory 2402, to perform the following operations:

sending a configuration information set to a terminal device through the transceiver 2403;

receiving first information from the terminal device through the transceiver 2403, where the first information indicates target configuration information and/or configuration information other than the target configuration information in the configuration information set, and the configuration information set includes the target configuration information; and receiving uplink data from the terminal device through the transceiver 2403 based on the target configuration information.

In some embodiments, the first information includes a first time period, and indicates to receive the uplink data within the first time period.

In some embodiments, the processor 2401 is further configured to send downlink control information DCI to the terminal device through the transceiver 2403, where the DCI is for activating configuration information in the configuration information set, and the activated configuration information is for the terminal device to select the target configuration information from the activated configuration information.

In some embodiments, the processor 2401 is further configured to send second information to the terminal device through the transceiver 2403, where the second information is for the terminal device to select the target configuration information from the configuration information set based on the second information.

In some embodiments, the second information includes one or more of channel state information, reliability of the uplink data, size information of the uplink data, an arrival moment of the uplink data, and a first moment, and the first moment is a time point before a piece of configuration information in the configuration information set.

In some embodiments, the processor 2401 is further configured to receive the first information from the terminal device on a second time-frequency resource through the transceiver 2403, where the second time-frequency resource is related to the target configuration information.

In some embodiments, the processor 2401 is further configured to send fourth information to the terminal device through the transceiver 2403, where the fourth information indicates a third time-frequency resource, and the third time-frequency resource is for the terminal device to send the first information to the network device.

In some embodiments, the processor 2401 is further configured to receive the first information from the terminal device on a fourth time-frequency resource through the transceiver 2403, where the fourth time-frequency resource is a time-frequency resource preallocated to send uplink control information UCI by the terminal device.

It should be noted that, for implementations and beneficial effects of the operations, refer to the corresponding descriptions in the method embodiment shown in FIG. 8.

Figure 25:
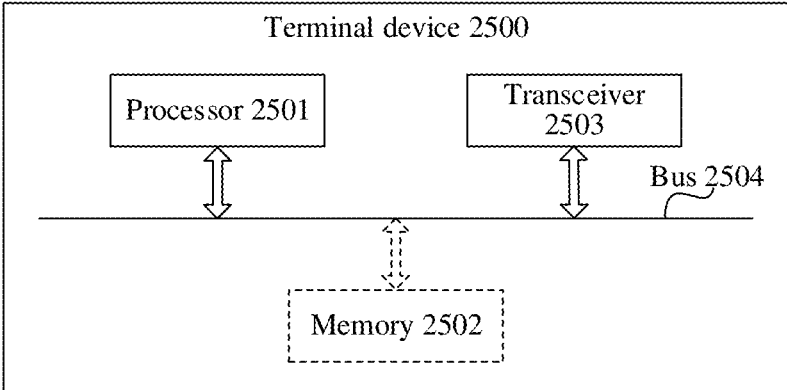
FIG. 25 is a schematic diagram of a structure of a terminal device according to an embodiment of this application.

FIG. 25 shows a terminal device 2500 according to an embodiment of this application. The terminal device 2500 includes a processor 2501 and a transceiver 2503, and optionally further includes a memory 2502. The processor 2501, the memory 2502, and the transceiver 2503 are connected to each other through a bus 2504.

The memory 2502 includes a random access memory (random access memory, RAM), a read-only memory (read-only memory, ROM), an erasable programmable read-only memory (erasable programmable read-only memory, EPROM), or a compact disc read-only memory (compact disc read-only memory, CD-ROM). The memory 2502 is configured to store related instructions and data. The transceiver 2503 is configured to receive and send data.

The processor 2501 may be one or more central processing units (central processing units, CPUs). When the processor 2501 is one CPU, the CPU may be a single-core CPU or a multi-core CPU.

The processor 2501 in the terminal device 2500 reads a computer program stored in the memory 2502, to perform the following operations:

receiving a configuration information set from a network device through the transceiver 2503, where the configuration information set includes a plurality of pieces of configuration information; and sending third information to the network device through the transceiver 2503 when no uplink data arrives before a second moment, where the third information indicates that the configuration information in the configuration information set is not used, and the second moment is a time point before a piece of configuration information in the configuration information set.

In some embodiments, the third information includes a first time period, and indicates that the configuration information in the configuration information set is not used within the first time period.

In some embodiments, the processor 2501 is further configured to receive indication information from the network device through the transceiver 2503, where the indication information indicates the second moment.

In some embodiments, the processor 2501 is further configured to send first information to the network device through the transceiver 2503 when an arrival moment of uplink data is before the second moment, where the first information indicates target configuration information and/or configuration information other than the target configuration information in the configuration information set, and the target configuration information is configuration information in the configuration set.

It should be noted that, for implementations and beneficial effects of the operations, refer to the corresponding descriptions in the method embodiment shown in FIG. 13.

Figure 26:
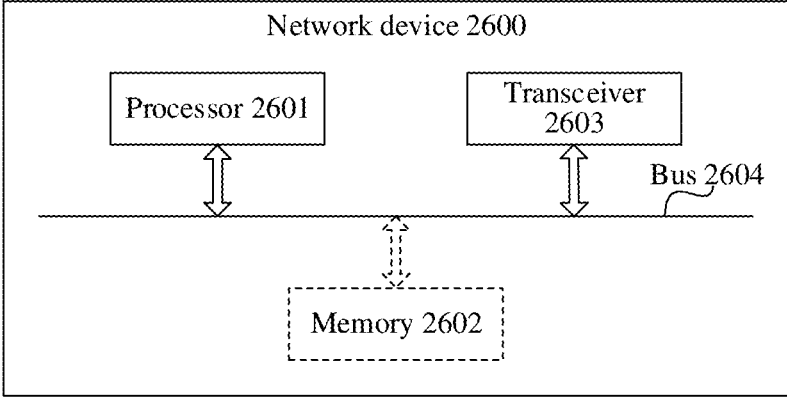
FIG. 26 is a schematic diagram of a structure of a network device according to an embodiment of this application.

FIG. 26 shows a network device 2600 according to an embodiment of this application. The network device 2600 includes a processor 2601 and a transceiver 2603, and optionally further includes a memory 2602. The processor 2601, the memory 2602, and the transceiver 2603 are connected to each other through a bus 2604.

The memory 2602 includes a random access memory (random access memory, RAM), a read-only memory (read-only memory, ROM), an erasable programmable read-only memory (erasable programmable read-only memory, EPROM), or a compact disc read-only memory (compact disc read-only memory, CD-ROM). The memory 2602 is configured to store related instructions and data. The transceiver 2603 is configured to receive and send data.

The processor 2601 may be one or more central processing units (central processing units, CPUs). When the processor 2601 is one CPU, the CPU may be a single-core CPU or a multi-core CPU.

The processor 2601 in the network device 2600 reads a computer program stored in the memory 2602, to perform the following operations:

sending a configuration information set to a terminal device through the transceiver 2603, where the configuration information set includes a plurality of pieces of configuration information; and receiving third information from the terminal device through the transceiver 2603, where the third information indicates that the terminal device does not use the configuration information in the configuration information set.

In some embodiments, the third information includes a first time period, and indicates that the configuration information in the configuration information set is not used within the first time period.

In some embodiments, the processor 2601 is further configured to send indication information to the terminal device through the transceiver 2603, where the indication information indicates the terminal device to send the third information to the network device when no uplink data arrives before a second moment, and the second moment is a time point before a piece of configuration information in the configuration information set.

In some embodiments, the processor 2601 is further configured to receive first information from the terminal device through the transceiver 2603, where the first information indicates target configuration information and/or configuration information other than the target configuration information in the configuration information set, and the target configuration information is configuration information in the configuration set.

It should be noted that, for implementations and beneficial effects of the operations, refer to the corresponding descriptions in the method embodiment shown in FIG. 13.

An embodiment of this application further provides a chip system. The chip system includes at least one processor, a memory, and an interface circuit. The memory, a transceiver, and the at least one processor are connected through a line, and the at least one memory stores instructions. When the instructions are executed by the processor, the method procedure shown in FIG. 8 or FIG. 13 is implemented.

An embodiment of this application further provides a computer-readable storage medium, where the computer-readable storage medium stores instructions. When the instructions are run on a terminal device or a network device, the method procedure shown in FIG. 8 or FIG. 13 is implemented.

An embodiment of this application further provides a computer program product. When the computer program product runs on a terminal device or a network device, the method procedure shown in FIG. 8 or FIG. 13 is implemented.

Persons of ordinary skill in the art may understand that all or some of the processes of the methods in the foregoing embodiments may be implemented by a computer program instructing relevant hardware. The program may be stored in a computer-readable storage medium. When the program is run, the processes in the foregoing method embodiments are performed. The foregoing storage medium includes: any medium that can store program code, such as a ROM, a random access memory RAM, a magnetic disk, or an optical disc.

What is claimed is:

1. A communication method, comprising:

receiving a configuration information set from a network device;

selecting target configuration information from the configuration information set, wherein the selecting the target configuration information from the configuration information set comprises:

selecting the target configuration information from the configuration information set based on second information;

sending first information to the network device, wherein the first information is useable to indicate at least one of the target configuration information or configuration information other than the target configuration information in the configuration information set; and sending uplink data to the network device based on the target configuration information;

wherein the method further comprises:

receiving the second information from the network device, wherein the second information comprises at least one of:

channel state information, reliability of the uplink data, size information of the uplink data, an arrival moment of the uplink data, or a first moment of time; or wherein the sending the first information to the network device comprises:

sending the first information to the network device in response to an arrival moment of the uplink data being before a first moment of time, wherein the first moment of time is a time point before at least a portion of configuration information in the configuration information set; or sending the first information to the network device on a second time-frequency resource, wherein the second time-frequency resource is related to the target configuration information.

2. The method according to claim 1, wherein the first information comprises a first time period, and is useable to indicate that the uplink data is to be sent to the network device within the first time period based on the target configuration information.

3. The method according to claim 1, wherein the method further comprises:

receiving downlink control information (DCI) from the network device, wherein the DCI is activated configuration information in the configuration information set; and the selecting the target configuration information from the configuration information set comprises:

selecting the target configuration information from the activated configuration information in the configuration information set.

4. A communication method, comprising:

sending a configuration information set to a terminal device;

receiving first information from the terminal device, wherein the first information is useable to indicate at least one of target configuration information or configuration information other than the target configuration information in the configuration information set, and the configuration information set comprises the target configuration information;

receiving uplink data from the terminal device based on the target configuration information; and sending second information to the terminal device, wherein the second information is useable for the terminal device to select the target configuration information from the configuration information set, wherein the second information comprises at least one of:

channel state information, reliability of the uplink data, size information of the uplink data, an arrival moment of the uplink data, or a first moment of time, and the first moment is a time point before at least a portion of configuration information in the configuration information set.

5. The method according to claim 4, wherein the first information comprises a first time period, and is useable to indicate that a network device is configured to receive the uplink data within the first time period.

6. The method according to claim 4, wherein the method further comprises:

sending downlink control information (DCI) to the terminal device, wherein the DCI is activated configuration information in the configuration information set, and the activated configuration information is useable for the terminal device to select the target configuration information from the activated configuration information.

7. A communication apparatus, comprising:

at least one processor; and a memory configured to store non-transitory instructions, the at least one processor configured to execute the non-transitory instructions thereby causing the communication apparatus to perform operations comprising:

receiving a configuration information set from a network device;

selecting target configuration information from the configuration information set, wherein the selecting the target configuration information from the configuration information set comprises:

selecting the target configuration information from the configuration information set based on second information;

sending first information to the network device, wherein the first information is useable to indicate at least one of the target configuration information or configuration information other than the target configuration information in the configuration information set; and sending uplink data to the network device based on the target configuration information;

wherein the operations further comprise:

receiving the second information from the network device, wherein the second information comprises at least one of:

channel state information, reliability of the uplink data, size information of the uplink data, an arrival moment of the uplink data, or a first moment of time; or wherein the sending the first information to the network device comprises:

sending the first information to the network device in response to an arrival moment of the uplink data being before a first moment of time, wherein the first moment of time is a time point before at least a portion of configuration information in the configuration information set; or sending the first information to the network device on a second time-frequency resource, wherein the second time-frequency resource is related to the target configuration information.

8. The apparatus according to claim 7, wherein the first information comprises a first time period, and is useable to indicate that the uplink data is to be sent to the network device within the first time period based on the target configuration information.

9. The apparatus according to claim 7, wherein the operations further comprise:

receiving downlink control information (DCI) from the network device, wherein the DCI is activated configuration information in the configuration information set; and the selecting the target configuration information from the configuration information set comprises:

selecting the target configuration information from the activated configuration information in the configuration information set.

10. A communication apparatus, comprising:

at least one processor; and a memory configured to store non-transitory instructions, the at least one processor configured to execute the non-transitory instructions thereby causing the communication apparatus to perform operations comprising:

sending a configuration information set to a terminal device;

receiving first information from the terminal device, wherein the first information is useable to indicate at least one of target configuration information or configuration information other than the target configuration information in the configuration information set, and the configuration information set comprises the target configuration information;

receiving uplink data from the terminal device based on the target configuration information; and sending second information to the terminal device, wherein the second information is useable for the terminal device to select the target configuration information from the configuration information set, wherein the second information comprises at least one of:

channel state information, reliability of the uplink data, size information of the uplink data, an arrival moment of the uplink data, or a first moment of time, and the first moment is a time point before at least a portion of configuration information in the configuration information set.

11. The apparatus according to claim 10, wherein the first information comprises a first time period, and is useable to indicate that a network device is configured to receive the uplink data within the first time period.

12. The apparatus according to claim 10, wherein the operations further comprise:

sending downlink control information (DCI) to the terminal device, wherein the DCI is activated configuration information in the configuration information set, and the activated configuration information is useable for the terminal device to select the target configuration information from the activated configuration information.

* * * * *